(12) United States Patent
Uemura et al.

(10) Patent No.: US 10,676,649 B2
(45) Date of Patent: *Jun. 9, 2020

(54) ADHESIVE SHEET AND METHOD FOR PRODUCING ADHESIVE SHEET

(71) Applicant: LINTEC CORPORATION, Itabashi-ku (JP)

(72) Inventors: Kazue Uemura, Tsukubamirai (JP); Kiichiro Kato, Saitama (JP); Yumiko Amino, Funabashi (JP); Koji Tsuchibuchi, Kashiwa (JP); Takamasa Kase, Koshigaya (JP); Yusuke Matsuoka, Tatsuno (JP)

(73) Assignee: LINTEC CORPORATION, Itabashi-ku (JP)

(*) Notice: Subject to any disclaimer, the term of this patent is extended or adjusted under 35 U.S.C. 154(b) by 75 days.

This patent is subject to a terminal disclaimer.

(21) Appl. No.: 15/762,907

(22) PCT Filed: Sep. 27, 2016

(86) PCT No.: PCT/JP2016/078537
§ 371 (c)(1),
(2) Date: Mar. 23, 2018

(87) PCT Pub. No.: WO2017/057412
PCT Pub. Date: Apr. 6, 2017

(65) Prior Publication Data
US 2018/0265749 A1    Sep. 20, 2018

(30) Foreign Application Priority Data
Sep. 28, 2015 (JP) .................................. 2015-190519

(51) Int. Cl.
*C09J 7/38* (2018.01)
*C09J 11/02* (2006.01)
(Continued)

(52) U.S. Cl.
CPC ................. *C09J 7/385* (2018.01); *B32B 7/06* (2013.01); *B32B 7/12* (2013.01); *B32B 27/00* (2013.01);
(Continued)

(58) Field of Classification Search
CPC ... C09J 133/08; C09J 7/02; C09J 7/385; C09J 7/255; C09J 7/203; C09J 7/22; C09J 7/38;
(Continued)

(56) References Cited

U.S. PATENT DOCUMENTS 6,294,250 B1 * 9/2001 Date .......................... C09J 7/50
428/353
9,240,131 B2 * 1/2016 Onderisin .............. B31D 1/027
2010/0196669 A1   8/2010 Hatakenaka

FOREIGN PATENT DOCUMENTS

JP   2001-507732 A    6/2001
JP   2005-193484 A    7/2005
(Continued)

OTHER PUBLICATIONS

International Search Report dated Jan. 10, 2017 in PCT/JP2016/078537 filed Sep. 27, 2016.

*Primary Examiner* — Patricia L. Nordmeyer
(74) *Attorney, Agent, or Firm* — Oblon, McClelland, Maier & Neustadt, L.L.P.

(57) ABSTRACT

A pressure sensitive adhesive sheet including, on a substrate or a release material, a resin layer, at least a surface (α) of the resin layer on the opposite to the side on which the substrate or release material is provided having pressure sensitive adhesiveness, wherein a concave portion and a flat face exist on the surface (α) of the resin layer, and a width of the concave portion observed from the side of the surface (α) is non-uniform, and in a region (D) of 8 mm in length×10 mm in width as freely-selected on the surface (α), a concave (Continued)

portion having an area of 70 to 99.99% relative to 100% of a total area of the concave portions existing in the region (D) exists.

19 Claims, 10 Drawing Sheets

(51) Int. Cl.
*C09J 7/20* (2018.01)
*B32B 7/06* (2019.01)
*B32B 27/00* (2006.01)
*C09J 201/00* (2006.01)
*C09J 7/25* (2018.01)
*B32B 7/12* (2006.01)
*B32B 27/08* (2006.01)
*B32B 27/36* (2006.01)
*C09J 11/04* (2006.01)

(52) U.S. Cl.
CPC .............. *B32B 27/08* (2013.01); *B32B 27/36* (2013.01); *C09J 7/20* (2018.01); *C09J 7/255* (2018.01); *C09J 11/02* (2013.01); *C09J 11/04* (2013.01); *C09J 201/00* (2013.01); *B32B 2255/10* (2013.01); *B32B 2255/26* (2013.01); *B32B 2264/10* (2013.01); *C09J 2433/00* (2013.01); *C09J 2467/005* (2013.01)

(58) Field of Classification Search
CPC . C09J 7/10; C09J 7/0207; C09J 7/0217; C09J 7/0253; C09J 7/026; C09J 7/0285; C09J 7/20; C09J 5/00; C09J 11/04; C09J 201/00; C09J 2201/16; C09J 2201/28; C09J 2201/36; C09J 2201/606; C09J 2205/10; C09J 2205/102; C09J 2205/114; C09J 2400/163; C09J 2421/00; C09J 2433/00; C09J 2467/006; C09J 2475/00; C09J 2483/005; B05D 1/36; B05D 3/108; B05D 5/00; C08K 3/346; C08K 3/36; C08K 3/34; C08K 3/013; C08K 7/00; C08K 2201/003
See application file for complete search history.

(56) References Cited

FOREIGN PATENT DOCUMENTS

| | | |
|---|---|---|
| JP | 2006-342285 A | 12/2006 |
| JP | 2015-196805 A | 11/2015 |
| WO | WO 2009/011396 A1 | 1/2009 |
| WO | WO 2015/152352 A1 | 10/2015 |

\* cited by examiner (a)

(b)

(a)

(b)

ADHESIVE SHEET AND METHOD FOR PRODUCING ADHESIVE SHEET

TECHNICAL FIELD

The present invention relates to a pressure sensitive adhesive sheet and a method for producing a pressure sensitive adhesive sheet.

BACKGROUND ART

A general pressure sensitive adhesive sheet is constituted of a substrate, a pressure sensitive adhesive layer formed on the substrate, and a release material provided on the pressure sensitive adhesive layer depending on necessity, and in use, after removing the release material in the case where the release material is provided, the general pressure sensitive adhesive sheet is attached to an adherend by bringing the pressure sensitive adhesive layer into contact therewith.

A pressure sensitive adhesive sheet having a large attaching area, which may be used for identification or decoration, masking for painting, surface protection of a metal plate or the like, and the like, has a problem that in attaching the sheet to an adherend, air accumulation is liable to occur between the pressure sensitive adhesive layer and the adherend, and the portion with the air accumulation is recognized as "blister", so as to prevent the pressure sensitive adhesive sheet from being attached cleanly to the adherend.

For solving the problem, for example, PTL 1 describes a pressure sensitive adhesive sheet having grooves with a specified shape that are disposed artificially in a prescribed pattern on the surface of the pressure sensitive adhesive layer by making a release material having a fine emboss pattern into contact with the surface of the pressure sensitive adhesive layer.

There is described that, by using the pressure sensitive adhesive sheet, it is possible to escape the "air accumulation" formed on attaching to an adherend, to the exterior through the grooves formed artificially on the surface of the pressure sensitive adhesive layer.

CITATION LIST

Patent Literature

PTL 1: JP 2001-507732 A

SUMMARY OF INVENTION

Technical Problem

However, the pressure sensitive adhesive sheet having a pressure sensitive adhesive layer having grooves with a specified shape disposed in a general predetermined pattern, as described in PTL 1, etc., has a problem that when the width of the grooves is small, it is difficult to vent the air, and when the width of the grooves is large, not only the surface of the substrate is dented to deteriorate the appearance, but also the pressure sensitive adhesive strength is lowered.

In the pressure sensitive adhesive sheet, the grooves disposed in a prescribed pattern deteriorate the pressure sensitive adhesive strength locally in the site having the grooves disposed, and in attaching the pressure sensitive adhesive sheet to an adherend, there is a possibility that the sheet is detached therefrom in the foregoing site.

On the other hand, in the case where the pressure sensitive adhesive sheet is attached to an adherend and then peeled again therefrom, there is a possibility of adhesive deposits remaining on the adherend depending on the peeling direction of the pressure sensitive adhesive sheet because the pressure sensitive adhesion characteristics of the pressure sensitive adhesive sheet vary locally. For example, in the case where the pressure sensitive adhesive sheet having the pressure sensitive adhesive layer wherein the grooves of a lattice pattern are disposed is peeled obliquely, there is a possibility of adhesive deposits remaining on the adherend.

Furthermore, in the case where the pressure sensitive adhesive sheet is punched out, there is a concern that the disposition pattern of the grooves overlaps the punching pattern. In this case, the cutting depth may fluctuate to cause a problem that a cut line cannot be suitably formed in the pressure sensitive adhesive sheet.

In general, such a process step of forming a trigger for peeling in order to facilitate the peeling of the release material (i.e., a so-called back slit) by only cutting a release material provided on the pressure sensitive adhesive sheet may be performed. In the case where the above step is performed, it is the general procedure that the release material is once peeled off from the pressure sensitive adhesive sheet, and after putting notches in the release material, the release material and the pressure sensitive adhesive layer of the pressure sensitive adhesive sheet are again laminated with each other.

In the pressure sensitive adhesive sheet described in PTL 1, however, due to the use of an embossed liner as the release material, it is necessary to provide a separate release material that is not embossed. Because, it is difficult to follow to the embossed pattern of the release material when laminating again the release material and the pressure sensitive adhesive layer.

In PTL 1, further, for forming a minute structure in the pressure sensitive adhesive layer, such a method is used that the pressure sensitive adhesive layer is once formed by coating a pressure sensitive adhesive on the embossed liner, and then the pressure sensitive adhesive layer and a substrate are laminated (i.e., a so-called transfer coating method). However, in the case where a substrate having a surface with low polarity, such as a polyolefin substrate, is used, sufficient adhesiveness cannot be obtained between the substrate and the pressure sensitive adhesive layer by the method.

Moreover, as different from a release material formed of paper, a release material formed of a resin film is difficult to form a fine embossed pattern to a pressure sensitive adhesive layer.

An object of the present invention is to provide a pressure sensitive adhesive sheet which not only has excellent air escape property such that the air accumulation possibly generated on attaching to an adherend can be readily removed but also is favorable in water resistance and pressure sensitive adhesion characteristics; and a method for producing the pressure sensitive adhesive sheet.

Solution to Problem

The present inventors have found that a pressure sensitive adhesive sheet including, on a surface having pressure sensitive adhesiveness, a resin layer in which concave portions having a non-uniform width and flat faces exist, wherein in an freely-selected region of the surface, one or more concave portions having an area of 70 to 99.99% relative to 100% of a total area of the concave portions existing in the region exist, is able to solve the aforementioned problem, thereby leading to accomplishment of the present invention.

Specifically, the present invention provides the following [1] to [22].

[1] A pressure sensitive adhesive sheet including a resin layer on a substrate or a release material, at least a surface (α) of the resin layer on the opposite to the side on which the substrate or the release material is provided having pressure sensitive adhesiveness, wherein a concave portion and a flat face exist on the surface (α) of the resin layer, and a width of the concave portion observed from the side of the surface (α) is non-uniform, and in a region (D) of 8 mm in length×10 mm in width as freely-selected on the surface (α), a concave portion having an area of 70 to 99.99% relative to 100% of a total area of the concave portions existing in the region (D) exists.

[2] The pressure sensitive adhesive sheet as set forth in the above [1], wherein in the region (D) of 8 mm in length×10 mm in width as freely-selected on the surface (α) of the resin layer, one or more concave portions not having contour lines that are approximately parallel straight lines of 50 μm exist on the both sides of the concave portion.

[3] The pressure sensitive adhesive sheet as set forth in the above [1] or [2], wherein one or more flat faces (f1) having such an area that a region surrounded by a circle having a diameter of at least 100 μm is selectable exist on the surface (α) of the resin layer.

[4] The pressure sensitive adhesive sheet as set forth in any of the above [1] to [3], wherein one or more flat faces (f2) having an area of 0.2 mm$^2$ or more exist on the surface (α) of the resin layer.

[5] The pressure sensitive adhesive sheet as set forth in any of the above [1] to [71], wherein the shape of the flat face observed from the side of the surface (α) is irregular.

[6] The pressure sensitive adhesive sheet as set forth in any of the above [1] to [5], wherein in the region (D) of 8 mm in length×10 mm in width as freely-selected on the surface (α), plural flat faces exist, and a skewness Sk value relative to a normal distribution curve between the area and the frequency of each of one or more flat faces (S) excluding flat faces having a cumulative relative frequency of 30% or less determined by adding a relative frequency from the plural existing flat faces with a smaller area is 1.0 or more.

[7] The pressure sensitive adhesive sheet as set forth in the above [6], wherein a kurtosis Ku value relative to a normal distribution curve between the area and the frequency of each of the one or more flat faces (S) is 1.8 or more.

[8] The pressure sensitive adhesive sheet as set forth in any of the above [1] to [7], wherein the plural flat faces exist on the surface (α), and the positions at which the plural flat faces exist do not have any periodicity.

[9] The pressure sensitive adhesive sheet as set forth in any of the above [1] to [8], wherein the concave portion has a height difference of 0.5 μm or more at maximum.

[10] The pressure sensitive adhesive sheet as set forth in any of the above [1] to [9], wherein the concave portion is not one formed using a release material having an embossed pattern.

[11] The pressure sensitive adhesive sheet as set forth in any of the above [1] to [10], wherein in at least one cross section (P1) of two cross sections of the pressure sensitive adhesive sheet resulting from freely-selecting a region (P) surrounded by a square having an edge length of 5 mm on the surface (α) and cutting the region (P) with a plane surface going through each of two diagonal lines of the square and being perpendicular to the region (P) on the surface (α), plural concave portions having a maximum height difference of 40% or more of a total thickness of the resin layer and having a different shape of the cut part from each other and a flat portion corresponding to the cut part of the flat face existing in the region (P) and approximately parallel to the surface of the substrate or release material coming into contact with the resin layer exist on the side of the surface (α) of the cross section (P1).

[12] The pressure sensitive adhesive sheet as set forth in any of the above [1] to [11], wherein the resin layer contains a resin part (X) containing a resin as a main component and a fine particle part (Y) consisting of fine particles.

[13] The pressure sensitive adhesive sheet as set forth in the above [12], wherein a mass retention rate after heating the resin layer at 800° C. for 30 minutes is 3 to 90% by mass.

[14] The pressure sensitive adhesive sheet as set forth in the above [12] or [13], wherein the resin to be contained in the resin part (X) contains a pressure sensitive adhesive resin.

[15] The pressure sensitive adhesive sheet as set forth in any of the above [12] to [14], wherein the resin part (X) further contains at least one selected from a metal chelate crosslinking agent and an epoxy crosslinking agent.

[16] The pressure sensitive adhesive sheet as set forth in any of the above [12] to [15], wherein the fine particles are one or more selected from silica particles, metal oxide particles, and smectite.

[17] The pressure sensitive adhesive sheet as set forth in any of the above [12] to [16], wherein a surface (β) of the resin layer on the side on which the substrate or release material is provided has pressure sensitive adhesiveness.

[18] The pressure sensitive adhesive sheet as set forth in any of the above [1] to [17], wherein the resin layer is a multilayer structure in which a layer (Xβ) mainly containing a resin part (X), a layer (Y1) containing a particle part (Y) in an amount of 15% by mass or more, and a layer (Xα) mainly containing a resin part (X) are laminated in this order from the side on which the substrate or release material is provided.

[19] The pressure sensitive adhesive sheet as set forth in the above [18], wherein the layer (Xβ) is a layer formed by a composition (xβ) containing a resin and having a content of fine particles of less than 15% by mass, the layer (Y1) is a layer formed by a composition (y) containing fine particles in an amount of 15% by mass or more, and the layer (Xα) is a layer formed by a composition (xα) containing a resin and having a content of fine particles of less than 15% by mass.

[20] A method for producing the pressure sensitive adhesive sheet as set forth in any of the above [1] to [19], which includes the following steps (1) and (2):

step (1): a step of forming a coating film (x') formed by a composition (x) containing a resin and having a content of fine particles of less than 15% by mass and a coating film (y') formed by a composition (y) containing fine particles in an amount of 15% by mass or more; and step (2): a step of simultaneously drying the coating film (x') and the coating film (y') formed in the step (1).

[21] The method for producing the pressure sensitive adhesive sheet as set forth in the above [20], which includes the following steps (1A) and (2A):

step (1A): a step of forming, on a substrate or a release material, a coating film (xβ') formed by a composition (xβ) containing a resin and having a content of fine particles of less than 15% by mass, a coating film (y') formed by a composition (y) containing the fine particles in an amount of 15% by mass or more, and a coating film (xα') formed by a composition (Xα) containing a resin and having a content of fine particles of less than 15% by mass, by laminating in this order; and step (2A): a step of simultaneously drying the coating film (Xβ'), the coating film (y'), and the coating film (Xα') formed in the step (1A).

[22] The method for producing the pressure sensitive adhesive sheet as set forth in the above [20], which includes the following steps (1B) and (2B):

step (1B): a step of forming, on a layer (Xβ) mainly containing a resin part (X) that is provided on a substrate or a release material, a coating film (y') formed by a composition (y) containing the fine particles in an amount of 15% by mass or more, and a coating film (Xα') formed by a composition (Xα) containing a resin and having a content of fine particles of less than 15% by mass, by laminating in this order; and step (2B): a step of simultaneously drying the coating film (y') and the coating film (Xα') formed in the step (1B).

Advantageous Effects of Invention

The pressure sensitive adhesive sheet of the present invention not only has excellent air escape property such that the air accumulation possibly generated on attaching to an adherend can be readily removed but also is favorable in water resistance and pressure sensitive adhesion characteristics.

DESCRIPTION OF EMBODIMENTS

Figure 1:
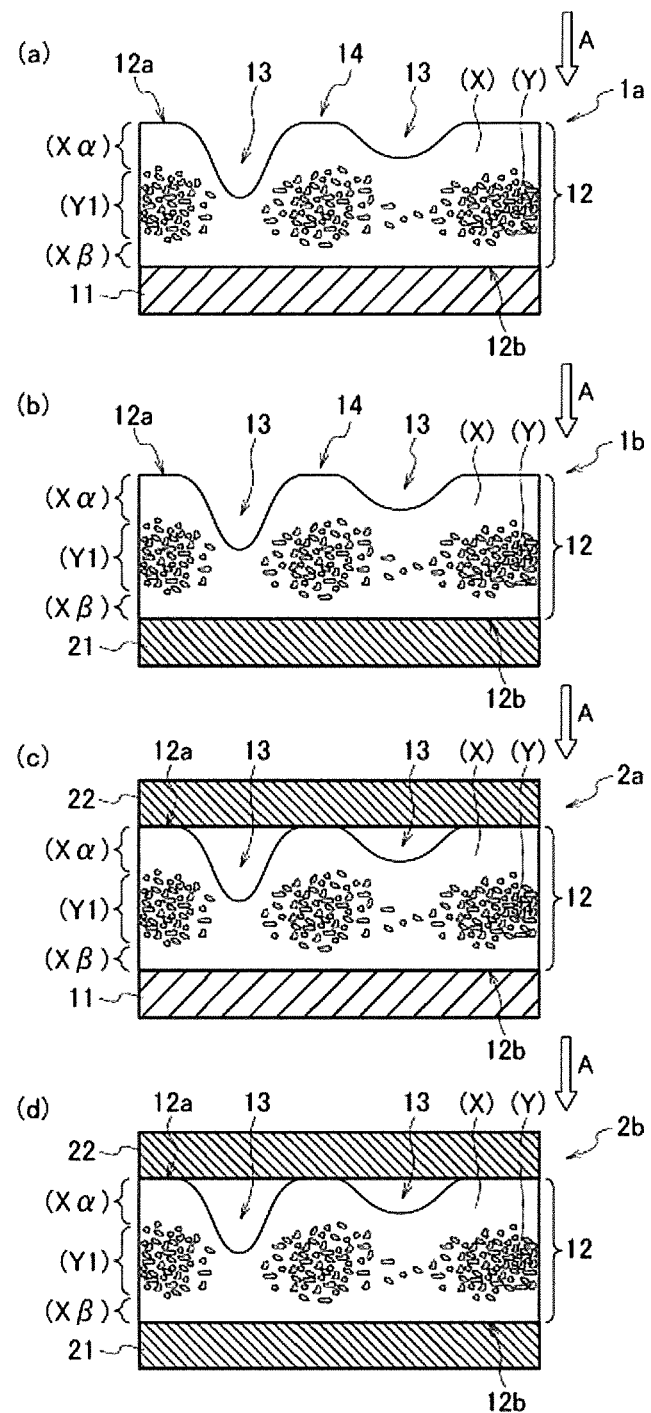
FIG. 1 is a schematic cross sectional view showing an example of the configuration of the pressure sensitive adhesive sheet of the present invention.

In the present invention, for example, an expression "YY containing a component XX as a main component" or an expression "YY mainly containing a component XX" means that "among the components contained in YY, a component having a largest content is the component XX". A specific content of the component XX in this expression is typically 50% by mass or more, and is preferably 65 to 100% by mass, more preferably 75 to 100%, and still more preferably 85 to 100% by mass relative to the total amount (100% by mass) of YY.

In the present invention, for example, "(meth)acrylic acid" indicates both "acrylic acid" and "methacrylic acid", and the same is also applicable to other analogous terms.

Regarding a preferred numerical range (for example, a range of content or the like), a lower limit and an upper limit that are expressed in stages can be combined each independently. For example, from an expression of "preferably 10 to 90, and more preferably 30 to 60", "the preferred lower limit (10)" and "the more preferred upper limit (60)" may be combined to be "10 to 60".

[Configuration of Pressure Sensitive Adhesive Sheet of the Present Invention]

The pressure sensitive adhesive sheet of the present invention is a pressure sensitive adhesive sheet including, on a substrate or a release material, a resin layer, at least a surface ($\alpha$) of the resin layer on the opposite to the side on which the substrate or release material is provided having pressure sensitive adhesiveness, wherein a concave portion and a flat face exist on the surface ($\alpha$).

FIG. 1 is a schematic cross sectional view showing an example of the structure of the pressure sensitive adhesive sheet of the present invention.

Examples of the pressure sensitive adhesive sheet of an embodiment of the present invention include a pressure sensitive adhesive sheet 1a having a resin layer 12 on a substrate 11 as shown in FIG. 1(a); and a pressure sensitive adhesive sheet 1b having a resin layer 12 on a release material 21 as shown in FIG. 1(b).

In the pressure sensitive adhesive sheet of the present invention, at least a surface ($\alpha$) 12a of the resin layer 12 on the side opposite to the side on which the substrate 11 or the release material 21 is provided (hereinafter also referred to simply as "surface ($\alpha$)") has pressure sensitive adhesiveness, and a concave portion 13 and a flat face 14 exist.

Accordingly, from the viewpoint of handleability, the pressure sensitive adhesive sheet of another embodiment of the present invention preferably has a configuration of a pressure sensitive adhesive sheet 2a or 2b as shown in FIG. 1(c) or FIG. 1(d), wherein a release material 22 is further provided on the surface ($\alpha$) 12a of the resin layer 12 in the pressure sensitive adhesive sheet 1a or 1b as shown in FIG. 1.

In the pressure sensitive adhesive sheet of one embodiment of the present invention, as shown in FIG. 1, the resin layer 12 is preferably a layer containing a resin part (X) containing a resin and a particle part (Y) consisting of fine particles.

When the particle part (Y) is contained in the resin layer 12, the shape retentivity after attachment can be improved, and the resulting pressure sensitive adhesive sheet can be provided with improved blister resistance when used at a high temperature.

The details of the resin part (X) and the particle part (Y) are described later.

In the pressure sensitive adhesive sheet that is one embodiment of the present invention, a surface ($\beta$) 12b of the resin layer 12 on the side on which the substrate 11 or the release material 21 is provided (hereinafter also referred to simply as "surface ($\beta$)") may have pressure sensitive adhesiveness.

When the surface ($\beta$) has also pressure sensitive adhesiveness, in the pressure sensitive adhesive sheet 1a or 2a shown in FIG. 1(a) or FIG. 1(c), the adhesion between the resin layer 12 and the substrate 11 becomes good, and in the pressure sensitive adhesive sheet 1b or 2b shown in FIG. 1(b) or FIG. 1(d), a double-sided pressure sensitive adhesive sheet can be provided.

[Requirements Regarding Concave Portion and Flat Face Existing on Surface ($\alpha$)]

As for the pressure sensitive adhesive sheet of the present invention, the concave portion 13 and the flat face 14 exist on a surface ($\alpha$) 12a of the resin layer 12 as shown in FIGS. 1(a) to 1(d).

The concave portion 13 existing on the surface ($\alpha$) plays a role of air-discharge channel for drawing the "air accumulation" out to be generated on attaching the surface ($\alpha$) of the resin layer of the pressure sensitive adhesive sheet of the present invention to an adherend.

Meanwhile, the flat face 14 existing on the surface ($\alpha$) is a face coming into direct contact with the adherend and adhering closely thereof when attaching to the adherend, and is a site influencing the pressure sensitive adhesive strength of the pressure sensitive adhesive sheet.

Figure 2:
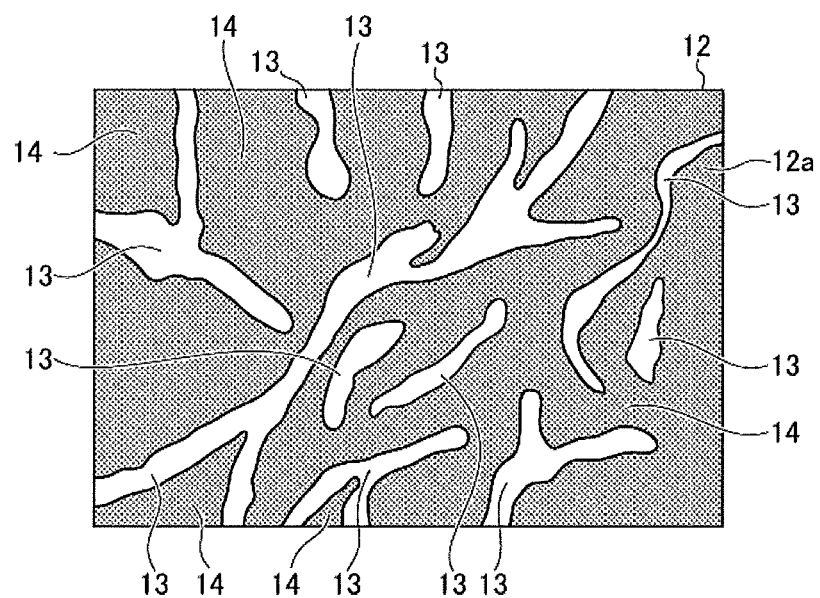
FIG. 2 is a schematic planar view of the surface (α) on observing from the side of the surface (α) of the resin layer which the pressure sensitive adhesive sheet of the present invention has.

FIG. 2 is a schematic planar view of the surface ($\alpha$) on observing from the side of the surface ($\alpha$) of the resin layer which the pressure sensitive adhesive sheet of the present invention has.

Though it is preferred that the concave portion existing on the surface ($\alpha$) of the resin layer is the irregular concave portion 13 as shown in FIG. 2, a regular concave portion may also exist.

However, in one embodiment of the present invention, as shown in FIG. 2, it is preferred that the one or more irregular concave portions 13 exist, and it is more preferred that the plural irregular concave portions 13 exist on the surface ($\alpha$) 12a of the resin layer 12.

The existence of the irregular concave portion on the surface ($\alpha$) of the resin layer allows to provide a pressure sensitive adhesive sheets having more improved air escape property and pressure sensitive adhesion characteristics with a well balance.

When the plural irregular concave portions exist, even in the case where a pressure is applied from a fixed direction, and the shape of a part of the concave portions existing on the surface ($\alpha$) collapses, the concave portions 13 in which the shape is maintained are easy to exist on the surface ($\alpha$), and vanishing of an air-discharge channel can be prevented.

The length of the concave portion 13 in a planar view of the concave portion 13 existing on the surface ($\alpha$) is not particularly limited. Namely, the concave portion 13 includes a relatively long groove-like one and a relatively short pit-like one.

Though it is preferred that the flat face existing on the surface ($\alpha$) of the resin layer is the irregular flat face 14 as shown in FIG. 2, a regular flat face may also exist.

However, in one embodiment of the present invention, as shown in FIG. 2, it is preferred that the shape of the flat face 14 observed from the side of the surface ($\alpha$) 12a of the resin layer 12 is irregular, it is preferred that the one or more irregular flat faces 14 exist, and it is more preferred that a plurality of the irregular flat faces 14 exist.

As for the flat face existing on the surface ($\alpha$) of the resin layer, though the regular flat face may exist together with the irregular flat face 14, it is preferred that a plurality of the irregular flat faces 14 exist.

When the irregular flat face exists on the surface ($\alpha$) of the resin layer, different from a surface of a pressure sensitive adhesive layer formed using a release sheet having a general embossed pattern, the presence of sites where the pressure sensitive adhesive strength is locally weak, or sites where the air escape property is inferior can be extremely minimized. As a result, uniformly excellent air escape property and pressure sensitive adhesion characteristics can be revealed on the surface (α) of the resin layer.

In the present invention, the term "irregular shape" does not mean a regular shape, such as a figure capable of drawing a center of a circle, an oval, or the like, a polygon, etc., but refers to a shape in which no regularity is present in the form, and no similarity is found in individual shapes. Specifically, the shapes of the concave portions 13 and the flat faces 14 as shown in FIG. 2 are corresponding thereto.

On the other hand, examples of the "regular shape" but not the "irregular shape" include a circle, an oval, a polygon, and the like. In addition, in the present specification, the "polygon" refers to a figure capable of drawing diagonal lines in the inside thereof (without being protruded outside) and being surrounded by straight lines in which the sum of interior angles is 180×n (degrees) (n is a natural number). The polygon also includes one in which an edge part thereof has a round-shaped curvature.

In the present invention, for the judgement on whether or not the "irregular" concave portion or flat face exists on the surface (α) of the resin layer, in principle, the shape of the flat face or concave portion as the observation target is observed from the side of the surface (α) of the resin layer through visual inspection or with a digital microscope (magnification: 30 to 100 times) and judged.

Figure 6:
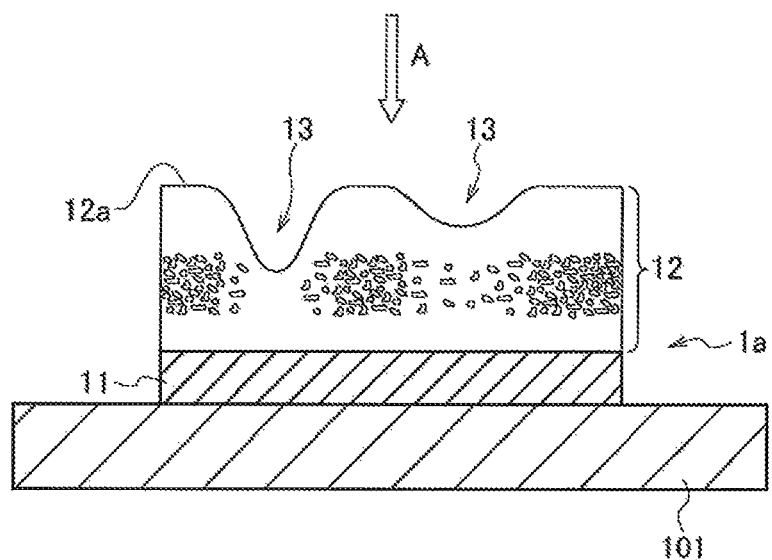
FIG. 6 is a cross sectional view of a measurement sample used for observation of the surface (α) of the resin layer of the pressure sensitive adhesive sheet produced in each of Examples and Comparative Examples.
Figure 6:
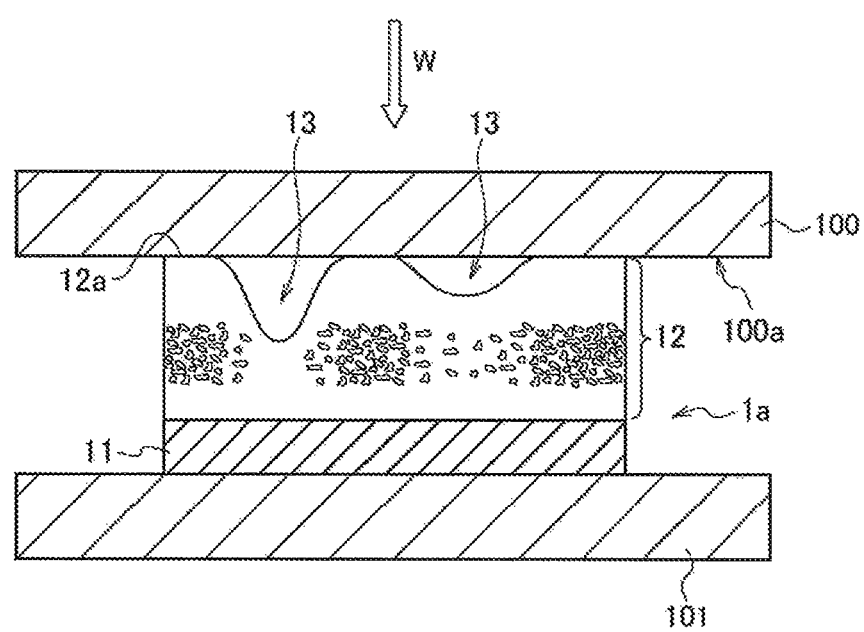

In the case of using a digital microscope, for example, as shown in FIG. 6, it is suitable that a focus is gradually moved from an upper portion of a site on the surface (α) 12a where a flat face is considered to exist through visual inspection toward the A direction, and any portion which is first in focus is observed as the flat face.

In the case where focus is not fixed, as shown in FIG. 6(b), the judgement may be performed by a method in which a translucent adherend 100 having a smooth surface 100a is attached on the surface (α) 12a of the resin layer by using a squeegee without applying a load as far as possible, and the surface (α) 12a of the resin layer is observed through the translucent adherend 100 from the W direction by using a digital microscope, thereby confirming whether or not the concave portion and the flat face exist. Namely, a site of the surface (α) coming into contact with the smooth surface 100a can be judged as the "flat face", and a site of the surface (α) not coming into contact with the smooth surface 100a can be judged as the "concave portion".

However, the judgement may also be performed by selecting one to ten regions (D) of 8 mm in length×10 mm in width as freely-selected on the surface (α) and observing the shape of the concave portion or flat face existing in each of the selected regions (D) from the side of the surface (α) through visual inspection or with a digital microscope (magnification: 30 to 100 times). Namely, in all of the regions to be selected, if the irregular concave portion or flat face exists, it may also be considered that "the irregular concave portion or flat face exists on the surface (α)". Similarly, in all of the regions to be selected, if the plural irregular concave portions or flat faces exist, it can also be considered that "the plural irregular concave portions or flat faces exist on the surface (α)".

On the observation of the region (D), the entire surface of the selected region (D) may be observed all at once at a low magnification with a digital microscope.

Though the selected region (D) may be observed at a high magnification with a digital microscope, the observation is performed at a high magnification, and therefore, there may be a case where the foregoing region (D) becomes larger than a photographable region with the digital microscope. In such a case, using an image connecting function of the digital microscope, freely-selected regions adjoining each other are photographed to acquire neighboring plural images, the plural images are connected with each other to make a connected image, and a part surrounded by a rectangle of 8 mm in length×10 mm in width that is freely-selected from the connected image may be used as the region (D) for the aforementioned judgement.

In the following description, in order to judge whether or not a certain requirement is satisfied, in the case of observing the inside of the selected region with a digital microscope, whether or not the foregoing requirement is satisfied may also be judged from the connected image in the same manner as described above.

In the description of the present specification, examples of the digital microscope which is used for performing the observation of various shapes include "Digital Microscope VHX-1000" and "Digital Microscope VHX-5000", all of which are a product name, manufactured by Keyence Corporation, and the like.

On observing various shapes, a method of directly observing the surface (α) at the aforementioned magnification with a digital microscope may be employed, or a method of observing the shapes of the concave portion and the flat portion shown in the image acquired at the aforementioned magnification with a digital microscope through visual inspection may be employed.

It is preferred that the shape of the irregular concave portion existing on the surface (α) can be viewed through visual inspection from the side of the surface (α).

Similarly, it is preferred that the shape of the irregular flat face existing on the surface (α) can be viewed through visual inspection from the side of the surface (α).

As shown in FIG. 1(c) or FIG. 1(d), in the pressure sensitive adhesive sheet 2a or 2b in which the release material 22 is laminated on the surface (α) 12a of the resin layer 12, when the release material 22 has been removed, the exposed surface (α) 12a is to be observed through visual inspection.

In one embodiment of the present invention, as shown in FIG. 2, a regular concave portion may exist on the surface (α) together with the irregular concave portion 13.

However, an occupying area ratio of the irregular concave portion existing on the surface (α) relative to 100% of the whole area of the concave portions existing on the surface (α) is preferably 80 to 100%, more preferably 90 to 100%, still more preferably 95 to 100%, and yet still more preferably 100%.

In one embodiment of the present invention, an occupying area ratio of the concave portions existing on the surface (α) relative to 100% of the whole area of the surface (α) is preferably 10 to 80%, more preferably 20 to 70%, still more preferably 30 to 60%, and yet still more preferably 35 to 55%.

Similarly, in one embodiment of the present invention, as shown in FIG. 2, a regular flat face may exist on the surface (α) together with the irregular flat face 14.

However, an occupying area ratio of the irregular flat face existing on the surface (α) relative to 100% of the whole area of the flat faces existing on the surface (α) is preferably 80 to 100%, more preferably 90 to 100%, still more preferably 95 to 100%, and yet still more preferably 100%.

In one embodiment of the present invention, an occupying area ratio of the flat faces existing on the surface (α) relative to 100% of the whole area of the surface (α) is preferably 20 to 90%, more preferably 30 to 80%, still more preferably 40 to 70%, and yet still more preferably 45 to 65%.

The aforementioned "occupying area ratio of the concave portion or flat face" can be calculated by acquiring an image of the surface (α) with a digital microscope (magnification: 30 to 100 times) and subjecting the image to image processing (binarization processing).

One to ten regions (D) of 8 mm in length×10 mm in width as freely-selected on the surface (α) are selected; images of the regions are acquired with a digital microscope (magnification: 30 to 100 times); the values of the "occupying area ratio of the concave portion or flat face" of the respective regions are calculated from the image; and an average of the values of the selected one to ten regions can also be considered to be the "occupying area ratio of the concave portion or flat face" existing on the surface (α) of the resin layer of the targeted pressure sensitive adhesive sheet.

In one embodiment of the present invention, from the viewpoint of providing a pressure sensitive adhesive sheet having more improved various characteristics, such as air escape property, pressure sensitive adhesion characteristics, with a well balance, it is preferred that the shapes of the concave portion and the flat face existing on the surface (α) of the resin layer are not one having a shape to be a fixed repeating unit.

In one embodiment of the present invention, from the viewpoint of providing a pressure sensitive adhesive sheet having more improved various characteristics, such as air escape property, pressure sensitive adhesion characteristics, with a well balance, it is preferred that the plural concave portions exist on the surface (α) of the resin layer, and the positions at which the plural concave portions exist do not have any periodicity. In addition, from the same viewpoint, it is preferred that the plural flat faces exist on the surface (α) of the resin layer, and the positions at which the plural flat faces exist do not have any periodicity.

In the present invention, the wording "the positions at which the plural concave portions or flat faces exist do not have any periodicity" means that on the surface (α) of the resin layer, the positions at which the plural concave portions or flat faces exist do not have the same repeating pattern and are in a random state.

The judgement on whether or not "the shapes of the concave portion and the flat face are not one having a shape to be a fixed repeating unit" and the judgement on whether or not "the positions at which the plural concave portions or flat faces exist do not have any periodicity" can be performed by the same method as the aforementioned judgement method on whether or not "the irregular concave portion or flat face exists on the surface (α) of the resin layer".

[Respective Requirements which the Pressure Sensitive Adhesive Sheet of the Present Invention Satisfies]

As FIGS. 1(a) to 1(d), in the pressure sensitive adhesive sheet of the present invention, the concave portion 13 and the flat face 14 exist on the surface (α) 12a of the resin layer 12, and the concave portion satisfies the following requirements (Ii) and (Iii).

Requirement (Ii): A width of the concave portion observed from the side of the surface (α) is non-uniform.

Requirement (Iii): In a region (D) of 8 mm in length×10 mm in width as freely-selected on the surface (α), a concave portion having an area of 70 to 99.99% (more preferably 85 to 99.99%) relative to 100% of a total area of the concave portions existing in the region (D) exists.

The concave portion 13 existing on the surface (α) plays a role of air-discharge channel for drawing the "air accumulation" out to be generated on attaching the surface (α) of the resin layer of the pressure sensitive adhesive sheet of the present invention to an adherend.

Meanwhile, the flat face 14 existing on the surface (α) is a face coming into direct contact with the adherend and adhering closely thereof when attaching to the adherend and is a site influencing the pressure sensitive adhesive strength of the pressure sensitive adhesive sheet.

In a pressure sensitive adhesive sheet provided with grooves, which is formed of a release sheet having a generally designed embossed pattern, a site which is good in the air escape property but weak in the pressure sensitive adhesive strength and a site which is conversely excellent in the pressure sensitive adhesion characteristics but inferior in the air escape property exist.

In such a pressure sensitive adhesive sheet having a pressure sensitive adhesive layer provided with groves formed in such a manner that the shape, width, and length as well as the number, the existing position, and the like are artificially set in advance, it is difficult to improve all of characteristics, such as air escape property, appearance, pressure sensitive adhesion characteristics, punching property, with a well balance, and unevenness is generated depending upon the shape, the number, etc. of the grooves of the pressure sensitive adhesive layer.

On the other hand, in the pressure sensitive adhesive sheet of the present invention, the concave portion and the flat face satisfying the requirements (Ii) and (Iii) are formed on the surface (α) of the resin layer which is an attached surface to an adherend, and therefore, a pressure sensitive adhesive sheet having improved various characteristics, such as air escape property, pressure sensitive adhesion characteristics, which are required for the pressure sensitive adhesive sheet, may be provided.

The details of the requirements (Ii) and (Iii) are hereunder described.

<Requirement (Ii)>

FIG. 2 is a schematic planar view of the surface (α) on observing from the side of the surface (α) of the resin layer which the pressure sensitive adhesive sheet of the present invention has.

As shown in FIG. 2, the concave portion 13 and the flat face 14 exist on the surface (α) of the resin layer which the pressure sensitive adhesive sheet of the present invention has, and the width of the concave portion 13 is non-uniform.

Here, the matter that the width of the concave portion 13 on the surface (α) of the resin layer which the pressure sensitive adhesive sheet has is non-uniform means that in a planar view of the pressure sensitive adhesive sheet of the present invention, a gap between two contour lines facing each other of the concave portion 13 is not constant and means that in the gap between the two contour lines, a relatively wide site and a relatively narrow site exist.

When the requirement (Ii) is satisfied, not only the air escape property can be bettered, but also invasion of water in the site of the concave portion having a narrow width can be inhibited, so that excellent water resistance can be obtained.

<Requirement (Iii)>

In the present invention, as prescribed in the requirement in a region (D) of 8 mm in length×10 mm in width as freely-selected on the surface (α), a concave portion having an area of 70 to 99.99% relative to 100% of a total area of the concave portions existing in the region (D) exists.

When the requirement (Iii) is satisfied, a pressure sensitive adhesive sheet having improved various characteristics, such as air escape property, pressure sensitive adhesion characteristics, can be provided.

In one embodiment of the present invention, from the viewpoint of continuity of the concave portion, it is preferred that the concave portion existing on the surface (α) of the resin layer is different from one formed by transfer of an embossed pattern. It is also possible to allow unevennesses having a continued single concave portion to exist by designing the embossed pattern. In the present invention, the concave portion is not one formed by transfer of an embossed pattern, and therefore, it is preferred that a continued sing concave portion does not exist, in other words, in the region (D) as freely-selected on the surface (α), a concave portion having an area of 100% relative to 100% of a total area of the concave portions existing in the region (D) does not exist.

In the present invention, for the judgement on whether or not the concave portion or flat face exists on the surface (α) of the resin layer and the judgement of the shape, in principle, the shape of the flat face or concave portion as the observation target is observed from the side of the surface (α) of the resin layer through visual inspection or with a digital microscope (magnification: 30 to 100 times) and judged.

However, the judgement may also be performed by selecting one to ten regions (D) of 8 mm in length×10 mm in width as freely-selected on the surface (α) and observing the shape of the concave portion or flat face existing in each of the selected regions (D) from the side of the surface (α) through visual inspection or with a digital microscope (magnification: 30 to 100 times). Namely, in all of the regions to be selected, if the concave portion or flat face exists, it can also be considered that "the concave portion or flat face exists on the surface (α)". Similarly, in all of the regions to be selected, if the plural concave portions or flat faces exist, it can also be considered that "the plural concave portions or flat faces exist on the surface (α)", On the observation of the region (D), the entire surface of the selected region (D) may be observed all at once at a low magnification with a digital microscope.

Though the selected region (D) may be observed at a high magnification with a digital microscope, the observation is performed at a high magnification, and therefore, there may be a case where the foregoing region (D) becomes larger than a photographable region with the digital microscope. In such a case, using an image connecting function of the digital microscope, freely-selected regions adjoining each other are photographed to acquire neighboring plural images, the plural images are connected with each other to make a connected image, and a portion surrounded by a rectangle of 8 mm in length×10 mm in width that is freely-selected from the connected image may be used as the region (D) for the aforementioned judgement.

In the following description, in order to judge whether or not a certain requirement is satisfied, even in the case of observing the inside of the selected region with a digital microscope, the judgement may also be performed from the connected image in the same manner as described above.

In the description of the present specification, examples of the digital microscope which is used for performing the observation of various shapes include "Digital Microscope VHX-1000" and "Digital Microscope VHX-5000", all of which are a product name, manufactured by Keyence Corporation, and the like.

On observing various shapes, a method of directly observing the surface (α) at the aforementioned magnification with a digital microscope may be employed, or a method of observing the shapes of the concave portion and the flat portion shown in the image acquired at the aforementioned magnification with a digital microscope through visual inspection may be employed.

In the present invention, the area of the concave portion or flat face existing on the surface (α) of the resin layer of the pressure sensitive adhesive sheet can be measured by acquiring an image of the surface (α) with a digital microscope (magnification: 30 to 100 times) and subjecting the image to image processing (binarization processing), followed by performing automatic area measurement. In addition, one to ten regions (D) of 8 mm in length×10 mm in width as freely-selected on the surface (α) are selected; images of the regions are acquired with a digital microscope (magnification: 30 to 100 times); the values of the "occupying area ratio of the concave portion or flat face" of the respective regions are calculated from the image; and an average of the values of the selected one to ten regions can also be considered to be the "occupying area ratio of the concave portion or flat face" existing on the surface (α) of the resin layer of the targeted pressure sensitive adhesive sheet.

More specifically, in the region (D) surrounded by a rectangle of 8 mm in length×10 mm in width as freely-selected on the surface (α) of the resin layer, an area ratio of the maximum concave portion relative to the total area of the concave portions can be calculated according to the following expression.

(Area ratio of maximum concave portion relative to total area of concave portions)=[Area of maximum concave portion]/[Total area of concave portions]×100

In a pressure sensitive adhesive sheet having a pressure sensitive adhesive layer provided with a groove due to transfer of an embossed pattern, there is a case where all of the grooves existing in an arbitrary region on the surface of the pressure sensitive adhesive layer are continued depending upon the design of the embossed pattern. In other words, in a pressure sensitive adhesive sheet having a pressure sensitive adhesive layer provided with a groove due to transfer of an embossed pattern, there is a case where a single groove having an area of 100% relative to 100% of the total area of the grooves existing in an arbitrary region on the surface of the pressure sensitive adhesive layer exists. In the pressure sensitive adhesive sheet having a pressure sensitive adhesive layer provided with a groove due to transfer of an embossed pattern, in which all of the grooves existing in an arbitrary region on the surface of the pressure sensitive adhesive layer are continued, it is difficult to improve various characteristics, such as air escape property, pressure sensitive adhesion characteristics, with a well balance. In addition, in the pressure sensitive adhesive sheet having a pressure sensitive adhesive layer provided with a groove due to transfer of an embossed pattern, in which all of the grooves existing in an arbitrary region on the surface of the pressure sensitive adhesive layer are continued, it is difficult to improve the air escape property and the water resistance with a well balance.

<Characteristic Requirements Regarding Concave Portion Existing on Surface (α)>

In one embodiment of the present invention, it is preferred that a plurality of the concave portions existing on the surface (α), in which the width thereof is non-uniform on observing from the side of the surface (α), exist, and furthermore, it is preferred that the following requirements are satisfied.

Requirement (I-1): In the region (D) of 8 mm in length×10 mm in width as freely-selected on the surface (α) of the resin layer, one or more concave portions not having contour lines that are approximately parallel straight lines of 50 μm exist through observation from the side of the surface (α).

Requirement (I-2): The concave portion has a height difference of 0.5 μm or more at maximum.

Requirement (I-3): The concave portion is not one formed using a release material having an embossed pattern.

<Requirement (I-1)>

The wording "contour lines" as prescribed in the requirement (I-1) means two contour lines facing each other of the concave portion in a planar view from the side of the surface (α), as shown in FIGS. 3(a) and 3(b). In addition, the wording "concave portion not having contour lines that are approximately parallel straight lines of 50 μm exists through observation from the side of the surface (α)" as prescribed in the requirement (I-1) means that the concave portion of the surface (α) of the resin layer has a part where two approximately parallel straight lines of 50 μm cannot be drawn along the contour lines facing each other of the concave portion.

The wording "approximately parallel straight lines of 50 μm" as referred to in the present invention includes, as a matter of course, the case where an angle formed by the two straight lines having a length of 50 μm is 0°, and also includes the case where a slight inclination to an extent such that the foregoing angle can be considered to be substantially parallel is present (for example, the case where the foregoing angle is 5° or less, and preferably 2° or less).

When the requirement (I-1) is satisfied, it is possible to provide a pressure sensitive adhesive sheet not only having favorable air escape property but also inhibiting invasion of water from the outside, thereby enabling one to obtain excellent water resistance. For example, the concave portion not having contour lines that are approximately parallel straight lines of 50 μm through observation from the side of the surface (α) of the resin layer is a concave portion having a part where two approximately parallel straight lines of 50 μm cannot be drawn along the contour lines facing each other of the concave portion, and examples of the shape of this concave portion may include a shape in which the concave portion having a length to some extent is winding; and a shape in which the concave portion becomes gradually thin. When the shape of the concave portion existing on the surface (α) of the resin layer is a winding shape or a shape in which a tip of the concave portion becomes thin, it is possible to provide a pressure sensitive adhesive sheet which inhibits invasion of water from the outside and has excellent water resistance.

In the present invention, for the judgement on whether or not "one or more concave portions not having contour lines that are approximately parallel straight lines of 50 μm exist through observation from the side of the surface (α)", in principle, the judgement is performed through observation with a digital microscope (magnification: 30 to 100 times). As for the "shape of the concave portion", the contour lines of the concave portion may be confirmed by acquiring an image of the surface (α) with a digital microscope (magnification: 30 to 100 times) and subjecting the image to image processing (binarization processing). In addition, by selecting one to ten regions (D) of 8 mm in length×10 mm in width as freely-selected on the surface (α) and acquiring images of the regions with a digital microscope (magnification: 30 to 100 times), the judgement of the respective regions may be performed from the foregoing images. In the case where whether or not "one or more concave portions not having contour lines that are approximately parallel straight lines of 50 μm exist" is judged through visual inspection, and the two parallel lines exist in a straight line, the length of the straight lines of the two parallel lines is measured by using a scale function of a digital microscope, whereby whether or not these lines are the "approximately parallel straight lines of 50 μm" can be judged. Specifically, the results evaluated by the method described in the section of Examples are meant.

However, it is preferred that one or more concave portions not having contour lines that are approximately parallel straight lines of 50 μm exist through observation from the side of the surface (α) of the resin layer, and it is more preferred that all of the concave portions in the region (D) do not have contour lines that are approximately parallel straight lines of 50 μm through observation from the side of the surface (α).

When the concave portion not having contour lines that are approximately parallel straight lines of 50 μm exists through observation from the side of the surface (α) of the resin layer, it is possible to provide a pressure sensitive adhesive sheet in which the air escape property and the pressure sensitive adhesion characteristics are more improved with a well balance while having excellent water resistance.

In one embodiment of the present invention, it is preferred that the concave portion existing on the surface (α) of the resin layer 12 satisfies the following requirements.

<Requirement (I-2)>

In one embodiment of the present invention, the concave portion 13 existing on the surface (α) 12a of the resin layer 12 is preferably one having a maximum height difference of 0.5 μm or more, as shown in FIG. 2.

The "concave portion" as prescribed herein refers to a concave having a maximum height difference of 0.5 μm or more, a site having a height difference of 0.5 μm or more may exist in any one part of the concave portion, and it is not necessary that the concave portion has a height difference of 0.5 μm or more over the whole region.

Figure 3:
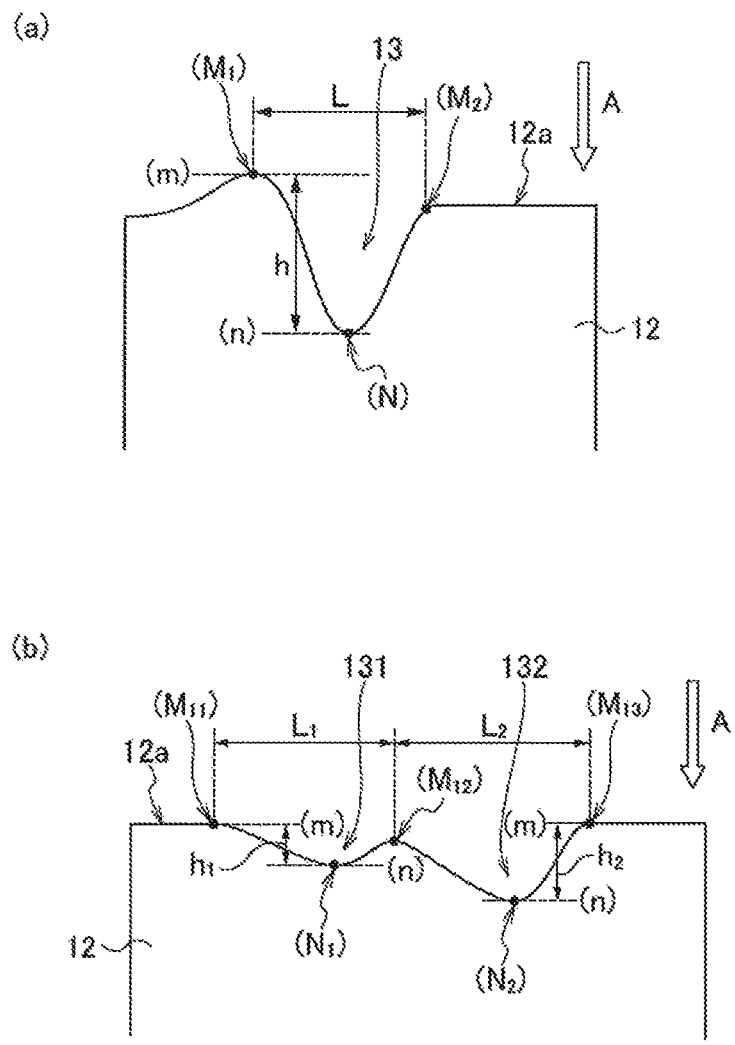
FIG. 3 is a schematic cross sectional view showing an example of the shape of the resin layer on the side of the surface (α) of the pressure sensitive adhesive sheet of the present invention.

FIG. 3 is a schematic cross sectional view showing an example of the shape of the side of the surface (α) of the resin layer which the pressure sensitive adhesive sheet of the present invention has.

Like the concave portion 13 shown in FIG. 3(a), the shape of an ordinary concave portion has two mountain parts ($M_1$) and ($M_2$) and a valley part (N). The "maximum height difference" of the concave portion in the present invention means the length of the difference (h) between the highest position (m) of the two mountain parts ($M_1$) and ($M_2$) (in FIG. 3(a), the maximum point of the mountain part ($M_1$)) and the lowest position (n) thereof (in FIG. 3(a), the minimum point of the valley part (N)), relative to the thickness direction of the resin layer 12.

It may be considered that the case as in FIG. 3(b) has two concave portions of a concave portion 131 having two mountain parts ($M_{11}$) and ($M_{12}$) and a valley part ($N_1$), and a concave portion 132 having two mountain parts ($M_{12}$) and ($M_{13}$) and a valley part ($N_2$). In this case, the length of the difference ($h_1$) between the maximum point of the mountain part ($M_{11}$) and the minimum point of the valley part ($N_1$) indicates the maximum height difference of the concave portion 131, and the length of the difference ($h_2$) between the maximum point of the mountain part ($M_{13}$) and the minimum point of the valley part ($N_2$) indicates the maximum height difference of the concave portion 132.

From the viewpoint of improving the air escape property of the pressure sensitive adhesive sheet, from the viewpoint of keeping the appearance of the pressure sensitive adhesive sheet good, and from the viewpoint of the shape stability of the pressure sensitive adhesive sheet, a maximum value of the maximum height difference of one concave portion is preferably 1.0 µm or more and not more than the thickness of the resin layer, more preferably 3.0 µm or more and not more than the thickness of the resin layer, and still more preferably 5.0 µm or more and not more than the thickness of the resin layer.

From the viewpoint of improving the air escape property of the pressure sensitive adhesive sheet and from the viewpoint of bettering the pressure sensitive adhesiveness of the pressure sensitive adhesive sheet, an average value of the width of the concave portions is preferably 1 to 500 µm, more preferably 3 to 400 µm, and still more preferably 5 to 300 µm.

In the present invention, the width of the concave portion means the distance between the maximum points of the two mountain parts, and in the concave portion 13 shown in FIG. 3(*a*), the width indicates the distance L between the mountain part ($M_1$) and the mountain part ($M_2$). In the concave portion 131 shown in FIG. 3(*b*), the width indicates the distance $L_1$ between the mountain part ($M_{11}$) and the mountain part ($M_{12}$), and in the concave portion 132 therein, the width indicates the distance $L_2$ between the mountain part ($M_{13}$) and the mountain part ($M_{12}$).

In a planar view of the pressure sensitive adhesive sheet of the present invention (when the sheet is viewed from directly above), when the concave portion has a long side and a short side, the short side is the width.

From the viewpoint of improving the air escape property of the pressure sensitive adhesive sheet and from the viewpoint of bettering the adhesiveness of the pressure sensitive adhesive sheet, a ratio of the maximum value of maximum height difference of one concave portion to the average value of the width [(maximum value of maximum height difference)/(average value of width)] (in the concave portion 13 shown in FIG. 3(*a*), the ratio is "h/L") is preferably 1/500 to 100/1, more preferably 3/400 to 70/3, and still more preferably 1/60 to 10/1.

<Requirement (I-3)>

In one embodiment of the present invention, from the viewpoint of providing a pressure sensitive adhesive sheet in which a concave portion and a flat face satisfying the requirements (Ii) and (Iii) are formed on the surface (α) of the resin layer, it is preferred that the aforementioned concave portion is not one formed by using the release material having an embossed pattern.

As the "concave portion formed by using the release material having an embossed pattern", for example, the following concave portions are exemplified and are distinguished from the concave portion of the aforementioned embodiment.

A concave portion formed by pressing a release sheet applied with an embossed pattern onto the flat surface which the pressure sensitive adhesive layer formed of the pressure sensitive adhesive composition has and transferring the emboss pattern.

A concave portion exposed on a surface of the pressure sensitive adhesive layer, when by using a release sheet having an embossed pattern applied on a release-treated face thereof, the pressure sensitive adhesive composition is coated on the release-treated face to form a pressure sensitive adhesive layer, followed by removing the release sheet.

These concave portions occasionally involve a problem in the shape retentivity, so that it may be considered that the air escape property of the pressure sensitive adhesive sheet is affected.

In one embodiment of the present invention, it is preferred that one or more irregular concave portions exist in a region (Q) surrounded by a square having an edge length of 1 mm that is freely-selected on the surface (α) of the resin layer, and it is more preferred that a plurality of the irregular concave portions exist.

When at least one irregular concave portion exists in the region (Q), a pressure sensitive adhesive sheet having more improved various characteristics, such as air escape property, pressure sensitive adhesion characteristics, with a well balance can be provided.

<Characteristic Requirements Regarding Flat Face Existing on Surface (α)>

In one embodiment of the present invention, it is preferred that the flat face existing on the surface (α) satisfies the following requirements.

In the pressure sensitive adhesive sheet of the present invention, as shown in FIGS. 1(*a*) to 1(*d*), though the concave portion 13 and the flat face 14 exist on the surface (α) 12*a* of the resin layer 12, such a flat face is preferably one satisfying any one of the following requirements (I-4) to (I-8).

Requirement (I-4): One or more flat faces (f1) having an area where a region surrounded by a circle having a diameter of at least 100 µm (preferably a diameter of 150 µm, and more preferably a diameter of 200 µm) is selectable exist on the surface (α) of the resin layer.

Requirement (I-5): One or more flat faces (f2) having an area of 0.2 mm² or more (preferably 0.3 mm² or more, and more preferably 0.4 mm² or more) exist on the surface (α) of the resin layer.

Requirement (I-6): The shape of the flat face on the surface (α) of the resin layer is irregular.

Among the plural flat faces, with respect to one or more flat faces (S) excluding flat faces having a cumulative relative frequency of 30% or less determined by adding the relative frequency from the respective flat faces with a smaller area, in the region (D) containing the one or more flat faces (S), it is preferred that the following requirements (I-7) and/or (I-8) is satisfied.

Requirement (I-7): A skewness Sk value relative to a normal distribution curve between the area and the frequency of each of the one or more flat faces (S) is 1.0 or more.

Requirement (I-8): A kurtosis Ku value relative to a normal distribution curve between the area and the frequency of each of the one or more flat faces (S) is 1.8 or more.

When any one of the requirements (I-4) to (I-8) is satisfied, a pressure sensitive adhesive sheet having more improved various characteristics, such as air escape property, pressure sensitive adhesion characteristics, with a well balance can be provided.

<Requirement (I-4)>

FIG. 2 is a schematic planar view of the surface ($\alpha$) on observing from the side of the surface ($\alpha$) of the resin layer which the pressure sensitive adhesive sheet of the present invention has.

In one embodiment of the present invention, it is preferred that one or more flat faces (f1) having an area where a region surrounded by a circle having a diameter of at least 100 μm (preferably a diameter of 150 μm, and more preferably a diameter of 200 μm) is selectable exist on the surface ($\alpha$) of the resin layer, and it is more preferred that a plurality of the flat faces (f1) exist.

When the flat face(s) (f1) exists on the surface ($\alpha$), a pressure sensitive adhesive part to an adherend on the surface ($\alpha$) is sufficient, and therefore, the adhesion to the adherend can be improved, and a pressure sensitive adhesive sheet with a higher pressure sensitive adhesive strength can be provided.

In the aforementioned embodiment of the present invention, in the region (D) of 8 mm in length×10 mm in width as freely-selected on the surface ($\alpha$) of the resin layer, it is preferred that the one or more flat faces (f1) exist, and it is more preferred that a plurality of the flat faces (f1) exist.

In the aforementioned embodiment, it is not necessary that all of the flat faces existing on the surface ($\alpha$) of the resin layer or in the region (D) is corresponding to the flat face (f1), and the flat faces existing on the surface ($\alpha$) or in the region (D) may contain the flat face (f1).

In the conventional pressure sensitive adhesive sheet, in a pressure sensitive adhesive layer in which a convex portion or a streak-like portion formed due to stringiness between the pressure sensitive adhesive layer and the roll for molding is formed on the surface thereof, the flat face having an area where a region surrounded by a circle having a diameter of 100 μm is selectable hardly exists in the convex portion or streak-like portion existing on the exposed surface, and the pressure sensitive adhesive layer adheres to an adherend by means of point contact or line contact, and therefore, there is a case where the pressure sensitive adhesion characteristics to the adherend are inferior. In addition, in the conventional pressure sensitive adhesive sheet, even in the case where the surface of the pressure sensitive adhesive layer is processed by the sandblasting method, the flat face having an area where a region surrounded by a circle having a diameter of 100 μl is selectable hardly exists in a region of a convex portion of uneven shape formed on the exposed surface of the pressure sensitive adhesive layer, and the pressure sensitive adhesive layer adheres to an adherend by means of point contact, and therefore, there is a case where the pressure sensitive adhesion characteristics to the adherend are inferior.

In the flat face existing on the surface of the pressure sensitive adhesive layer in which unevennesses exist by transfer of an embossed pattern having a predetermined shape by general designing, the size, the shape, and the like are fixed, or flat faces having an approximately identical shape exist repeatedly, and it is difficult to improve the various characteristics selected from pressure sensitive adhesion characteristics, appearance, punching processability, and so on.

<Requirement (I-5)>

In another embodiment of the present invention, it is preferred that one or more flat faces (f2) having an area of 0.2 mm$^2$ or more (preferably 0.3 mm$^2$ or more, and more preferably 0.4 mm$^2$ or more) exist on the surface ($\alpha$) of the resin layer, and it is more preferred that a plurality of the flat faces (f2) exist.

When the flat face(s) (f2) exists on the surface ($\alpha$), a pressure sensitive adhesive part to an adherend on the surface ($\alpha$) is sufficient, and therefore, the adhesion to the adherend can be improved, and a pressure sensitive adhesive sheet with a higher pressure sensitive adhesive strength can be provided.

In the aforementioned embodiment of the present invention, in the region (D) of 8 mm in length×10 mm in width as freely-selected on the surface ($\alpha$) of the resin layer, it is preferred that the one or more flat faces (f2) exist, and it is more preferred that a plurality of the flat faces (f2) exist.

In the aforementioned embodiment, it is not necessary that all of the flat faces existing on the surface ($\alpha$) of the resin layer or in the region (D) is corresponding to the flat face (f2), and the flat faces existing on the surface ($\alpha$) or in the region (D) may contain the flat face (f2).

On the surface ($\alpha$) of the resin layer or in the region (D) of 8 mm in length×10 mm in width as freely-selected on the surface ($\alpha$), it is preferred that one or more flat faces (f12) corresponding to both of the flat faces (f1) and (f2) exist, and it is more preferred that a plurality of the flat faces (f12) exist.

In the present invention, for the judgement on whether or not the flat face (f1), (f2), or (f12) exists on the surface ($\alpha$) or in the region (D), an image resulting from observation of the flat face existing on the surface ($\alpha$) of the resin layer or in the region (D) of the targeted pressure sensitive adhesive sheet with a digital microscope (magnification: 30 to 100 times) is acquired, and the judgement on whether or not the region surrounded by a circle having a diameter of 100 μm is selectable or the calculation of the area of the flat face may be performed on the basis of the acquired image by using an image analysis software.

<Requirement (I-6)>

In one embodiment of the present invention, in the pressure sensitive adhesive sheet, it is preferred that a flat face having an irregular shape exists, as shown in FIG. 2. A regular flat face may exist on the surface ($\alpha$) of the resin layer. The irregular flat face existing on the surface ($\alpha$) of the resin layer may be a flat face having such an area that a region surrounded by a circle having a diameter of 100 μm is selectable through observation from the side of the surface ($\alpha$) of the resin layer, or may also be other flat face. For the judgement on whether or not the shape of the flat face is irregular, the surface ($\alpha$) of the resin layer is observed from the side of the surface ($\alpha$) of the resin layer through visual inspection or with a digital microscope (magnification: 30 to 100 times) and judged, and specifically, the results evaluated by the method described in the section of Examples are meant.

However, in one embodiment of the present invention, as shown in FIG. 2, it is preferred that one or more irregular flat faces 14 exist on the surface ($\alpha$) 12a of the resin layer 12, and it is more preferred that a plurality of the irregular flat faces 14 exist.

In one embodiment of the present invention, from the viewpoint of providing a pressure sensitive adhesive sheet having more excellent air escape property and pressure sensitive adhesion characteristics, though the shape of the concave portion 13 observed from the side of the surface ($\alpha$) is irregular, too, a regular concave portion may also exist. For the judgement on whether or not the irregular concave portion exists on the surface ($\alpha$) of the resin layer, the surface ($\alpha$) of the resin layer is observed from the side of the surface ($\alpha$) of the resin layer through visual inspection or with a digital microscope (magnification: 30 to 100 times)

and judged, and specifically, the results evaluated by the method described in the section of Examples are meant.

However, in one embodiment of the present invention, as shown in FIG. 2, it is preferred that one or more irregular concave portion 13 exist on the surface ($\alpha$) 12a of the resin layer 12, and it is more preferred that a plurality of the irregular concave portions 13 exist.

When the irregular concave portion exists on the surface ($\alpha$) of the resin layer, a pressure sensitive adhesive sheet having more improved air escape property and pressure sensitive adhesion characteristic with a good balance can be provided.

The length of the concave portion 13 in a planar view of the concave portion 13 existing on the surface ($\alpha$) is not particularly limited. Namely, the concave portion 13 includes one having a relatively long groove-like shape and one having a relatively short pit-like shape.

In the present invention, the term "irregular shape" does not mean a regular shape, such as a figure capable of drawing a center of a circle, an oval, or the like, a polygon, etc., but refers to a shape in which no regularity is present in the form, and no similarity is found in individual shapes. Specifically, the shapes of the flat face 14 and the concave portion 13 as shown in FIG. 2 are corresponding thereto.

On the other hand, examples of the "regular shape" but not the "irregular shape" include a circle, an oval, a polygon, and the like. In addition, in the present specification, the "polygon" refers to a figure capable of drawing diagonal lines in the inside thereof (without being protruded outside) and being surrounded by straight lines in which the sum of interior angles is 180×n (degrees) (n is a natural number). The polygon also includes one in which an edge part thereof has a round-shaped curvature.

For the judgement on whether or not the shape of the flat face or concave portion observed from the side of the surface ($\alpha$) is irregular, in principle, the shape of the targeted flat face or concave portion is observed from the side of the surface ($\alpha$) through visual inspection or with a digital microscope (magnification: 30 to 100 times) and judged.

However, the judgement may also be performed by selecting one to ten regions (D) of 8 mm in length×10 mm in width as freely-selected on the surface ($\alpha$) and observing the shape of the concave portion or flat face existing in each of the selected regions (D) from the side of the surface ($\alpha$) through visual inspection or with a digital microscope (magnification: 30 to 100 times). Namely, in all of the regions to be selected, if the irregular concave portion or flat face exists, it may also be considered that "the irregular concave portion or flat face exists on the surface ($\alpha$)". Similarly, in all of the regions to be selected, if the plural irregular concave portions or flat faces exist, it may be considered that "the plural irregular concave portions or flat faces exist on the surface ($\alpha$)".

It is preferred that the shape of the irregular flat face existing on the surface ($\alpha$) can be viewed through visual inspection from the side of the surface ($\alpha$).

Similarly, it is preferred that the shape of the irregular concave portion existing on the surface ($\alpha$) can be viewed through visual inspection from the side of the surface ($\alpha$).

As shown in FIG. 1(c) or FIG. 1(d), in the pressure sensitive adhesive sheet 2a or 2b in which the release material 22 is laminated on the surface ($\alpha$) 12a of the resin layer 12, when the release material 22 has been removed, the exposed surface ($\alpha$) is to be observed through visual inspection.

In one embodiment of the present invention, as shown in FIG. 2, a regular flat face may exist on the surface ($\alpha$) together with the irregular flat face 14.

However, an occupying area ratio of the irregular flat face existing on the surface ($\alpha$) relative to 100% of the whole area of the flat faces existing on the surface ($\alpha$) is preferably 80 to 100%, more preferably 90 to 100%, still more preferably 95 to 100%, and yet still more preferably 100%.

In one embodiment of the present invention, as shown in FIG. 2, a regular concave portion may exist on the surface ($\alpha$) together with the irregular concave portion 13.

However, an occupying area ratio of the irregular concave portion existing on the surface ($\alpha$) relative to 100% of the whole area of the concave portions existing on the surface ($\alpha$) is preferably 80 to 100%, more preferably 90 to 100%, still more preferably 95 to 100%, and yet still more preferably 100%.

The aforementioned "occupying area ratio of the concave portion or flat face" can be calculated by acquiring an image of the surface ($\alpha$) with a digital microscope (magnification: 30 to 100 times) and subjecting the image to image processing (binarization processing).

One to ten regions (D) of 8 mm in length×10 mm in width as freely-selected on the surface ($\alpha$) are selected; images of the regions are acquired with a digital microscope (magnification: 30 to 100 times); the values of the "occupying area ratio of the concave portion or flat face" of the respective regions are calculated from the image; and an average of the values of the selected one to ten regions can also be considered to be the "occupying area ratio of the concave portion or flat face" existing on the surface ($\alpha$) of the resin layer of the targeted pressure sensitive adhesive sheet.

In one embodiment of the present invention, from the viewpoint of providing a pressure sensitive adhesive sheet having more improved various characteristics, such as air escape property, pressure sensitive adhesion characteristics, with a well balance, it is preferred that the shapes of the concave portion and the flat face existing on the surface ($\alpha$) of the resin layer are not one having a shape to be a fixed repeating unit.

In one embodiment of the present invention, from the viewpoint of providing a pressure sensitive adhesive sheet having more improved various characteristics, such as air escape property, pressure sensitive adhesion characteristics, with a well balance, it is preferred that the plural flat faces exist on the surface ($\alpha$) of the resin layer, and the positions at which the plural flat faces exist do not have any periodicity. In addition, from the same viewpoint, it is preferred that the plural concave portions exist on the surface ($\alpha$) of the resin layer, and the positions at which the plural concave portions exist do not have any periodicity.

In the present invention, the wording "the positions at which the plural concave portions or flat faces exist do not have any periodicity" means that on the surface ($\alpha$) of the resin layer, the positions at which the plural concave portions or flat faces exist do not have the same repeating pattern and are in a random state.

The judgement on whether or not "the shapes of the concave portion and the flat face are not one having a shape to be a fixed repeating unit" and the judgement on whether or not "the positions at which the plural concave portions or flat faces exist do not have any periodicity" can be performed by the same method as the aforementioned judgement method on whether or not "the irregular concave portion or flat face exists on the surface ($\alpha$) of the resin layer".

<Flat Face (S)>

The "flat face (S)" existing on the surface (α) of the resin layer refers to a remaining flat face resulting from excluding flat faces having a cumulative relative frequency of 30% or less determined by adding the relative frequency from the respective flat faces with a smaller area among the plural flat faces existing in the region (D).

In the present invention, the exclusion of the "flat faces having a cumulative relative frequency of 30% or less determined by adding the relative frequency from the respective flat faces with a smaller area" resides in the following reason.

Namely, on acquiring an image of the region (D) of 8 mm in length×10 mm in width as freely-selected with a digital microscope, a flat face coming near to an edge portion of the region (D) is occasionally cut by four sides of a rectangle as boundary lines of the region (D). This "cut flat face" is variable with a method of selecting the region (D) and is not a flat face actually existing on the surface (α).

In this way, when an influence of data of the cut flat face which does not actually exist, inclusive of the flat face cut by the four sides of a rectangle as boundary lines of the region (D), becomes large, there is a concern that the data become data far from the actual data.

Now, almost all of the "flat face cut by a rectangle as boundary lines of the region (D)" is included in the "flat faces having a cumulative relative frequency of 30% or less determined by adding the relative frequency from the respective flat faces with a smaller area".

Accordingly, in the present invention, the standard deviation, the skewness, and the kurtosis of the flat faces existing in the region (D) are not reviewed, but the standard deviation, the skewness, and the kurtosis of the "flat faces (S) excluding flat faces having a cumulative relative frequency of 30% or less determined by adding the relative frequency from the respective flat faces with a smaller area" are calculated. According to this, the influences against the values of the standard deviation, the skewness, and the kurtosis affected by the "flat face cut by a rectangle as boundary lines of the region (D)" which does not actually exist are controlled small.

<Requirement (I-7)>

In one embodiment of the present invention, in the pressure sensitive adhesive sheet, it is preferred that in the region (D) of 8 mm in length×10 mm in width as freely-selected on the surface (α) of the resin layer, plural flat faces exist, and a skewness Sk value relative to a normal distribution curve between the area and the frequency of each of one or more flat faces (S) excluding flat faces having a cumulative relative frequency of 30% or less determined by adding a relative frequency from the plural existing flat faces with a smaller area is 1 or more.

In the present invention, the "skewness Sk value" as prescribed in the requirement (I-7) statistically expresses a degree of asymmetry relative to a normal distribution curve between the area and the frequency of the flat face (S).

When the skewness Sk value is 0, the distribution curve between the area and the frequency of the flat face (S) has a bilaterally symmetrical shape.

When the skewness Sk value is more than 0 (the skewness Sk value is a positive value), the distribution curve between the area and the frequency of the flat face (S) has a shape in which the peak is far to the left, and the base of the distribution curve extends to the right.

When the skewness Sk value is less than 0 (the skewness Sk value is a negative value), the distribution curve between the area and the frequency of the flat face (S) has a shape in which the peak is far to the right, and the base of the distribution curve extends to the left.

It is expressed that as an absolute value of the skewness Sk value is larger, the skew becomes larger.

In the requirement (I-7), it is prescribed that the distribution curve between the area and the frequency of the flat faces (S) existing on the surface (α) is skewed toward the side where the frequency of the flat faces (S) having an area smaller than an average value of the area of the flat faces (S) is high, and the width of the distribution of the area of the flat faces (S) is wide.

It may be considered that such a distribution is caused due to the existence of the flat faces (S) having a small area in the surroundings of the flat faces (S) having a large area. It may be considered that the pressure sensitive adhesion is improved in the large flat faces, whereas the air escape property may be secured by the concave portions neighboring with small flat faces in the surroundings thereof.

In one embodiment of the present invention, as expressed by the skewness Sk value as prescribed in the requirement (I-7), according to the distribution in which the flat faces (S) having a small area exist in the surroundings of the flat faces (S) having a large area existing on the surface (α) of the pressure sensitive adhesive layer, an appropriate scattering is generated in the contact between the pressure sensitive adhesive layer and the adherend surface, whereby a pressure sensitive adhesive sheet in which various characteristics, such as air escape property, pressure sensitive adhesion characteristics, appearance, punching property, are improved with a well balance can be provided.

In one embodiment of the present invention, the "skewness Sk value" as prescribed in the requirement (I-7) is preferably 1.0 or more, more preferably 1.1 or more, still more preferably 1.2 or more, and yet still more preferably 1.3 or more.

On the surface of the pressure sensitive adhesive layer where unevennesses exist, which is formed by using a release material having an emboss pattern of a predetermined shape by a general design, plural convex faces exist. In the plural flat faces (convex faces) formed by using the release material having an emboss pattern, which exist on the surface of the pressure sensitive adhesive layer, the formation of the emboss pattern becomes complicated though it is largely depending upon the design of the emboss pattern. Therefore, in many cases, the flat faces which are constant in size, shape, etc., or have the same shape exist in duplicate, and there is a fixed regularity in the shape.

In the case where the plural flat faces formed by using the release material having an emboss pattern exist on the surface of the pressure sensitive adhesive layer, in many cases, the regularity is existent in the shape of the flat face. Therefore, there is a less opportunity that the skewness Sk value as prescribed in the aforementioned requirement (I-7) is more than 1.0.

In the present invention, the skewness Sk value relative to a normal distribution curve between the area and the frequency of each of the one or more flat faces (S) can be calculated on the basis of the following expression (2) by using a graph software (Excel, available from Microsoft Japan Co., Ltd.).

$$Sk = \frac{n}{(n-1)(n-2)} \sum_{i=1}^{n} \frac{(x_i - \mu)^3}{s^3} \qquad (2)$$

In the expression (2), n represents the number of flat faces (S); $x_i$ represents an area of each of flat faces (S) (i: 1, 2, ... n); μ represents an average value of areas of respective flat faces (S); and s represents a sample standard deviation.
<Requirement (I-8)>

In one embodiment of the present invention, in the pressure sensitive adhesive sheet, it is preferred that in the region (D) of 8 mm in length×10 mm in width as freely-selected on the surface (α) of the resin layer, plural flat faces exist, and a kurtosis Ku value relative to a normal distribution curve between the area and the frequency of each of one or more flat faces (S) excluding flat faces having a cumulative relative frequency of 30% or less determined by adding a relative frequency from the plural existing flat faces with a smaller area is 1.8 or more.

In the present invention, the "kurtosis Ku value" as prescribed in the requirement (I-8) statistically expresses a degree of difference of a curve of a peak of distribution and a base of distribution curve from a normal distribution curve.

When the kurtosis Ku value is 0, a distribution curve which is substantially completely coincident with the normal distribution curve is provided.

When the kurtosis Ku value is more than 0 (the kurtosis Ku value is a positive value), the distribution curve has a sharp peak as compared with the normal distribution curve, and the distribution curve has a heavy base, namely, a shape in which the base of the distribution curve expands is revealed.

When the kurtosis Ku value is less than 0 (the kurtosis Ku value is a negative value), the distribution curve has a flat peak as compared with the normal distribution curve, and the distribution curve has a light base, namely, a shape in which the area of the base of the distribution curve is small is revealed.

In the requirement (I-8), it is prescribed that the distribution curve between the area and the frequency of the flat faces (S) existing on the surface (α) has a shaper peak than the normal distribution curve and has a shape in which the base of the distribution curve expands.

What the skewness Sk value of the area of the flat faces (S) is 1.0 or more, and the kurtosis Ku value is 1.8 or more means that the distribution curve between the area and the frequency of the flat faces (S) has a shape far from the normal distribution while having a numerical bias toward the smaller side.

That is, the distribution of the flat faces (S) existing on the surface (α) is a distribution in which while thoroughly securing a numerical proportion of the flat faces (S) having a small area, the flat faces (S) having a large area also exist in a proportion of the lowest limit or more. Accordingly, an appropriate scattering is generated in the contact between the pressure sensitive adhesive layer and the adhesive surface, whereby a pressure sensitive adhesive sheet in which various characteristics, such as air escape property, pressure sensitive adhesion characteristics, appearance, punching property, are improved with a well balance can be provided.

In one embodiment of the present invention, though the kurtosis Ku value as prescribed in the requirement (I-8) is preferably 0.5 or more, more preferably 1.0 or more, still more preferably 1.5 or more, and yet still more preferably 1.8 or more, it is even yet still more preferably 1.9 or more, even still more preferably 2.0 or more, and even still more further preferably 2.1 or more.

In the case where the plural flat faces (convex faces) formed by using the release material having an emboss pattern of a predetermined shape by a general design exist on the surface of a pressure sensitive adhesive layer, in many cases, the regularity is existent in the shape of the flat face. Therefore, there is a less opportunity that the kurtosis Ku value as prescribed in the aforementioned requirement (I-8) is more than 1.8.

In the present invention, the kurtosis Ku value relative to a normal distribution curve between the area and the frequency of each of the one or more flat faces (S) can be calculated on the basis of the following expression (3) by using a graph software (Excel, available from Microsoft Japan Co., Ltd.).

$$Ku = \frac{n(n+1)}{(n-1)(n-2)(n-3)} \sum_{i=1}^{n} \frac{(x_i - \mu)^4}{s^4} - \frac{3(n-1)^2}{(n-2)(n-3)} \quad (3)$$

In the expression (3), n represents the number of flat faces (S); $x_i$ represents an area of each of flat faces (S) (i: 1, 2, ... n); μ represents an average value of areas of respective flat faces (S); and s represents a sample standard deviation.
[Requirements Regarding Cross Section (P1)]

In the pressure sensitive adhesive sheet of the present invention, in at least one cross section (P1) of two cross sections of the pressure sensitive adhesive sheet resulting from freely-selecting a region (P) surrounded by a square having an edge length of 5 mm on the surface (α) of the resin layer and cutting the region (P) with a plane surface going through each of two diagonal lines of the square and being perpendicular to the surface (α), plural concave portions satisfying the following requirement (IIa) and a flat face satisfying the following requirement (IIb) exist.

Requirement (IIa): Plural concave portions having a maximum height difference of 40% or more of a total thickness of the resin layer and having a different shape of the cut part from each other exist on the side of the surface (α) of the cross section (P1).

Requirement (IIb): A flat portion corresponding to the cut part of the flat face existing in the region (P) and approximately parallel to the surface of the substrate or release material coming into contact with the resin layer exists on the side of the surface (α) of the cross section (P1).

Figure 4:
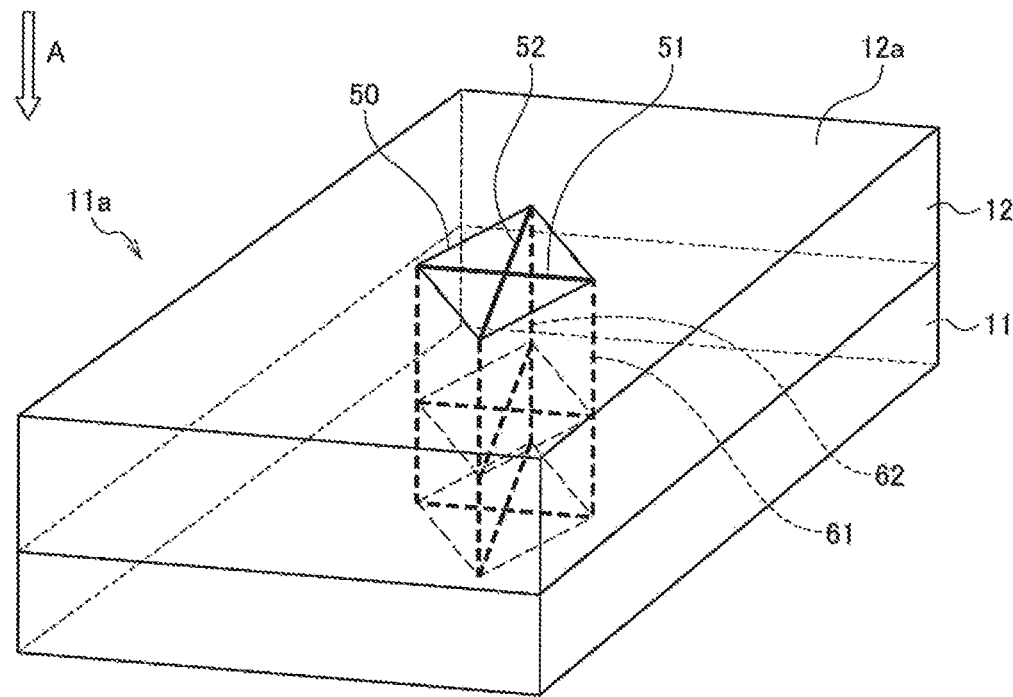
FIG. 4 is a view for explaining a method for acquiring the "two cross sections of the pressure sensitive adhesive sheet" as prescribed in the present invention and is a perspective view of the pressure sensitive adhesive sheet of one embodiment of the present invention.

First of all, a flow until acquiring the aforementioned "two cross sections of the pressure sensitive adhesive sheet" is described while properly referring to FIG. 4.

FIG. 4 is a view for explaining a method for acquiring the "two cross sections of the pressure sensitive adhesive sheet" as prescribed in the present invention and is a perspective view of the pressure sensitive adhesive sheet of one embodiment of the present invention. In FIG. 4, as one example, a perspective view of a pressure sensitive adhesive sheet 11a having a configuration approximately identical with a pressure sensitive adhesive sheet 1a shown in FIG. 1(a) is shown, and the description regarding the concave portion and the flat face existing on the surface (α) 12a of the resin layer 12 is omitted.

First of all, the region (P) surrounded by a square 50 having an edge length of 5 mm is freely-selected on the surface (α) 12a of the resin layer 12. On this occasion, with respect to the region (P) to be selected, the position on the surface (α) 12a, the direction of the square 50, and so on are not limited.

Then, two cross sections 61 and 62 of the pressure sensitive adhesive sheet on cutting the region (P) with a plane surface going through each of two diagonal lines 51 and 52 of the square 50 configuring the region (P) and being perpendicular to the surface (α) 12a are considered.

Namely, in the case of cutting the region (P) with a plane surface perpendicular to the surface (α) 12*a* along the thickness direction A so as to go through the diagonal line 51, the cross section 61 of the pressure sensitive adhesive sheet is obtained.

Meanwhile, in the case of cutting the region (P) with a plane surface perpendicular to the surface (α) 12*a* along the thickness direction A so as to go through the diagonal line 52, the cross section 62 of the pressure sensitive adhesive sheet is obtained.

In the present invention, with respect to the thus acquired two cross sections 61 and 62 of the pressure sensitive adhesive sheet, the cross section where the plural concave portions satisfying the aforementioned requirement (IIa) and the flat face satisfying the requirement (IIb) exist is expressed as the "cross section (P1)".

Namely, in the present invention, it is required that at least one of the cross sections 61 and 62 is the cross section (P1) where the plural concave portions satisfying the requirement (IIa) and the flat face satisfying the requirement (IIb) exist.

In one embodiment of the present invention, it is preferred that all of the two cross sections 61 and 62 are corresponding to the cross section (P1).

In the present invention, for the judgement on whether or not the two cross sections 61 and 62 are corresponding to the cross section (P1) where the plural concave portions satisfying the requirement (IIa) and the flat face satisfying the requirement (IIb) exist and the judgement on whether or not various requirements as described later are satisfied in the cross section (P1), the judgement is performed from an image of the targeted cross section acquired with a scanning electron microscope (magnification: 100 to 1,000 times).

Figure 5:
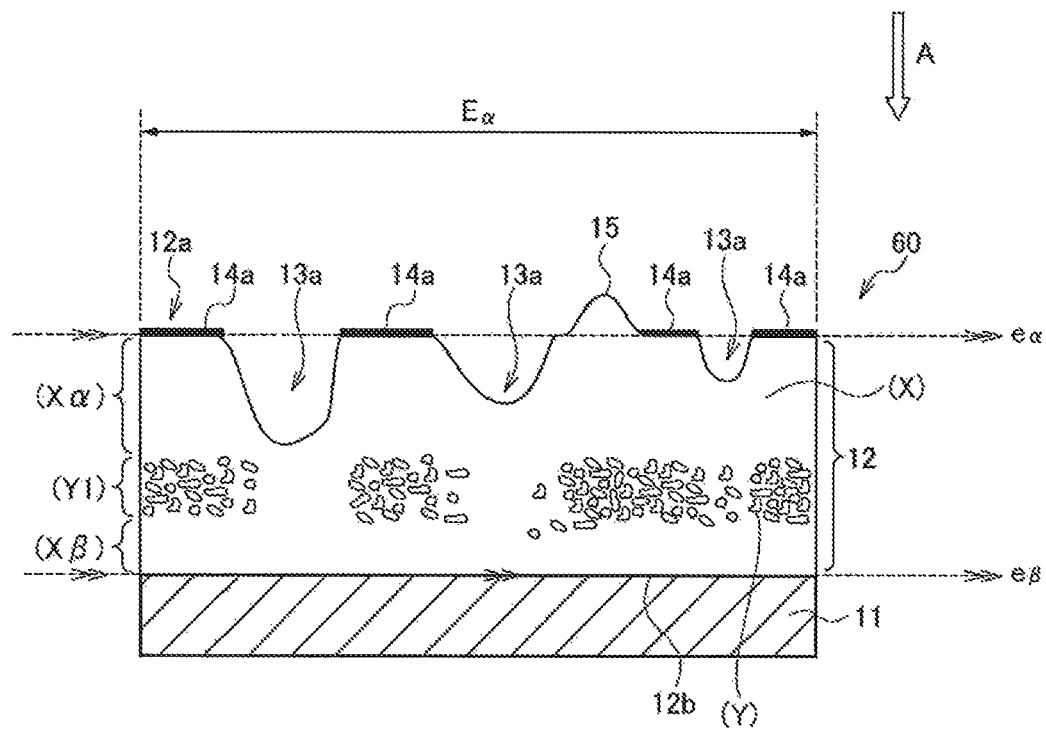
FIG. 5 is one example of a schematic view of the cross section (P1) as prescribed in the present invention.

FIG. 5 is one example of a schematic view of the cross section (P1) as prescribed in the present invention.

In the cross section (P1) 60 obtained by the aforementioned method, as shown in FIG. 5, at least plural concave portions 13*a* and flat portions 14*a* exist on the side of the surface (α) 12*a* of the cross section (P1) 60.

As shown in FIG. 5, a convex portion 15 may exist on the side of the surface (α) 12*a* of the cross section (P1) 60.

In the cross section (P1) 60, as in the requirement (IIa), the plural concave portions 13*a* having a maximum height difference of 40% or more of a total thickness of the resin layer 12 and having a different shape of the cut part from each other exist on the side of the surface (α) 12*a* of the aforementioned cross section.

The concave portions 13*a* having a maximum height difference of 40% or more of a total thickness of the resin layer 12 are a site playing a role of air-discharge channel which largely influences the air escape property of the pressure sensitive adhesive sheet.

In view of the matter that the shapes of the cut parts of the plural concave portions 13*a* are different from each other, regardless of before or after the pressure sensitive adhesive sheet is attached, when a certain force with fixed directionality is applied to the pressure sensitive adhesive sheet, all of the concave portions are deformed in the same way, whereby the state that a groove playing a role of air-discharge channel vanishes can be prevented. As a result, a pressure sensitive adhesive sheet with very excellent air escape property can be provided.

From the aforementioned viewpoints, in one embodiment of the present invention, it is preferred that in the cross section (P1) 60, among the plural concave portions 13*a* existing on the side of the surface (α) 12*a* as prescribed in the requirement (IIa), concave portions in which the shape of the cut part is irregular are contained.

The term "irregular shape" as referred to herein has the same meanings as those described above.

In the present invention, for the judgement on "whether or not the concave portions are corresponding to concave portions having a maximum height difference of 40% or more of a total thickness of the resin layer 12", the judgement on "whether or not the shapes of the cut parts of the plural concave portions are different from each other", and the judgement on "whether or not the shapes of the cut parts are corresponding to an irregular concave portion", the judgement is performed from an image of the cross section (P1) 60 acquired with a digital microscope or a scanning electron microscope, as described above.

Among the foregoing, for the judgement on "whether or not the shapes of the cut parts of the plural concave portions are different from each other", for example, in the case where the length of the width and the maximum height difference of the targeted two concave portions shown in the aforementioned image are different from each other, it may be judged such that "the two concave portions are different from each other in the shape of the cut part".

In the cross section (P1) 60, as in the requirement (IIb), the flat portion 14*a* corresponding to the cut part of the flat face 14 existing in the region (P) as shown in FIG. 2 and approximately parallel to the surface of the substrate or release material coming into contact with the resin layer 12 exists on the side of the surface (α) 12*a* of the aforementioned cross section.

The flat portion 14*a* is corresponding to the cut surface of the flat face 14 existing on the surface (α) and in the cross section (P1) 60, is corresponding to a part approximately parallel to the surface of the substrate or release material.

Namely, in the cross section (P1) 60 shown in FIG. 5, a straight light $e_\alpha$ going through the flat portions 14*a* is approximately parallel to a straight line $e_\beta$ going through the surface of a substrate 11 coming into contact with the resin layer 12. Accordingly, the flat portion 14*a* is differentiated from the convex portion 15 formed so as to rise upward relative to the straight line $e_\alpha$, as shown in FIG. 5.

The convex portion 15 which rises from the flat portion 14*a* and does not become approximately parallel to the straight line $e_\beta$ going through the surface of the substrate 11 (or the release material) coming into contact with the resin layer 12 may exist on the side of the surface (α) 12*a* of the cross section (P1) 60, as shown in FIG. 5.

The wording "approximately parallel" as referred to in the present invention includes, as a matter of course, the case where an angle formed by the straight line going through the flat portion 14*a* existing on the side of the surface (α) of the cross section (P1) and the straight line going through the surface of the substrate or the release material coming into contact with the resin layer is 0°, and also includes the case where a slight inclination to an extent such that the foregoing angle can be considered to be substantially parallel is present (for example, the case where the foregoing angle is 5° or less, and preferably 2° or less).

In one embodiment of the present invention, from the viewpoint of providing a pressure sensitive adhesive sheet in which the concave portion and the flat face satisfying the aforementioned requirements are formed on the surface (α) of the resin layer, it is preferred that the aforementioned concave portion is formed through self-formation of the aforementioned resin layer.

In the present invention, the "self-formation" means a phenomenon of naturally forming a disorganized profile in a process of self-sustaining formation of a resin layer, and in more detail, means a phenomenon of naturally forming a disorganized profile in a process of self-sustaining formation of a resin layer by drying a coating film formed of a composition that is a forming material for a resin layer.

The shape of the concave portion thus formed through self-formation of the resin layer in the manner as above may be controlled in some degree by controlling the drying condition or the kind and the content of the component in the composition that is a forming material for the resin layer, but differ from grooves to be formed through embossed pattern transfer, and it may be said that "it is substantially impossible to reproduce exactly the same shape". Accordingly, it may be said that the concave portion formed through self-formation of the resin layer has an irregular shape.

When the concave portion having an irregular shape is formed, the shape of the flat face also becomes irregular.

The process of formation of the concave portion formed through self-formation of the resin layer may be considered as follows.

First of all, at the time of forming a coating film made of the composition serving as a forming material for the resin layer, in the step of drying the coating film, contraction stress develops inside the coating film, and in the part where the bonding force of the resin has attenuated, the coating film is cracked inside it. With that, it may be considered that the resin around the cracked part flows into the space temporarily formed by cracking, thereby forming the concave portion on the surface ($\alpha$) of the resin layer.

It may be considered that when two coating films that differ in the resin content are formed, and the two coating films are then dried simultaneously, a contraction stress difference is generated inside the coating films being dried, whereby the coating film is liable to be cracked.

From the viewpoint of readily forming the concave portion, it is preferred to control the condition appropriately in consideration of the following matters. It may be considered that these matters act with each other in a complex form to facilitate the formation of the concave portion. In this connection, suitable embodiments of the respective matters for facilitating the formation of the concave portion are those as described in the corresponding sections as described later.

The kind, constituent monomers, molecular weight and content of the resin contained in the composition of the forming material for the coating film.

The kind of the crosslinking agent and the kind of the solvent contained in the composition of the forming material for the coating film.

The viscosity and the solid concentration of the composition of the forming material for the coating film.

The thickness of the coating film to be formed (when plural layers are formed, the thickness of each coating film).

The drying temperature and the drying time for the formed coating film.

In formation of the pressure sensitive adhesive layer in an ordinary pressure sensitive adhesive sheet, it is intended to form the pressure sensitive adhesive layer having a flat surface, and the aforementioned matters are suitably set in many cases.

On the other hand, in the present invention, the above matters are so set that the concave portion capable of contributing toward improvement of the air escape property of the pressure sensitive adhesive sheet can be formed, quite differing from those in the planning method for the pressure sensitive adhesive layer of ordinary pressure sensitive adhesive sheets.

Preferably, the aforementioned matters are suitably set in consideration of the flowability of the resin and the like contained in the coating film to be formed.

For example, in the case where fine particles are contained in the composition, by controlling the viscosity of the coating film formed of a composition containing a large amount of fine particles to fall within a suitable range, it is possible to suitably prevent the formed coating film from being mixed with any other coating film (a coating film containing a large amount of resin) while the predetermined flowability of the fine particles in the coating film is maintained as such. By such controlling, cracks are formed in the horizontal direction to facilitate formation of the concave portion in the coating film containing a large amount of resin.

As a result, it is possible to increase the proportion of the concave portion to be formed on the surface ($\alpha$) and to increase the proportion of the concave portions connecting to each other, thereby enabling a pressure sensitive adhesive sheet having a more superior air escape property to be provided.

Among the aforementioned matters, it is desirable to suitably control the kind, the constituent monomers, and the molecular weight of the resin and the resin content such that the resin contained in the coating film containing a large amount of the resin has a suitable viscoelasticity.

Namely, by suitably increasing the hardness of the coating film (the hardness to be determined by various factors, such as the viscoelasticity of resin, the viscosity of the coating liquid), the contract stress of the resin part (X) increases to facilitate the formation of a concave portion. When the hardness of the coating film is higher, the contraction stress becomes high to facilitate the formation of a concave portion, but when the coating film is too hard, the coatability thereof is worsened. In addition, when the resin elasticity is increased too much, the pressure sensitive adhesive strength of the resin layer to be formed from the coating film tends to lower. In consideration of these, it is desirable to suitably control the viscoelasticity of the resin.

In the case where fine particles are contained in the composition or the coating film, it may be considered that by suitably selecting the fine particles and the resin to make the dispersion condition of the fine particles appropriate, the degree of swelling of the thickness of the resin layer owing to the fine particles therein and the self-forming power of the concave portion can be controlled, and as a result, the concave portion is readily formed on the surface ($\alpha$).

Furthermore, in consideration of the crosslinking rate of the formed coating film (or the composition of the forming material), it is desirable that the aforementioned matters are suitably set.

Namely, in the case where the crosslinking rate of the coating film is too high, there is a concern that the coating film is cured before formation of the concave portion. In addition, in that case, the degree of cracking of the coating film and the size of the concave portion are affected.

The crosslinking rate of the coating film may be controlled by suitably defining the kind of the crosslinking agent and the kind of the solvent in the composition that is the forming material or by suitably setting the drying time and the drying temperature for the coating film.

In the case where the resin layer is a layer containing the resin part (X) containing a resin and the particle part (Y) consisting of fine particles, in the resin layer formed through the aforementioned self-formation, as shown in FIGS. 1($a$) to 1($d$) and FIG. 5, in the site where the concave portions exist on the surface ($\alpha$), the particle part (Y) tends to have such a distribution that the occupying ratio of the particle part (Y) becomes small as compared with the other parts.

As for this matter, it may be considered that in the process of self-formation of the resin layer, on the occasion where the concave portion is formed on the surface (α) of the resin layer, the fine particles existing at a position where the concave portion is formed move, whereby such a distribution is revealed.

Each configuration of the pressure sensitive adhesive sheet of the present invention is hereunder described.

[Substrate]

The substrate to be used in one embodiment of the present invention is not particularly limited, and examples thereof include a paper substrate, a resin film or sheet, and a substrate containing a paper substrate laminated with a resin, which may be appropriately selected depending upon the purpose of the pressure sensitive adhesive sheet of one embodiment of the present invention.

Examples of paper constituting the paper substrate include thin paper, medium quality paper, wood-free paper, impregnated paper, coated paper, art paper, parchment paper and glassine paper.

Examples of the resin constituting the resin film or sheet include a polyolefin resin, such as polyethylene, polypropylene; a vinyl resin, such as polyvinyl chloride, polyvinylidene chloride, polyvinyl alcohol, an ethylene-vinyl acetate copolymer, an ethylene-vinyl alcohol copolymer; a polyester resin, such as polyethylene terephthalate, polybutylene terephthalate, polyethylene naphthalate; polystyrene; an acrylonitrile-butadiene-styrene copolymer; cellulose triacetate; polycarbonate; a urethane resin, such as polyurethane, acrylic-modified polyurethane; polymethylpentene; polysulfone; polyetheretherketone; polyether sulfone; polyphenylene sulfide; a polyimide resin, such as polyether imide, polyimide; a polyamide resin; an acrylic resin; a fluorine resin.

Examples of the substrate containing a paper substrate laminated with a resin include laminated paper containing the aforementioned paper substrate laminated with a thermoplastic resin, such as polyethylene.

Among these substrates, a resin film or sheet is preferred, a film or sheet formed of a polyester resin is more preferred, and a film or sheet formed of polyethylene terephthalate (PET) is still more preferred.

In the case where the pressure sensitive adhesive sheet of the present invention is used for an application requiring the heat resistance, a film or sheet constituted of a resin selected from polyethylene naphthalate and a polyimide resin is preferred, and in the case where the pressure sensitive adhesive sheet is used for an application requiring the weather resistance, a film or sheet constituted of a resin selected from polyvinyl chloride, polyvinylidene chloride, an acrylic resin, and a fluorine resin is preferred.

Though the thickness of the substrate may be suitably set according to an application of the pressure sensitive adhesive sheet of the present invention, from the viewpoint of handleability and economy, it is preferably 5 to 1,000 μm, more preferably 10 to 500 μm, still more preferably 12 to 250 μm, and yet still more preferably 15 to 150 μm.

The substrate may further contain various additives, such as an ultraviolet ray absorbent, a light stabilizer, an antioxidant, an antistatic agent, a slipping agent, an antiblocking agent, a colorant.

From the viewpoint of improving the blister resistance of the resulting pressure sensitive adhesive sheet, the substrate to be used in one embodiment of the present invention is preferably a non-air permeable substrate, and specifically, a substrate having a metal layer on the surface of the aforementioned resin film or sheet is preferred.

Examples of the metal which is contained in the metal layer include a metal having metallic gloss, such as aluminum, tin, chromium and titanium.

Examples of the method of forming the metal layer include a method of vapor-depositing the aforementioned metal by the PVD method, such as vacuum vapor deposition, sputtering, ion plating; a method of attaching a metal foil formed of the aforementioned metal with an ordinary pressure sensitive adhesive. Among those, a method of vapor-depositing the aforementioned metal by the PVD method is preferred.

Furthermore, in the case where a resin film or sheet is used as the substrate, from the viewpoint of improving the adhesion to the resin layer to be laminated on the resin film or sheet, the surface of the resin film or sheet may be subjected to a surface treatment by an oxidizing method, a roughening method, or the like, or may be subjected to a primer treatment.

Examples of the oxidizing method include a corona discharge treatment, a plasma discharge treatment, a chromic acid treatment (wet process), a hot air treatment, an ozone treatment, and an ultraviolet ray irradiation treatment, and examples of the roughening treatment include a sand blasting treatment and a solvent treatment.

[Release Material]

As the release material to be used in one embodiment of the present invention, a release sheet having both surfaces subjected to a release treatment, a release sheet having one surface subjected to a release treatment, and the like are usable, and examples thereof include a substrate for the release material having coated thereon a release agent.

The release treatment is preferably performed on a flat release material without a relief shape formed thereon (for example, a release material having no emboss pattern formed thereon).

Examples of the substrate for the release material include the paper substrate, the resin film or sheet, and the substrate containing a paper substrate laminated with a resin described above used as the substrate of the pressure sensitive adhesive sheet of one embodiment of the present invention.

Examples of the release agent include a rubber elastomer, such as a silicone resin, an olefin resin, an isoprene resin and a butadiene resin, and a long-chain alkyl resin, an alkyd resin, and a fluorine resin.

Though the thickness of the release material is not particularly limited, it is preferably 10 to 200 μm, more preferably 25 to 170 μm, and still more preferably 35 to 80 μm.

[Resin Layer]

As shown in FIG. 1, the resin layer 12 which the pressure sensitive adhesive sheet of the present invention has is preferably one containing the resin part (X) containing a resin and the particle part (Y) consisting of fine particles.

The resin part (X) means a part containing a component other than the fine particles to be contained in the resin layer. Namely, not only the resin but also a component other than the fine particles, such as a tackifier, a crosslinking agent, an ordinary additive, is included in the "resin part (X)".

Meanwhile, the particle part (Y) means a part consisting of fine particles contained in the resin layer.

When the particle part (Y) is contained in the resin layer, the shape retentive property after being attached can be improved, and in the case of using the resulting pressure sensitive adhesive sheet at a high temperature, generation of blister can be effectively inhibited.

Regarding the configuration of distribution of the resin part (X) and the particle part (Y) in the resin layer 12, the resin parts (X) and the particle parts (Y) may be distributed almost evenly as one configuration, or as a different configuration, a site mainly containing the resin parts (X) and a site mainly containing the particle parts (Y) may be locally divided.

It is preferred that the resin layer which the pressure sensitive adhesive sheet of one embodiment of the present invention has additionally has a void part (Z) in addition to the resin part (X) and the particle part (Y). When the resin layer has the void part (Z), the blister resistance of the pressure sensitive adhesive sheet can be improved.

The void part (Z) includes voids existing between the aforementioned fine particles as well as, when the aforementioned fine particles are secondary particles, voids existing inside the secondary particles.

In the case where the resin layer has a multilayer structure, even though the void part (Z) exists in the process of forming the resin layer or just after formation of the layer, the resin part (X) may flow into the void part (Z), and therefore, the voids may disappear to give a resin layer not having the void part (Z).

However, even in the case where the void part (Z) having existed in the resin layer for a period of time has disappeared, in the pressure sensitive adhesive sheet that is one embodiment of the present invention, the concave portion exists on the surface ($\alpha$) of the resin layer, and therefore, the air escape property is good; and the resin layer has the particle part (Y), and therefore, the blister resistance is excellent, too.

From the viewpoint of improving the air escape property and the blister resistance of the pressure sensitive adhesive sheet, the shear storage elastic modulus at 100° C. of the resin layer which the pressure sensitive adhesive sheet of one embodiment of the present invention has is preferably $9.0 \times 10^3$ Pa or more, more preferably $1.0 \times 10^4$ Pa or more, and still more preferably $2.0 \times 10^4$ Pa or more.

In the present invention, the shear storage elastic modulus at 100° C. of the resin layer means a value measured with a viscoelastometer (for example, an apparatus name: "DYNAMIC ANALYZER RDA II", manufactured by Rheometrics Inc.) at a frequency of 1 Hz.

The total thickness of the resin layer is preferably 1 to 300 µm, more preferably 5 to 150 µm, and still more preferably 10 to 75 µm.

In the pressure sensitive adhesive sheet of the present invention, at least the surface ($\alpha$) of the resin layer on the side opposite to the side on which at least the substrate or the release material is provided has pressure sensitive adhesiveness, but the surface ($\beta$) of the resin layer on the side on which the substrate or the release material is provided may also has pressure sensitive adhesiveness.

The pressure sensitive adhesive strength of the surface ($\alpha$) of the resin layer of the pressure sensitive adhesive sheet of one embodiment of the present invention is preferably 0.5 N/25 mm or more, more preferably 2.0 N/25 mm or more, still more preferably 3.0 N/25 mm or more, yet still more preferably 4.0 N/25 mm or more, and even yet still more preferably 7.0 N/25 mm or more.

In the case where the surface ($\beta$) of the resin layer also has pressure sensitive adhesiveness, the pressure sensitive adhesive strength of the surface ($\beta$) preferably belongs to the aforementioned range.

The value of the pressure sensitive adhesive strength of the pressure sensitive adhesive sheet means a value measured by the method described in Examples.

<Multilayer Structure of Resin Layer>

The resin layer may be a multilayer structure configured of two or more layers.

As the resin layer that is such a multilayer structure, there is exemplified a multilayer structure formed by laminating a layer (X$\beta$) mainly containing the resin part (X), a layer (Y1) containing the particle part (Y) in an amount of 15% by mass or more, and a layer (X$\alpha$) mainly containing the resin part (X) in this order from the side on which the substrate or the release material is provided, like in the pressure sensitive adhesive sheet 1a in FIG. 1.

The configuration of the multilayer structure of the resin layer may also be a mixed layer configuration where the boundary between the two layers to be laminated cannot be discerned.

Namely, the configuration of the resin layer 12 which the pressure sensitive adhesive sheet 1a in FIG. 1 has may also be a mixed layer configuration where the boundary between the layer (X$\beta$) and the layer (Y1), and/or the boundary between the layer (Y1) and the layer (X$\alpha$) cannot be discerned.

The configuration of the resin that is the multilayer structure is hereunder described by reference to, as one example, the resin layer 12 configured of three layers of the layer (X$\beta$), the layer (Y1), and the layer (X$\alpha$), which the pressure sensitive adhesive sheet 1a in FIG. 1 has.

The layer (X$\beta$) and the layer (X$\alpha$) are a layer mainly containing the resin part (X) but may also contain a particle part (Y). However, the content of the particle part (Y) in each of the layer (X$\beta$) and the layer (X$\alpha$) is independently less than 15% by mass relative to the total mass (100% by mass) of the layer (X$\beta$) or the layer (X$\alpha$) and is smaller than the content of the resin in the layer (X$\beta$) or the layer (X$\alpha$).

Namely, with respect to the content of the particle part (Y), the layer (X$\beta$) and the layer (X$\alpha$) are distinguished from the layer (Y1).

The layer (X$\beta$) and the layer (X$\alpha$) may have the aforementioned void part (Z), in addition to the resin part (X) and the particle part (Y).

The content of the resin part (X) in each of the layer (X$\beta$) and the layer (X$\alpha$) is independently typically more than 85% by mass, preferably 87 to 100% by mass, more preferably 90 to 100% by mass, still more preferably 95 to 100% by mass, and yet still more preferably 100% by mass relative to the total mass (100% by mass) of the layer (X$\beta$) or the layer (X$\alpha$).

The aforementioned "content of the resin part (X)" means a total content of the components other than the fine particles, such as a resin, a tackifier, a crosslinking agent, an ordinary additive, constituting the resin part (X) contained in the layer (X$\beta$) or the layer (X$\alpha$).

The content of the fine particles constituting each of the particle part (Y) in the layer (X$\beta$) and the layer (X$\alpha$) is independently less than 15% by mass, preferably 0 to 13% by mass, more preferably 0 to 10% by mass, still more preferably 0 to 5% by mass, and yet still more preferably 0% by mass relative to the total mass (100% by mass) of the layer (X$\beta$) or the layer (X$\alpha$).

In the present invention, the "content of the fine particles in each of the layer (X$\beta$) and the layer (X$\alpha$)" may be considered to be the content of the fine particles in the total amount (100% by mass (but excluding a diluent solvent)) of the resin composition that is the forming material for the layer (X$\beta$) or the layer (X$\alpha$).

The content of the resin in the layer (X$\alpha$) is typically 30 to 100% by mass, preferably 40 to 100% by mass, more preferably 50 to 100% by mass, and still more preferably 60 to 100% by mass relative to the total amount (100% by mass) of the layer (Xα).

Meanwhile, the content of the resin in the layer (Xβ) is typically 50 to 100% by mass, preferably 65 to 100% by mass, more preferably 75 to 100% by mass, and still more preferably 85 to 100% by mass relative to the total amount (100% by mass) of the layer (Xβ).

In the present invention, the "content of the resin in each of the layer (Xβ) and the layer (Xα)" may be considered to be the content of the resin in the total amount (100% by mass (but excluding a diluent solvent)) of the resin composition that is the forming material for the layer (Xβ) or the layer (Xα).

The layer (Y1) may be a layer formed of the particle part (Y) alone, may also be a layer containing the resin part (X) together with the particle part (Y), and may further be a layer having the void part (Z).

The content of the fine particles constituting the particle part (Y) in the layer (Y1) is typically 15% by mass or more, preferably 20 to 100% by mass, more preferably 25 to 90% by mass, still more preferably 30 to 85% by mass, and yet still more preferably 35 to 80% by mass relative to the total mass (100% by mass) of the layer (Y1).

The content of the resin in the layer (Y1) is typically 0 to 85% by mass, preferably 1 to 80% by mass, more preferably 5 to 75% by mass, still more preferably 10 to 70% by mass, and yet still more preferably 20 to 65% by mass relative to the total mass (100% by mass) of the layer (Y1).

In the present invention, the "content of the fine particles in the layer (Y1)" and the "content of the resin in the layer (Y1)" may be considered to be each the content of the fine particles or the resin in the total amount (100% by mass (but excluding a diluent solvent)) of the composition that is the forming material for the layer (Y1).

In one embodiment of the present invention, the layer (Xα) is preferably a layer formed of a composition (xα) containing a resin and having a content of fine particles of less than 15% by mass.

Similarly, the layer (Xβ) is preferably a layer formed of a composition (xβ) containing a resin and having a content of fine particles of less than 15% by mass.

The aforementioned layer (Y1) is preferably a layer formed of a composition (y) containing 15% by mass or more of fine particles.

Suitable embodiments (containing components, contents, etc.) of the composition (xα), the composition (xβ), and the composition are those as described later.

<Resin Part (X)>

The resin part (X) constituting the resin layer is a part containing any other component than fine particles contained in the resin layer, and in this point, this is differentiated from the particle part (Y).

The resin part (X) may contain a tackifier, a crosslinking agent, an ordinary additive, and so on together with the resin.

The content of the resin in the resin part (X) is typically 30% by mass or more, preferably 40% by mass or more, more preferably 50% by mass or more, still more preferably 55% by mass or more, yet still more preferably 60% by mass or more, and even yet still more preferably 70% by mass or more, and preferably 100% by mass or less, and more preferably 99.9% by mass or less, relative to the total amount (100% by mass) of the resin part (X).

In the present invention, a value of the content of the resin in the resin composition serving as the forming material for the resin part (X) may be considered to be the aforementioned "content of the resin in the resin part (X)".

The aforementioned resin which is contained in the resin part (X) preferably contains a pressure sensitive adhesive resin from the viewpoint of revealing pressure sensitive adhesiveness on the surface (α) of the resin layer to be formed.

In particular, in the case where the resin layer has a multilayer structure formed by laminating a layer (Xβ), a layer (Y1), and a layer (Xα) in this order from the side on which a substrate or a release material is provided, like in the pressure sensitive adhesive sheet 1a, etc. of FIG. 1(a), from the aforementioned viewpoints, it is preferred that at least the layer (Xα) contains a pressure sensitive adhesive resin.

In addition, from the viewpoint of providing a configuration of a double-sided pressure sensitive adhesive sheet and from the viewpoint of improving the adhesion to the substrate, it is preferred that at least the layer (Xα) and the layer (Xβ) contain a pressure sensitive adhesive resin.

Examples of the pressure sensitive adhesive resin include an acrylic resin, a urethane resin, a rubber resin, and a silicone resin.

Among these adhesive resins, an acrylic resin is preferably contained from the viewpoints of making the pressure sensitive adhesion characteristics and the weather resistance good and facilitating the formation of concave portions and flat faces on the surface (α) of the resin layer.

The content of the acrylic resin is preferably 25 to 100% by mass, more preferably 50 to 100% by mass, still more preferably 70 to 100% by mass, yet still more preferably 80 to 100% by mass, and even yet still more preferably 100% by mass relative to the total amount (100% by mass) of the resin contained in the resin part (X).

From the viewpoint of facilitating the formation of concave portions on the surface (α) of the resin layer, the resin part (X) preferably contains a resin having a functional group and more preferably contains an acrylic resin having a functional group.

In particular, in the case where the resin layer has a multilayer structure formed by laminating a layer (Xβ), a layer (Y1), and a layer (Xα) in this order from the side on which a substrate or a release material is provided, like in the pressure sensitive adhesive sheet 1a, etc. of FIG. 1(a), from the aforementioned viewpoints, it is preferred that at least the layer (Y1) contains a resin having a functional group.

The functional group is a group to be a crosslinking start point with a crosslinking agent, and examples thereof include a hydroxy group, a carboxy group, an epoxy group, an amino group, a cyano group, a keto group, an alkoxysilyl group, and the like, with a carboxy group being preferred.

It is preferred that the resin part (X) further contains a crosslinking agent together with the aforementioned resin having a functional group. In particular, in the case where the resin layer has the aforementioned multilayer structure, it is preferred that at least the layer (Y1) contains a crosslinking agent together with the aforementioned resin having a functional group.

Examples of the crosslinking agent include an isocyanate crosslinking agent, an epoxy crosslinking agent, an aziridine crosslinking agent, and a metal chelate crosslinking agent.

Examples of the isocyanate crosslinking agent include aromatic polyisocyanates, such as tolylene diisocyanate, diphenylmethane diisocyanate, xylylene diisocyanate; aliphatic polyisocyanates, such as hexamethylene diisocyanate; alicyclic polyisocyanates, such as isophorone diisocyanate, hydrogenated diphenylmethane diisocyanate; biuret forms and isocyanurate forms of these compounds, and adduct forms that are a reaction product with a low-molecular active hydrogen-containing compound (e.g., ethylene glycol, propylene glycol, neopentyl glycol, trimethylolpropane, and castor oil).

Examples of the epoxy crosslinking agent include ethylene glycol glycidyl ether, 1,3-bis(N,N-diglycidylaminomethyl)cyclohexane, N,N,N',N'-tetraglycidyl-m-xylylenediamine, 1,6-hexanediol diglycidyl ether, trimethylolpropane diglycidyl ether, diglycidylaniline, and diglycidylamine.

Examples of the aziridine crosslinking agent include diphenylmethane-4,4'-bis(1-aziridinecarboxamide), trimethylolpropane tri-β-aziridinyl propionate, tetramethylolmethane tri-β-aziridinyl propionate, toluene-2,4-bis(1-aziridinecarboxamide), triethylenemelamine, bisisophthaloyl-1-(2-methylaziridine), tris-1-(2-methylaziridine)phosphine, and trimethylolpropane tri-β-(2-methylaziridine) propionate.

The metal chelate crosslinking agent includes chelate compounds in which the metal atom is aluminum, zirconium, titanium, zinc, iron, tin, or the like. From the viewpoint of facilitating the formation of concave portions on the surface (α) of the resin layer, an aluminum chelate crosslinking agent is preferred.

Examples of the aluminum chelate crosslinking agent include diisopropoxyaluminum monooleyl acetoacetate, monoisopropoxyaluminum bisoleyl acetoacetate, monoisopropoxyaluminum monooleate monoethyl aceto acetate, diisopropoxyaluminum monolauryl acetoacetate, diisopropoxyaluminum monostearyl acetoacetate, and diisopropoxyaluminum monoisostearyl acetoacetate.

These crosslinking agents may be used either alone or in combination of two or more thereof.

Among these, from the viewpoint of facilitating the formation of concave portions on the surface (α) of the resin layer, the resin part (X) preferably contains one or more selected from a metal chelate crosslinking agent and an epoxy crosslinking agent, more preferably contains a metal chelate crosslinking agent, and still more preferably contains an aluminum chelate crosslinking agent.

The content of the crosslinking agent in the resin part (X) is preferably 0.01 to 15 parts by mass, more preferably 0.1 to 10 parts by mass, and still more preferably 0.3 to 7.0 parts by mass relative to 100 parts by mass of the resin having a functional group to be contained in the resin part (X).

As one embodiment of the present invention, from the viewpoint of facilitating the formation of concave portions on the surface (α) of the resin layer, it is preferred that the resin part (X) contains both a metal chelate crosslinking agent and an epoxy crosslinking agent.

In the case where the resin part (X) contains both a metal chelate crosslinking agent and an epoxy crosslinking agent, from the aforementioned viewpoints, the content ratio of the metal chelate crosslinking agent to the epoxy crosslinking agent [(metal chelate crosslinking agent)/(epoxy crosslinking agent)] in the resin part (X) is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

From the viewpoint of more improving the pressure sensitive adhesion characteristics of the surface (α), it is preferred that the resin part (X) further contains a tackifier together with the pressure sensitive adhesive resin. In particular, in the case where the resin layer is the aforementioned multilayer structure, it is preferred that the layer (Xα) contains a pressure sensitive adhesive resin and a tackifier.

The tackifier to be used in the present invention is a component for auxiliarily improving the pressure sensitive adhesive strength of the pressure sensitive adhesive resin, refers to an oligomer whose mass average molecular weight (Mw) is typically less than 10,000, and is differentiated from the aforementioned pressure sensitive adhesive resin.

The mass average molecular weight (Mw) of the tackifier is preferably 400 to 8,000, more preferably 500 to 5,000, and still more preferably 800 to 3,500.

Examples of the tackifier include rosin resins, such as a rosin resin, a rosin ester resin, and a rosin-modified phenol resin; hydrogenated rosin resins obtained by hydrogenating such a rosin resin; terpene resins, such as a terpene resin, an aromatic modified terpene resin, and a terpene phenol resin; hydrogenated terpene resins obtained by hydrogenating such a terpene resin; styrene resins obtained by copolymerizing a styrene monomer, such as α-methylstyrene, β-methylstyrene, and an aliphatic monomer; hydrogenated styrene resins obtained by hydrogenating such a styrene resin; C5 petroleum resins obtained by copolymerizing a C5 fraction, such as pentene, isoprene, piperine, and 1,3-pentadiene, and hydrogenated petroleum resins of such a C5 petroleum resin; C9 petroleum resins obtained by copolymerizing a C9 fraction, such as indene, vinyltoluene, as formed by hydrocracking of petroleum naphtha, and hydrogenated petroleum resins of such a C9 petroleum resin.

The tackifier to be used in the present invention may be used either alone or in combination of two or more thereof having a different softening point or structure from each other.

The softening point of the tackifier is preferably 80° C. or higher, more preferably 80 to 180° C., still more preferably 83 to 170° C., and yet still more preferably 85 to 150° C.

In the present invention, the "softening point" of the tackifier means a value measured in conformity with JIS K2531.

In the case of using two or mole plural tackifiers, it is preferred that the weight average of the softening points of those plural tackifiers belongs to the aforementioned range.

In the case where the tackifier is contained in the resin part (X), the content of the tackifier is preferably 1 part by mass or more, more preferably 1 to 200 parts by mass, still more preferably 3 to 150 parts by mass, and yet still more preferably 5 to 90 parts by mass relative to 100 parts by mass of the pressure sensitive adhesive resin which is contained in the resin part (X).

The resin part (X) may contain an ordinary additive other than the aforementioned crosslinking agent and tackifier.

Examples of the ordinary additive include an antioxidant, a softener (plasticizer), a rust inhibitor, a pigment, a dye, a retardant, a reaction accelerator, and a UV absorbent.

These ordinary additives may be each used either alone or in combination of two or more thereof.

In the case where these ordinary additives are contained, the content of each ordinary additive is preferably 0.0001 to 60 parts by mass, and more preferably 0.001 to 50 parts by mass relative to 100 parts by mass of the resin.

The aforementioned resin which is contained in the resin part (X) may be used either alone or in combination of two or more thereof.

The forming material for the resin part (X) of the resin layer which the pressure sensitive adhesive sheet of the present invention has is preferably a pressure sensitive adhesive containing a pressure sensitive adhesive resin having a functional group, more preferably an acrylic pressure sensitive adhesive containing an acrylic resin (A) having a functional group (hereinafter also referred to simply as "acrylic resin (A)"), and still more preferably an acrylic pressure sensitive adhesive containing an acrylic resin (A) having a functional group and a crosslinking agent (B).

The acrylic pressure sensitive adhesive may be any of a solvent type or an emulsion type.

The aforementioned acrylic pressure sensitive adhesive which is suitable as the forming material for the resin part (X) is hereunder described.

Examples of the acrylic resin (A) contained in the acrylic pressure sensitive adhesive include a polymer having a structural unit derived from an alkyl (meth)acrylate having a linear or branched alkyl group, and a polymer having a structural unit derived from a (meth)acrylate having a cyclic structure.

The mass average molecular weight (Mw) of the acrylic resin (A) is preferably 50,000 to 1,500,000, more preferably 150,000 to 1,300,000, still more preferably 250,000 to 1,100,000, and yet still more preferably 350,000 to 900,000.

The acrylic resin (A) preferably contains an acrylic copolymer (A1) having a structural unit (a1) derived from an alkyl (meth)acrylate (a1') having an alkyl group with 1 to 18 carbon atoms (hereinafter also referred to as "monomer (a1')") and a structural unit (a2) derived from a functional group-containing monomer (a2') (hereinafter also referred to as "monomer (a2')"), and more preferably contains an acrylic copolymer (A1).

The content of the acrylic copolymer (A1) is preferably 50 to 100% by mass, more preferably 70 to 100% by mass, still more preferably 80 to 100% by mass, and yet still more preferably 90 to 100% by mass relative to the total amount (100% by mass) of the acrylic resin (A) in the acrylic pressure sensitive adhesive.

The copolymerization morphology of the acrylic copolymer (A1) is not particularly limited, and the copolymer may be any of a block copolymer, a random copolymer, or a graft copolymer.

From the viewpoint of improving the pressure sensitive adhesion characteristics, the carbon number of the alkyl group which the monomer (a1') has is more preferably 4 to 12, still more preferably 4 to 8, and yet still more preferably 4 to 6.

Examples of the monomer (a1') include methyl (meth) acrylate, ethyl (meth)acrylate, propyl (meth)acrylate, butyl (meth)acrylate, 2-ethylhexyl (meth)acrylate, lauryl (meth) acrylate, tridecyl (meth)acrylate, and stearyl (meth)acrylate.

Among these, butyl (meth)acrylate and 2-ethylhexyl (meth)acrylate are preferred, and butyl (meth)acrylate is more preferred.

The content of the structural unit (a1) is preferably 50 to 99.5% by mass, more preferably 60 to 99% by mass, still more preferably 70 to 95% by mass, and yet still more preferably 80 to 93% by mass relative to all the structural units (100% by mass) of the acrylic copolymer (A1).

Examples of the monomer (a2') include a hydroxy group-containing monomer, a carboxy group-containing monomer, an epoxy group-containing monomer, an amino group-containing monomer, a cyano group-containing monomer, a keto group-containing monomer, and an alkoxysilyl group-containing monomer.

Among these, a carboxy group-containing monomer is more preferred.

Examples of the carboxy group-containing monomer include (meth)acrylic acid, maleic acid, fumaric acid, and itaconic acid, with (meth)acrylic acid being preferred.

The content of the structural unit (a2) is preferably 0.5 to 50% by mass, more preferably 1 to 40% by mass, still more preferably 5 to 30% by mass, and yet still more preferably 7 to 20% by mass relative to all the structural units (100% by mass) of the acrylic copolymer (A1).

The acrylic copolymer (A1) may have a structural unit (a3) derived from any other monomer (a3') than the aforementioned monomers (a1') and (a2').

Examples of the other monomer (a3') include (meth) acrylates having a cyclic structure, such as cyclohexyl (meth)acrylate, benzyl (meth)acrylate, isobornyl (meth) acrylate, clicyclopentanyl (meth)acrylate, dicyclopentenyl (meth)acrylate, clicyclopentenyloxyethyl (meth)acrylate, and imido(meth)acrylate; vinyl acetate, acrylonitrile, and styrene.

The content of the structural unit (a3) is preferably 0 to 30% by mass, more preferably 0 to 20% by mass, still more preferably 0 to 10% by mass, and yet still more preferably 0 to 5% by mass relative to all the structural units (100% by mass) of the acrylic copolymer (A1).

The aforementioned monomers (a1') to (a3') may be each used either alone or in combination of two or more thereof.

A method for synthesis of the acrylic copolymer (A1) component is not particularly limited. For example, the copolymer is produced according to a method including dissolving raw material monomers in a solvent and polymerizing them in a mode of solution polymerization in the presence of a polymerization initiator, a chain transfer agent, and the like, or a method of emulsion polymerization in an aqueous system using raw material monomers in the presence of an emulsifier, a polymerization initiator, a chain transfer agent, a dispersant, and the like.

The crosslinking agent (B) to be contained in the aforementioned acrylic pressure sensitive adhesive includes those as described above, but from the viewpoint of bettering the pressure sensitive adhesion characteristics and from the viewpoint of facilitating the formation of concave portions on the surface (α) of the resin layer, one or more selected from a metal chelate crosslinking agent and an epoxy crosslinking agent are preferably contained, a metal chelate crosslinking agent is more preferably contained, and an aluminum chelate crosslinking agent is still more preferably contained.

As one embodiment of the present invention, from the viewpoint of improving the shape retentivity of the plural concave portions existing on the surface (α) of the resin layer, the crosslinking agent (B) preferably contains both a metal chelate crosslinking agent and an epoxy crosslinking agent.

The content of the crosslinking agent (B) is preferably 0.01 to 15 parts by mass, more preferably 0.1 to 10 parts by mass, and still more preferably 0.3 to 7.0 parts by mass relative to 100 parts by mass of the acrylic resin (A) in the aforementioned acrylic pressure sensitive adhesive.

In the case where a metal chelate crosslinking agent and an epoxy crosslinking agents are used in combination, the content ratio of the metal chelate crosslinking agent to the epoxy crosslinking agent [(metal chelate crosslinking agent)/(epoxy crosslinking agent)] is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

The acrylic pressure sensitive adhesive to be used in one embodiment of the present invention may contain any ordinary additive within a range where the effects of the present invention are not impaired. Examples of the ordinary additive include those as described above, and the content of the ordinary additive is also as described above.

From the viewpoint of more improving the pressure sensitive adhesion characteristics of the surface (α), it is preferred that the acrylic pressure sensitive adhesive to be used in one embodiment of the present invention further contains a tackifier. Examples of the tackifier include those as described above, and the content of the tackifier is also as described above.

The acrylic pressure sensitive adhesive to be used in one embodiment of the present invention may contain any other pressure sensitive adhesive resin than the acrylic resin (A) (for example, a urethane resin, a rubber resin and a silicone resin) within a range where the effects of the present invention are not imp aired.

The content of the acrylic resin (A) in the acrylic pressure sensitive adhesive is preferably 50 to 100% by mass, more preferably 70 to 100% by mass, still more preferably 80 to 100% by mass, and yet still more preferably 100% by mass relative to the total amount (100% by mass) of the pressure sensitive adhesive resin contained in the acrylic pressure sensitive adhesive.

<Particle Part (Y)>

The resin layer which the pressure sensitive adhesive sheet of one embodiment of the present invention has preferably contains a particle part (Y) consisting of fine particles.

From the viewpoint of improving the air escape property and the blister resistance of the pressure sensitive adhesive sheet and from the viewpoint of facilitating the formation of concave portions and flat faces on the surface (α) of the resin layer, the average particle diameter of the fine particles is preferably 0.01 to 100 μm, more preferably 0.05 to 25 μm, and still more preferably 0.1 to 10 μm.

The fine particles to be used in one embodiment of the present invention are not particularly limited, and examples thereof include inorganic particles, such as silica particles, metal oxide particles, barium sulfate, calcium carbonate, magnesium carbonate, glass beads, and smectite; organic particles, such as acrylic beads.

Among these fine particles, one or more selected from silica particles, metal oxide particles, and smectite are preferred, and silica particles are more preferred.

The silica particles to be used in one embodiment of the present invention may be any one of dry type silica and wet type silica.

The silica particles to be used in one embodiment of the present invention may also be an organic modified silica having been surface-modified with an organic compound having a reactive functional group or the like, an inorganic modified silica having been surface-treated with an inorganic compound, such as sodium aluminate and sodium hydroxide; an organic/inorganic modified silica having been surface-treated with any of these organic compounds and inorganic compounds, or an organic/inorganic modified silica having been surface-treated with an organic/inorganic hybrid material of a silane coupling agent.

These silica particles may be in the form of a mixture of two or more thereof.

The mass concentration of silica in the silica particles is preferably 70 to 100% by mass, more preferably 85 to 100% by mass, and still more preferably 90 to 100% by mass relative to the total amount (100% by mass) of the silica particles.

From the viewpoint of improving the air escape property and the blister resistance of the pressure sensitive adhesive sheet and from the viewpoint of facilitating the formation of concave portions and flat faces on the surface (α) of the resin layer, the volume average secondary particle diameter of the silica particles to be used in one embodiment of the present invention is preferably 0.5 to 10 μm, more preferably 1 to 8 μm, and still more preferably 1.5 to 5 μm.

In the present invention, the value of the volume average secondary particle diameter of the silica particles is a value determined through measurement of particle size distribution according to a Coulter counter method using Multisizer III or the like.

Examples of the metal oxide particles include particles made of a metal oxide selected from titanium oxide, alumina, boehmite, chromium oxide, nickel oxide, copper oxide, titanium oxide, zirconium oxide, indium oxide, zinc oxide, and composite oxides thereof, and also include sol particles composed of those metal oxides.

Examples of the smectite include montmorillonite, beidellite, hectorite, saponite, stevensite, nontronite and sauconite.

The mass retention rate after heating the resin layer which the pressure sensitive adhesive sheet of one embodiment of the present invention has at 800° C. for 30 minutes is preferably 3 to 90% by mass, more preferably 5 to 80% by mass, still more preferably 7 to 70% by mass, and yet still more preferably 9 to 60% by mass.

The mass retention rate can be considered to indicate the content (% by mass) of the fine particles contained in the resin layer.

When the mass retention rate is 3% by mass or more, a pressure sensitive adhesive sheet which is excellent in air escape property and blister resistance may be provided. In addition, in production of the pressure sensitive adhesive sheet of the present invention, concave portions and flat faces can be readily formed on the surface (α) of the resin layer.

On the other hand, when the mass retention rate is 90% by mass or less, a pressure sensitive adhesive sheet in which the film strength of the resin layer is high and which is excellent in water resistance and chemical resistance may be provided. Furthermore, in producing the pressure sensitive adhesive sheet, flat faces are readily formed on the surface (α) of the resin layer.

[Production Method of Pressure Sensitive Adhesive Sheet]

A production method of the pressure sensitive adhesive sheet of the present invention is hereunder described.

Thought the production method of the pressure sensitive adhesive sheet of the present invention is not particularly limited, from the viewpoint of productivity and from the viewpoint of facilitating the formation of concave portions and flat faces on the surface (α) of the resin layer, a method including at least the following steps (1) and (2) is preferred.

Step (1): A step of forming a coating film (x') formed by a composition (x) containing the resin and having a content of the fine particles of less than 15% by mass, and a coating film (y') formed by a composition (y) having the fine particles in an amount of 15% by mass or more.

Step (2): A step of drying the coating film (x') and the coating film (y') formed in the step (1), simultaneously.

<Step (1)>

The step (1) is a step of forming a coating film (x') formed by a composition (x) containing the resin and having a content of the fine particles of less than 15% by mass, and a coating film (y') formed by a composition (y) having the fine particles in an amount of 15% by mass or more.

The composition (x) is a forming material for the resin part (X), and it preferably contains a crosslinking agent together with the aforementioned resin and may further contain a tackifier as well as the aforementioned ordinary additive.

The composition (y) is a forming material for the particle part (Y), and may further contain a resin, a crosslinking agent, and a tackifier as well as the aforementioned ordinary additive. The composition (y) containing those components other than the fine particles, such as a resin, serves not only as the forming material for the particle part (Y) but also as the forming material for the resin part (X).

(Composition (x))

Examples of the resin contained in the composition (x) include a resin constituting the aforementioned resin part (X), and the resin is preferably a pressure sensitive adhesive resin having a functional group, more preferably the aforementioned acrylic resin (A) having a functional group, and still more preferably the aforementioned acrylic copolymer (A1).

The content of the resin in the composition (x) is typically 30% by mass or more, preferably 40% by mass or more, more preferably 50% by mass or more, still more preferably 55% by mass or more, yet still more preferably 60% by mass or more, and even yet still more preferably 70% by mass or more, and preferably 100% by mass or less, more preferably 99.9% by mass or less, and still more preferably 95% by mass or less, relative to the total amount (100% by mass (but excluding diluent solvent)) of the composition (x).

Examples of the crosslinking agent to be contained in the composition (x) include the crosslinking agent to be contained in the aforementioned resin part (X). One or more selected from a metal chelate crosslinking agent and an epoxy crosslinking agent are preferably contained, and a metal chelate crosslinking agent is more preferably contained.

Furthermore, from the viewpoint of improving the shape retentivity of the plural concave portions existing on the surface (α) of the resin layer, it is preferred that the composition (x) contains both a metal chelate crosslinking agent and an epoxy crosslinking agent.

In the case where the composition (x) contains both a metal chelate crosslinking agent and an epoxy crosslinking agent, the content ratio of the metal chelate crosslinking agent to the epoxy crosslinking agent in the composition (x) [(metal chelate crosslinking agent)/(epoxy crosslinking agent)] is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

The content of the crosslinking agent is preferably 0.01 to 15 parts by mass, more preferably 0.1 to 10 parts by mass, and still more preferably 0.3 to 7.0 parts by mass relative to 100 parts by mass of the resin contained in the composition (x).

The composition (x) is preferably an acrylic pressure sensitive adhesive containing the aforementioned acrylic resin (A) having a functional group and crosslinking agent (B), more preferably an acrylic pressure sensitive adhesive containing the aforementioned acrylic copolymer (A1) and crosslinking agent (B). In addition, the acrylic pressure sensitive adhesive may further contain a tackifier or an ordinary additive.

The details of the aforementioned acrylic pressure sensitive adhesive are as described above.

The composition (x) may contain the aforementioned fine particles.

However, the content of the fine particles in the composition (x) is less than 15% by mass and is smaller than the content of the resin contained in the composition (x).

Specifically, the content of the fine particles in the composition (x) is less than 15% by mass, preferably 0 to 13% by mass, more preferably 0 to 10% by mass, still more preferably 0 to 5% by mass, and yet still more preferably 0% by mass relative to the total amount (100% by mass (but excluding diluent solvent)) of the composition (x).

(Composition (y))

The composition (y) is a material for forming the particle part (Y) and contains at least the aforementioned fine particles in an amount of 15% by mass or more. From the viewpoint of dispersibility of the fine particles, the composition (y) preferably contains a resin together with the fine particles, and more preferably further contains a crosslinking agent together with the resin. In addition, the composition (y) may further contain a tackifier or an ordinary additive.

The components other than the fine particles to be contained in the composition (y) (a resin, a crosslinking agent, a tackifier, and an ordinary additive) serve as the forming material for the resin part (X).

Examples of the fine particles to be contained in the composition (y) include those as described above, and from the viewpoint of forming the void part (Z) in the resin layer to provide a pressure sensitive adhesive sheet having improved blister resistance, one or more selected from silica particles, metal oxide particles, and smectite are preferred.

From the viewpoint of facilitating the formation of irregular concave portions on the surface (α) of the resin layer through self-formation of the resin layer and flat faces, the content of the fine particles in the composition (y) is 15% by mass or more, preferably 20 to 100% by mass, more preferably 25 to 90% by mass, still more preferably 30 to 85% by mass, and yet still more preferably 35 to 80% by mass relative to the total amount (100% by mass (but excluding diluent solvent)) of the resin composition (y).

Examples of the resin to be contained in the composition (y) include the same resins as those of the resin to be contained in the aforementioned composition (x), and it is preferred that the same resin as in the composition (x) is contained. These resins may be used either alone or in combination of two or more thereof.

More specifically, the resin to be contained in the composition (y) is preferably a resin having a functional group, more preferably the aforementioned acrylic resin (A) having a functional group, and still more preferably the aforementioned acrylic copolymer (A1).

The content of the resin in the composition (y) is typically 0 to 85% by mass, preferably 1 to 80% by mass, more preferably 5 to 75% by mass, still more preferably 10 to 70% by mass, and yet still more preferably 20 to 65% by mass relative to the total amount (100% by mass (but excluding diluent solvent)) of the composition (y).

Examples of the crosslinking agent to be contained in the composition (y) include the same materials as those in the crosslinking agent to be contained in the aforementioned resin part (X). Among these, it is preferred that the composition (y) contains one or more selected from a metal chelate crosslinking agent and an epoxy crosslinking agent, and it is more preferred that the composition (y) contains a metal chelate crosslinking agent. Furthermore, as one embodiment of the present invention, it is preferred that the composition (y) contains both a metal chelate crosslinking agent and an epoxy crosslinking agent.

In the case where the composition (y) contains both a metal chelate crosslinking agent and an epoxy crosslinking agent, a suitable range of the content ratio (mass ratio) of the metal chelate crosslinking agent to the epoxy crosslinking agent in the composition (y) is the same as in the aforementioned composition (x).

The content of the crosslinking agent in the composition (y) is preferably 0.01 to 15 parts by mass, more preferably 0.1 to 10 parts by mass, and still more preferably 0.3 to 7.0 parts by mass relative to 100 parts by mass of the resin to be contained in the composition (y).

(Formation Method of Coating Films (x') and (y'))

For facilitating the formation of a coating film, it is preferred that a solvent is blended in the composition (x) or (y) to give a solution of the composition.

Examples of the solvent include water and organic solvents.

Examples of the organic solvent include toluene, ethyl acetate, butyl acetate, methyl ethyl ketone, methyl isobutyl ketone, methanol, ethanol, isopropyl alcohol, t-butanol, sec-butanol, acetylacetone, cyclohexanone and n-hexane, cyclohexane. These solvents may be used either alone or in combination of two or more thereof.

Though the order of laminating the coating films (x') and (y') to be formed in this step is not particularly limited, it is preferred that the coating film (x') is laminated on the coating film (y').

Regarding the formation method of the coating films (x') and (y'), there may be employed a successive formation method of forming a coating film (y') and then forming a coating film (x') on the coating film (y'), or from the viewpoint of productivity, there may also be employed a simultaneous coating method of coating with both the coating film (y') and the coating film (x') using a multilayer coater.

Examples of the coater for use in successive formation include a spin coater, a spray coater, a bar coater, a knife coater, a roll coater, a knife roll coater, a blade coater, a gravure coater, a curtain coater, and a die coater.

Examples of the coater for use in simultaneous coating with a multilayer coater include a curtain coater and a die coater, and among these, a die coater is preferred from the viewpoint of operability.

In this step (1), after the formation of at least one of the coating film (x') and the coating film (y') and prior to the step (2), a pre-drying treatment may be carried out in such a degree that the curing reaction of the coating film does not proceed.

Though the drying temperature in the pre-drying treatment in this step (1) is generally set within a temperature range in which the formed coating film is not cured, it is preferably lower than the drying temperature in the step (2). A specific drying temperature as prescribed in terms of the "lower than the drying temperature in the step (2)" is preferably 10 to 45° C., more preferably 10 to 34° C., and still more preferably 15 to 30° C.

<Step (2)>

The step (2) is a step of drying the coating film (x') and the coating film (y') formed in the step (1), simultaneously.

In this step, the coating film (x') and the coating film (y') formed are dried simultaneously, whereby a resin layer containing the resin part (X) and the particle part (Y) is formed, and in addition, plural concave portions and flat faces are formed on the surface (α) of the resin layer.

From the viewpoint of facilitating the formation of concave portions and flat faces on the surface (α) of the resin layer, the drying temperature in this step is preferably 35 to 200° C., more preferably 60 to 180° C., still more preferably 70 to 160° C., and yet still more preferably 80 to 140° C.

When the drying temperature is 35° C. or higher, a pressure sensitive adhesive sheet having good air escape property can be obtained. On the other hand, when the drying temperature is 200° C. or lower, the substrate and the release material which the pressure sensitive adhesive sheet has can be made free from trouble of shrinkage thereof.

When the drying temperature is lower, the height difference of the concave portions to be formed becomes large, but the number of concave portions to be formed tends to decrease.

In the surroundings of the particle part (Y) of the resin layer to be formed in this step, a void part (Z) is readily formed.

The void part (Z) can be readily formed by using one or more selected from silica particles, metal oxide particles, and smectite as the fine particles to be contained in the aforementioned composition (y).

In the case where a pressure sensitive adhesive sheet having a resin layer having a multilayer structure is produced such that the multilayer structure is formed by laminating a layer (Xβ) mainly containing the resin part (X), a layer (Y1) containing the particle part (Y) in an amount of 15% by mass or more, and a layer (Xα) mainly containing the resin part (X) in this order, like the pressure sensitive adhesive sheet 1a of FIG. 1(a), etc. a production method of the following first and second embodiments is preferred.

In the description of the production method of the following first and second embodiments, the "composition (xβ)" and the "composition (xα)" are the same as the aforementioned composition (x), unless specifically indicated, and the details of the respective components to be contained in the composition (xβ) or (xα) (e.g., the resin, the crosslinking agent, the tackifier, the ordinary additive, the diluent solvent) (specific exemplification of each component, suitable components, content of component, solid concentration) are also the same as in the aforementioned composition (x). In addition, the "composition (y)" is also the same as described above.

Production Method of First Embodiment

The production method of the first embodiment includes at least the following steps (1A) and (2A).

Step (1A): A step of forming, on a substrate or a release material, a coating film (xβ') formed by a composition (xβ) containing a resin and having the content of fine particles in an amount of less than 15% by mass, the coating film (y') formed by the component (y) containing the aforementioned fine particles in an amount of 15% by mass or more, and a coating film (xα') formed by a composition (xα) containing a resin and having the content of fine particles in an amount of less than 15% by mass, as laminated thereon in this order.

Step (2A): A step of drying the coating film (xβ'), the coating film (y'), and the coating film (xα') formed in the step (1A), simultaneously.

In the step (1A), it is also preferred that the aforementioned solvent is blended in the composition (xβ), the composition (y), and the composition (xα) to form solutions of the respective compositions, and the resultant solutions are used for coating.

Regarding the formation method of the coating film (xβ'), the coating film (y'), and the coating film (xα'), there may be employed a successive formation method of forming a coating film (xβ') on a substrate or a release material, then forming a coating film (y') on the coating film (xβ'), and further forming a coating film (xα') on the coating film (y'), by using the aforementioned coater, or a simultaneous coating method of forming a coating film (xβ'), a coating film (y'), and a coating film (xα') by using the aforementioned multilayer coater.

In the step (1A), after formation of one or more coating films of the coating film (xβ'), the coating film (y'), and the coating film (xα') and prior to the step (2A), a pre-drying treatment may be carried out in such a degree that the curing reaction of the coating films does not proceed.

For example, after formation of the coating film (xβ'), the coating film (y'), and the coating film (xα'), such a pre-drying treatment may be carried out every time after the formation, or after the formation of the coating film (xβ') and the coating film (y'), the two may be subjected to the aforementioned pre-drying treatment all together, and then the coating film (xα') may be formed thereon.

In this step (1A), though the drying temperature for the pre-drying treatment is generally so set as to fall within a temperature range in such a degree that curing of the formed coating film does not proceed, it is preferably lower than the drying temperature in the step (2A). A specific drying temperature as prescribed in terms of the "lower than the drying temperature in the step (2A)" is preferably 10 to 45° C., more preferably 10 to 34° C., and still more preferably 15 to 30° C.

The step (2A) is a step of drying the coating film (xβ'), the coating film (y'), and the coating film (xα') formed in the step (1A), simultaneously. The preferred range of the drying temperature in this step is the same as that in the aforementioned step (2). In this step, a resin layer containing the resin part (X) and the particle part (Y) is formed.

Production Method of Second Embodiment

The production method of the second embodiment includes at least the following steps (1B) and (2B).

Step (1B): A step of forming, on a layer (Xβ) mainly containing a resin part (X) that is provided on a substrate or a release material, a coating film (y') formed by a composition (y) containing the aforementioned fine particles in an amount of 15% by mass or more and a coating film (xα') formed by a composition (xα) containing a resin and having a content of fine particles of less than 15% by mass, as laminated thereon in this order Step (2B): A step of drying the coating film (y') and the coating film (xα') formed in the step (1B), simultaneously.

In the step (1B), the "layer (Xβ) mainly containing a resin part (X)" can be formed by drying the aforementioned coating film (xβ') formed by the composition (xβ) containing a resin as a main component.

The layer (Xβ) is formed of the composition (xβ), and therefore, the layer (Xβ) may contain a crosslinking agent, an ordinary additive, and others in addition to the resin. The content of the resin part (X) in the layer (Xβ) is as described above.

Regarding the formation method of the layer (Xβ), it is possible to form the layer (Xβ) in a manner that a coating film (xβ') formed by a composition (xβ) containing a resin as a main component is formed on a substrate or a release material, and the coating film (xβ') is then dried.

The drying temperature at this time is not particularly limited, and it is preferably 35 to 200° C., more preferably 60 to 180° C., still more preferably 70 to 160° C., and yet still more preferably 80 to 140° C.

This embodiment differs from the aforementioned first embodiment in that the coating film (y') and the coating film (xα') are formed in this order on the layer (Xβ) formed by drying, but not on the coating film (xβ').

In the step (1B), it is also preferred that the aforementioned solvent is blended in the composition (y) and the composition (xα) to form solutions of the respective compositions, and thereafter, the solutions are used for coating.

Regarding the formation method of the coating film (y') and the coating film (xα'), there may be employed a successive formation method of forming a coating film (y') on the layer (Xβ) and then forming a coating film (xα') on the coating film (y'), by using the aforementioned coater, or a simultaneous coating method of coating with both the coating film (y') and the coating film (xα') by using the aforementioned multilayer coater.

In this step (1B), after formation of the coating film (y') or after formation of the coating film (y') and the coating film (xα') and prior to the step (2B), a pre-drying treatment may be carried out in such a degree that the curing reaction of the coating films does not proceed.

In this step (1B), though the drying temperature for the pre-drying treatment is generally so set as to fall within a temperature range in such a degree that curing of the formed coating film does not proceed, it is preferably lower than the drying temperature in the step (2B). A specific drying temperature as prescribed in terms of the "lower than the drying temperature in the step (2B)" is preferably 10 to 45° C., more preferably 10 to 34° C., and still more preferably 15 to 30° C.

The step (2B) is a step of simultaneously drying the coating film (y') and the coating film (xα') formed in the step (1B), and the preferred range of the drying temperature in this step is the same as in the aforementioned step (2). In this step, a resin layer containing the resin part (X) and the particle part (Y) is formed.

EXAMPLES

The present invention is described more specifically with reference to the following Examples, but it should be construed that the present invention is not limited to the following Examples. The physical property values in the following Production Examples and Examples are values measured by the following methods.

<Mass Average Molecular Weight (Mw)>

The measurement was performed by using a gel permeation chromatography instrument (manufactured by Tosoh Corporation, a product name: "HLC-8020") under the following conditions, and a value measured as the standard polystyrene conversion was used.

(Measurement Condition)

Column: "TSK guard column HXL-L", "TSK gel G2500HXL", "TSK gel G2000HXL", and "TSK gel G1000HXL" (all manufactured by Tosoh Corporation), connected in series Column temperature: 40° C.

Developing solvent: tetrahydrofuran

Flow rate: 1.0 mL/min

<Measurement of Volume Average Secondary Particle Diameter of Silica Particles>

The volume average secondary particle diameter of the silica particles was determined by measuring the particle size distribution with Multisizer III (manufactured by Beckman Coulter Inc.) by the Coulter Counter method.

<Measurement of Thickness of Resin Layer>

The thickness of the resin layer was measured by using a constant pressured thickness measuring instrument, manufactured by TECLOCK Corporation (model number: "PG-02J", standard specification: in conformity with JIS K6783, Z1702, and Z1709)

Specifically, a value obtained by measuring the total thickness of the pressure sensitive adhesive sheet as the measuring object, from which was then subtracted the previously measured thickness of the substrate or release sheet, was defined as the "thickness of resin layer".

Production Examples x-1 to x-4

(Preparation of Solutions (xβ-1) to (xβ-2) and (xα-1) to (xα-2) of Resin Composition)

To the solution of an acrylic resin that is a pressure sensitive adhesive resin, having the kind and the solid content shown in Table 1, a crosslinking agent and a tackifies, each having with the kind and the blending amount shown in Table 1, were added and then diluted with a diluent solvent shown in Table 1, thereby preparing solutions (xβ-1) to (xβ-2) and (xα-1) to (xα-2) of a resin composition each having the solid content shown in Table 1.

The details of the respective components shown in Table 1 used for the preparation of the solutions (xβ-1) to (xβ-2) and (xα-1) to (xα-2) of a resin composition are as follows.

<Solution of Acrylic Resin>

Solution (i): A mixed solution of toluene and ethyl acetate containing an acrylic resin (x-i) (an acrylic copolymer having structural units derived from raw material monomers, BA/AA=90/10 (% by mass), Mw: 630,000) having a solid concentration of 34.0% by mass.

Solution (ii): A mixed solution of toluene and ethyl acetate containing an acrylic resin (x-ii) (an acrylic copolymer having structural units derived from raw material monomers, BA/AA=90/10 (% by mass), Mw: 470,000) having a solid concentration of 37.0% by mass.

Solution A mixed solution of toluene and isopropyl alcohol (IPA) containing an acrylic resin (x-iii) (an acrylic copolymer having structural units derived from raw material monomers, 2EHA/VAc/AA=75/23/2 (% by mass), Mw: 660,000) having a solid concentration of 37.0% by mass.

Solution (iv): A solution of ethyl acetate containing an acrylic resin (x-iv) (an acrylic copolymer having structural units derived from raw material monomers, BA/AA/HEA=94/3/3 (% by mass), Mw: 1,000,000) having a solid concentration of 37.0% by mass.

The abbreviations of the raw material monomers constituting the aforementioned acrylic copolymers are as follows.

BA: n-Butyl acrylate
2EHA: 2-Ethylhexyl acrylate
AA: Acrylic acid
VAc: Vinyl acetate
HEA: 2-Hydroxyethyl acrylate <Crosslinking Agent>

Al crosslinking agent: Product name "M-5A", manufactured by Soken Chemical & Engineering Co., Ltd., aluminum chelate crosslinking agent, solid concentration: 4.95% by mass Epoxy crosslinking agent: A solution of an epoxy crosslinking agent obtained by diluting "TETRAD-C" (a product name, manufactured by Mitsubishi Gas Chemical Co., Inc.) with toluene to make a solid concentration of 5% by mass <Tackifier>

Rosin ester TF: A rosin ester tackifier, Mw: less than 10,000, softening point: 85° C.

Styrene TF: A copolymer of a styrene monomer and an aliphatic monomer, Mw: less than 10,000, softening point: 95° C.

<Diluent Solvent>

Mixed solvent (1): A mixed solvent composed of a mixture of toluene/isopropyl alcohol (IPA)=65/35 (mass ratio)

Mixed solvent (2): A mixed solvent composed of a mixture of ethyl acetate/IPA=86/14 (mass ratio)

TABLE 1

| | | | Solution of acrylic resin | | | Crosslinking agent | | | Blending amount of solid relative to 100 parts by mass of resin (parts by mass) |
|---|---|---|---|---|---|---|---|---|---|
| | Solution of resin composition | Kind | Kind of resin | Blending amount (parts by mass) | Blending amount of solid (parts by mass) | Kind | Blending amount (parts by mass) | Blending amount of solid (parts by mass) | |
| Production Example x-1 | (xβ-1) | Solution (i) | Acrylic resin (x-i) [BA/AA = 90/10 (wt %), Mw = 630,000] | 100.0 | 34.0 | Al crosslinking agent | 2.53 | 0.13 | 0.37 |
| | | | | | | Epoxy crosslinking agent | 0.38 | 0.02 | 0.06 |
| Production Example x-2 | (xβ-2) | Solution (ii) | Acrylic resin (x-ii), [BA/AA = 90/10 (wt %), Mw = 470,000] | 50.0 | 18.5 | Al crosslinking agent | 9.00 | 0.45 | 1.20 |
| | | Solution (iii) | Acrylic resin (x-iii) [2EHA/VAc/AA = 75/23/2 (wt %), Mw = 660,000] | 50.0 | 18.5 | | | | |
| Production Example x-3 | (xα-1) | Solution (iv) | Acrylic resin (x-iv), [BA/AA/HEA = 94/3/3 (wt %), Mw = 1,000,000] | 100.0 | 37.0 | Al crosslinking agent | 1.00 | 0.05 | 0.13 |
| | | | | | | Epoxy crosslinking agent | 0.10 | 0.01 | 0.01 |
| Production Example x-4 | (xα-2) | Solution (iv) | Acrylic resin (x-iv), [BA/AA/HEA = 94/3/3 (wt %), | 100.0 | 37.0 | Al crosslinking agent | 1.00 | 0.05 | 0.13 |

TABLE 1-continued

|  |  |  |  |  | Epoxy crosslinking agent | 0.10 | 0.01 | 0.01 |

| | | Tackifer | | | | |
|---|---|---|---|---|---|---|
| | Kind | Blending amount of solid (parts by mass) | Total blending amount of solid (parts by mass) | Total blending amount of solid relative to 100 parts by mass of resin (parts by mass) | Diluent solvent Kind | Solid concentration of solution of resin composition (mass %) |
| Production Example x-1 | — | — | — | — | Mixed solvent (1) | 24 |
| Production Example x-2 | — | — | — | — | Mixed solvent (2) | 30 |
| Production Example x-3 | Rosin ester TF | 10.0 | 10.0 | 27.0 | Mixed solvent (2) | 30 |
| Production Example x-4 | Rosin ester TF<br>Styrene TF | 10.0<br>10.0 | 20.0 | 54.1 | Mixed solvent (2) | 30 |

Production Example f-1

(Preparation of Fine Particle Dispersion Liquid (f-1))

To 100 parts by mass (solid content: 34.0 parts by mass) of a mixed solution of toluene and ethyl acetate containing a solution (i) of an acrylic resin containing the aforementioned acrylic resin (x-i) (an acrylic copolymer having structural units derived from butyl acrylate (BA) and acrylic acid (AA), BA/AA=90/10 (% by mass), Mw: 630,000) and having a solid concentration of 34.0% by mass, 51.0 parts by mass (solid content: 51.0 parts by mass) of silica particles (a product name: "Nipsil E-200A", manufactured by Tosoh Silica Corporation, volume average secondary particle diameter: 3 μm) as fine particles and toluene were added, and the fine particles were dispersed, thereby preparing a fine particle dispersion liquid (f-1) having a solid concentration of 27% by mass containing the acrylic resin and the silica particles.

Production Example f-2

(Preparation of Fine Particle Dispersion Liquid (f-2))

In place of the solution (i), to 100 parts by mass (solid content: 37.0 parts by mass) of a mixed solution of toluene and ethyl acetate containing a solution (ii) of an acrylic resin containing the aforementioned acrylic resin (x-ii) (an acrylic copolymer having structural units derived from butyl acrylate (BA) and acrylic acid (AA), BA/AA=90/10 (% by mass), Mw: 470,000) and having a solid concentration of 37.0% by mass, 55.5 parts by mass (solid content: 55.5 parts by mass) of silica particles (a product name: "Nipsil E-200A", manufactured by Tosoh Silica Corporation, volume average secondary particle diameter: 3 μm) as fine particles and toluene were added, and the fine particles were dispersed, thereby preparing a fine particle dispersion liquid (f-2) having a solid concentration of 30% by mass containing the acrylic resin and the silica particles.

Production Examples y-1 to y-2

(Preparation of Coating Liquids (y-1) to (y-2) for Forming Coating Film (y'))

A fine particle dispersion liquid, a solution of an acrylic resin, a crosslinking agent, and a diluent solvent, each having the kind and blending amount shown in Table 2, were added, thereby preparing each of coating liquids (y-1) to (y-2) for forming a coating film (y') having a solid concentration shown in Table 2.

The details of the respective components shown in Table 2 used for the preparation of the coating liquids (y-1) to (y-2) for forming a coating film (y') are as follows.

<Fine Particle Dispersion Liquid>

Dispersion liquid (f-1): A fine particle dispersion liquid (f-1) containing the acrylic resin (x-i) and the silica particles and having a solid concentration of 27% by mass, as prepared in Production Example f-1.

Dispersion liquid (f-2): A fine particle dispersion liquid (f-2) containing the acrylic resin (x-ii) and the silica particles and having a solid concentration of 30% by mass, as prepared in Production Example f-2.

<Solution of Acrylic Resin>

Solution (i): A mixed solution of toluene and ethyl acetate containing an acrylic resin (x-i) (an acrylic copolymer having structural units derived from raw material monomers, BA/AA=90/10 (% by mass), Mw: 630,000) having a solid concentration of 34.0% by mass.

Solution (ii): A mixed solution of toluene and ethyl acetate containing an acrylic resin (x-ii) (an acrylic copolymer having structural units derived from raw material monomers, BA/AA=90/10 (% by mass), Mw: 470,000) having a solid concentration of 37.0% by mass.

<Crosslinking Agent>

Al crosslinking agent: Product name "M-5A", manufactured by Soken Chemical & Engineering Co., Ltd., aluminum chelate crosslinking agent, solid concentration: 4.95% by mass Epoxy crosslinking agent: A solution of an epoxy crosslinking agent obtained by diluting "TETRAD-C" (a product name, manufactured by Mitsubishi Gas Chemical Co., Inc.) with toluene to make a solid concentration of 5% by mass
<Diluent Solvent>
IPA/CHN: A mixed solvent of isopropyl alcohol (IPA) and cyclohexanone (CHN) (IPA/CHN=95/5 (mass ratio))

forming a resin layer containing a resin part (X) and a particle part (Y) having the thickness shown in Table 3.

In all of Examples 1 to 2, plural concave portions and flat faces were also confirmed on the surface (α) of the formed resin layer through visual inspection.

TABLE 2

| | | Fine particle dispersion liquid | | | Solution of acrylic resin | | | |
|---|---|---|---|---|---|---|---|---|
| | Coating liquid for forming coating film (y') | Kind | Blending amount (parts by mass) | Blending amount of solid (parts by mass) | Content (*) of fine particles (parts by mass) | Kind | Kind of resin | Blending amount (parts by mass) | Blending amount of solid (parts by mass) |
| Production Example y-1 | (y-1) | Dispersion liquid (f-1) | 73.1 | 19.7 | 11.8 | Solution (i) | Acrylic resin (x-i) [BA/AA = 90/10 (wt %), Mw = 630,000] | 269 | 9.1 |
| Production Example y-2 | (y-2) | Dispersion liquid (f-2) | 69.7 | 20.9 | 12.5 | Solution (ii) | Acrylic resin (x-ii) [BA/AA = 90/10 (wt %), Mw = 470,000] | 185 | 6.8 |

| | Crosslinking agent | | | | | | |
|---|---|---|---|---|---|---|---|
| | Kind | Blending amount (parts by mass) | Blending amount of solid (parts by mass) | Blending amount of solid relative to 100 parts by mass of resin (parts by mass) | Diluent solvent Kind | Solid concentration of coating liquid (mass %) | Concentration (**) of fine particles in solid of coating solution (mass %) |
| Production Example y-1 | Al crosslinking agent | 2.67 | 0.13 | 0.78 | IPA/CHN | 24 | 41 |
| | Epoxy crosslinking agent | 0.40 | 0.02 | 0.12 | | | |
| Production Example y-2 | Al crosslinking agent | 5.25 | 0.26 | 1.71 | IPA/CHN | 24 | 45 |

(*) Content of fine particles in fine particle dispersion liquid: (y-1) is concerned with a value calculated from {[blending amount of solid] × 51.0/(340 + 51.0)}; and (y-2) is concerned with a value calculated from {[blending amount of solid] × 55.5/(37.0 + 55.5)}.
(**) Concentration of fine particles in solid of coating solution: A value calculated from {[content of fine particles]/([blending amount of solid in fine particle dispersion liquid] + [blending amount of solid of acrylic resin] + [blending amount of solid of crosslinking agent]) × 100}.

Examples 1 to 2

(1) Formation of Coating Film

On a release agent layer of a release film (manufactured by Lintec Corporation, a product name: "SP-PET381031", thickness: 38 μm, a PET film having a silicone release agent layer provided on one surface thereof) that is a first release material, the solution (xβ-1) of the resin composition prepared in Production Example x-1, the coating liquid (y-1) for forming the coating film (y') prepared in Production Example y-1, and the solution (xβ-1) of the resin composition for forming the coating film (xα') prepared in Production Example x-1 were simultaneously coated in this order from the upper portion of the release agent layer with a multilayer die coater (width: 250 mm), thereby simultaneously forming a coating film (xβ'), a coating film (y'), and a coating film (xα') in this order.

The coating speed of each of the solutions (coating liquids) for forming the coating film (xβ'), the coating film (y'), and the coating film (xα') and the coating amount of each of the coating films are shown in Table 3.

(2) Drying Treatment

The three layers of the coating film (xβ'), the coating film (y'), and the coating film (xα') were simultaneously dried at a drying temperature of 100° C. for 2 minutes, thereby (3) Production of Pressure Sensitive Adhesive Sheet without Substrate and Pressure Sensitive Adhesive Sheet with Substrate Lamination was performed in such a manner that the surface (α) of the formed resin layer was attached to a surface of a release agent layer of a release film (manufactured by Lintec Corporation, a product name: "SP-PET386040") that is a second release material, thereby producing a pressure sensitive adhesive sheet without a substrate.

After allowing the aforementioned pressure sensitive adhesive sheet without a substrate as similarly produced to stand under an environment at 23° C. for one week, the first release material was removed, and lamination was performed in such a manner that the exposed surface (β) of the resin layer was attached to a polyethylene terephthalate (PET) film (manufactured by Toray Industries, Inc., a product name: "Lumirror T60#50", thickness: 50 μm) that is a substrate, thereby producing a pressure sensitive adhesive sheet with a substrate.

Examples 3 to 4

(1) Formation of Coating Film

On a surface of a polyethylene terephthalate (PET) film having an aluminum vapor deposition layer on one surface thereof (manufactured by Lintec Corporation, a product name: "FNS MAT N50", thickness: 50 μm), the solution (xβ-2) of the resin composition prepared in Production Example x-2, the coating liquid (y-2) for forming the coating film (y') prepared in Production Example y-2, and the solution (xα-1) or (xα-2) of the resin composition prepared in Production Example x-3 or x-4 were simultaneously coated in this order from the upper portion of the aluminum vapor deposition layer with a multilayer die coater (width: 250 mm), thereby simultaneously forming a coating film (xβ'), a coating film (y'), and a coating film (xα') in this order.

The coating speed of each of the solutions (coating liquids) for forming the coating film (xβ'), the coating film (y'), and the coating film (xα') and the coating amount of each of the coating films are shown in Table 3.

(2) Drying Treatment

The three layers of the coating film (xβ'), the coating film (y'), and the coating film (xα') were simultaneously dried at a drying temperature of 100° C. for 2 minutes, thereby forming a resin layer containing a resin part (X) and a particle part (Y) having the thickness shown in Table 3.

In all of Examples 3 to 4, plural concave portions and flat faces were also confirmed on the surface (α) of the formed resin layer through visual inspection.

(3) Production of Pressure Sensitive Adhesive Sheet with Substrate

Lamination was performed in such a manner that the surface (α) of the formed resin layer was attached to a surface of a release agent layer of a release film (manufactured by Lintec Corporation, a product name: "SP-PET381031"), thereby producing a pressure sensitive adhesive sheet with a substrate.

As the relief formed face of the metal engraved plate, those processed such that respective concave portions and flat faces were formed on the surface (α) of the resin layer of the pressure sensitive adhesive sheet produced in each of Comparative Examples 1 to 4 were used.

(2) Production of Pressure Sensitive Adhesive Sheet with Substrate

On the release agent layer of the embossed release paper produced in the above (1), the solution (xβ-1) of the resin composition prepared in Production Example x-1 as shown in Table 1 was coated with an applicator and then dried at 100° C. for 1 minute, thereby forming a resin layer so as to have the coating speed and the coating amount of each coating film as described in Example in Table 3.

Then, lamination was performed in such a manner that surface (α) of the resin layer was attached to a PET film (manufactured by Toray Industries, Inc., a product name: "Lumirror T60#50", thickness: 50 μm), thereby producing a pressure sensitive adhesive sheet with a substrate.

Using the pressure sensitive adhesive sheet without a substrate or the pressure sensitive adhesive sheet with a substrate produced in each of the Examples and Comparative Examples, characteristics of the resin layer which the pressure sensitive adhesive sheet had and the pressure sensitive adhesive sheet were measured or observed by the following methods. The results are shown in Table 4.

(1) Production of Measurement Sample

As shown in FIG. 6(a), in order to exclude any influence, such as undulations of the pressure sensitive adhesive sheet, a no-alkali glass (a product name: "EAGLE XG", manufactured by Corning Incorporated) that is an adherend 101 having a smooth face and the substrate of the pressure sensitive adhesive sheet produced in each of the Examples

TABLE 3

| | Coating speed (m/min) | Coating amount of coating film (g/m²) | | | Coating film (xβ') Kind of solution | Kind of coating liquid | Coating film (y') Concentration of fine particles in coating film (y') (mass %) | Coating film (xα') Kind of solution | Thickness of resin layer (μm) |
|---|---|---|---|---|---|---|---|---|---|
| | | Coating film (xβ') | Coating film (y') | Coating film (xα') | | | | | |
| Example 1 | 5.0 | 43.7 | 35.0 | 55.0 | (xβ-1) | (y-1) | 41 | (xβ-1) | 32 |
| Example 2 | 5.0 | 54.2 | 50.0 | 55.0 | (xβ-1) | (y-1) | 41 | (xβ-1) | 38 |
| Example 3 | 5.0 | 26.7 | 50.0 | 52.0 | (xβ-2) | (y-2) | 45 | (xα-1) | 34 |
| Example 4 | 5.0 | 27.0 | 48.2 | 56.2 | (xβ-2) | (y-2) | 45 | (xα-2) | 35 |

Comparative Examples 1 to 4

(1) Production of Embossed Release Paper

On one surface of a wood-free paper, a 25 μm-thick resin film made of a low-density polyethylene resin (manufactured by Sumitomo Chemical Co., Ltd., a product name: "SUMIKATHENE (L705)", melting point: 106° C.) was formed. A relief formed face of a metal engraved plate as shown in FIGS. 11 to 14 was brought into intimate contact with the surface of the resin film and inserted in that state between two rotating silicon rubber rollers heated at 115° C., thereby subjecting the surface of the resin layer to emboss processing.

On the surface of the resin layer after the emboss processing, a silicone release agent (manufactured by Lintec Corporation, the same release agent as a product name: "SP-PET1031") and then dried at 100° C. for 1 minute, thereby producing a 110 μm-thick embossed release paper.

and Comparative Examples were attached to each other via a double-sided pressure sensitive adhesive tape.

Then, the release material laminated on the surface (α) of the resin layer of the pressure sensitive adhesive sheet was removed, and the resultant in which the surface (α) of the resin layer was exposed was used as the measurement sample.

<Whether or not Concave Portion and Flat Face can be Confirmed Through Visual Inspection>

Evaluation Item (a):

The exposed surface (α) of the resin layer of the aforementioned measurement sample was observed through visual inspection, and whether or not the existence of the concave portion and flat face on the surface (α) could be confirmed through visual inspection was evaluated according to the following criteria.

A: The existence of the concave portion and flat face on the surface (α) can be confirmed through visual inspection.

F: The existence of the concave portion and flat face on the surface (α) cannot be confirmed through visual inspection.

(2) Acquirement of Image of Region (D) on Surface (α)

The exposed surface (α) of the resin layer of the aforementioned measurement sample was photographed regarding freely-selected regions adjoining each other on the surface (α) with a digital microscope (magnification: 50 times) from the A direction of FIG. 6(a), to acquire a connected image in which neighboring plural images were connected using an image connecting function of the digital microscope.

More specifically, in photographing, a focus was successively moved from the upper portion of a site which was considered to be a flat face through visual inspection from the A direction of FIG. 6(a), and any portion which was first in focus was photographed as the flat face.

In the acquired connected image, one region of the region (D) surrounded by a rectangle of 8 mm in length×10 mm in width was freely-selected, and this was defined as an "image of the region (D)".

In the acquired connected image, one region of the region (Q) surrounded by a square having an edge length of 1 mm was freely-selected, and this was defined as an "image of the region (Q)".

The photographing conditions with the digital microscope are as follows.

(Measuring Instrument)

A product name "Digital Microscope VHX-5000", manufactured by Keyence Corporation, High-resolution Zoom Lens VHX-ZST (100×)

(Measurement Conditions)
Epi-illumination: ON
Stage transmitted illumination: OFF
Switching of illumination: Coaxial epi-illumination
Edge enhancement: OFF <Evaluation Regarding Shapes, Etc. Of Concave Portion and Flat Face>

From the "image of the region (D)" acquired in the above (2), the observation regarding the following evaluation items (b1) to (b4) and (c1) to (c4) was performed, and the evaluation according to respective criteria was performed.

The results evaluations are shown in Table 4.

(Evaluation Items Regarding Shape and Position of Flat Faces Existing in Region (D))

Evaluation Item (b1):

The "image of the region (D)" acquired in the above (2) was observed, and the presence or absence of the existence of the concave portion and the plural flat faces having an irregular shape was observed and evaluated according to the following criteria. The results evaluations are shown in Table 4.

A: In the region (D), the existence of the concave portion and the plural flat faces having an irregular shape was confirmed.

B: In the region (D), though the existence of the concave portion and the plural flat faces was confirmed, all of the confirmed flat faces were regular, and the existence of an irregular flat face could not be confirmed.

C: In the region (D), the existence of the concave portion and the irregular flat face could not be confirmed.

In the aforementioned evaluation item (b1), the observation regarding the following evaluation items (b2) to (b4) and (c1) to (c4) was performed, and the evaluation according to the respective criteria was performed. The results of these evaluations are shown in Table 4.

(Evaluation Items Regarding Shape and Position of Flat Face Existing in Region (D))

Evaluation Item (b2):

Whether or not a flat face having an area such that a region surrounded by a circle having a diameter of 100 μm or more is selectable exists in the region (D) was evaluated according to the following criteria.

A+: A flat face having an area such that a region surrounded by a circle having a diameter of 200 μm is selectable exists in the region (D).

A: A flat face having an area such that a region surrounded by a circle having a diameter of 150 μm is selectable exists in the region (D).

B: A flat face having an area such that a region surrounded by a circle having a diameter of 100 μm is selectable exists in the region (D).

C: A flat face having an area such that a region surrounded by a circle having a diameter of 100 μm is selectable does not exist in the region (D).

Evaluation Item (b3):

Whether or not the position at which the plural flat faces of the region (D) exist has periodicity was evaluated according to the following criteria.

A: The position at which the plural flat faces exists does not have periodicity.

F: The position at which the plural flat faces exists has periodicity, or the plural flat faces do not exist in the region (D).

Evaluation Item (b4):

Whether or not the shape of the flat face existing in the region (D) has a shape so as to have a fixed repeating unit was evaluated according to the following criteria.

A: The shape of the flat face does not have a shape so as to have a fixed repeating unit.

F: The shape of the flat face has a shape so as to have a fixed repeating unit.

(Evaluation Items Regarding Shape and Position of Concave Portion Existing in Region (D))

Evaluation Item (c1):

Whether or not the irregular concave portion exists in the region (D) was evaluated according to the following criteria.

A: Plural irregular concave portions exist.

B: Only one irregular concave portion exists.

C: An irregular concave portion does not exist.

Evaluation Item (c2):

Whether or not the plural concave portions exist in the region (D), and the position at which the plural concave portions exist has periodicity was evaluated according to the following criteria.

A: The position at which the plural concave portions exist does not have periodicity.

F: The position at which the plural concave portions exist has periodicity, or the plural concave portions do not exist in the region (D).

Evaluation Item (c3);

Whether or not the shape of the concave portion existing in the region (D) has a shape so as to have a fixed repeating unit was evaluated according to the following criteria.

A: The shape of the concave portion does not have a shape so as to have a fixed repeating unit.

F: The shape of the concave portion has a shape so as to have a fixed repeating unit.

Evaluation Item (c4):

In the region (D), whether or not one or more concave portions not having contour lines that are approximately parallel straight lines of 50 μm exist on the both sides of the concave portion was evaluated through visual inspection;

and in the case the contour lines of the concave portion exist in a state of the approximately parallel straight lines, the length of the approximately parallel straight lines along the contour lines of the concave portion was measured by using a scale function of a digital microscope (magnification: 50 times), whereby whether or not these lines are the "approximately parallel straight line of 50 μm" was evaluated according to the following criteria.

A: In the region (D), one or more concave portions not having contour lines that are an approximately parallel straight line of 50 μm exist on the both sides of the concave portion.

B: In the region (D), though a concave portion having contour lines that are approximately parallel straight lines exists on the both sides of the concave portion, the length of the approximately parallel straight line of the contour lines on the both sides of the concave portion is 50 μm or less.

C: In the region (D), one or more concave portions having contour lines that are approximately parallel straight lines of 50 μm exist on the both sides of the concave portion.
(Evaluation Item Regarding Presence or Absence of Existence of Irregular Concave Portion in Region (Q))
Evaluation Item (c4):

From the acquired "image of the region (Q)", whether or not the irregular concave portion exists in the region (Q) was evaluated according to the following criteria.

A: Plural irregular concave portions exist in the region (Q).

B: Only one irregular concave portion exists in the region (Q).

C: An irregular concave portion does not exist in the region (Q).
(3) Measurement of Areas of Concave Portion and Flat Face Existing in Region (D)

Automatic area measurement was performed with the same digital microscope as described above on the basis of the "image of the region (D)" as acquired in the above (2), thereby obtaining areas of each concave portion and each flat face existing in the region (D), respectively.

In the automatic area measurement, the flat faces and the concave portions existing in the region (D) were binarized with a digital microscope and if desired, image processing through visual inspection, and measurement of numerical values (areas) of the resulting binarized images was then performed, thereby measuring areas of each concave portion and each flat face. In the case where plural concave portions and plural flat faces existed, the areas of the respective concave portions and flat faces were measured.

In the case where whether or not the flat face existed could not be judged through visual inspection of the image, a translucent adherend having a smooth surface was manually attached on the surface (α) of the resin layer by using a squeegee without applying a load as far as possible, an interface between the smooth surface 100a of the translucent adherend 100 and the surface (α) 12a of the resin layer 12 was photographed from the W direction in FIG. 6(b), and in the surface (α) 12a, any portion attached to the smooth surface 100a was judged as the flat face.

Similar to the "adherend having a smooth surface", a no-alkali glass (a product name: "EAGLE XG", manufactured by Corning Incorporated) was used for the translucent adherend 100 having the smooth surface 100a.

Various measured values (e.g., an average value, a standard deviation, a maximum value, a minimum value) were calculated from data regarding the area of each concave portion and the area of each flat face by using a graph software (Excel, available from Microsoft Japan Co., Ltd.).

The conditions of the automatic area measurement are as follows.
(Automatic Area Measurement Conditions)

Extraction mode: Illuminance (noise removal: weak)

Extraction region: To extract a rectangle of 8 mm in length×10 mm in width by numerical value designation (rectangle)

Shaping of extraction region: Particle removal (removal of an area of 100 μm$^2$ or less)

In the case where whether or not the flat face existed could not be judged through visual inspection of the image, a translucent adherend having a smooth surface was manually attached on the surface (α) of the resin layer by using a squeegee without applying a load as far as possible, an interface between the smooth surface 100a of the translucent adherend 100 and the surface (α) 12a of the resin layer 12 was photographed from the W direction in FIG. 4(b), and in the surface (α) 12a, any portion attached to the smooth surface 100a was judged as the flat face.
<Occupying Area Ratio of Flat Face or Concave Portion>

The "occupying area ratio (%) of the flat face" and the "occupying area ratio (%) of the concave portion" relative to the whole area of the region (D) were calculated. The results of the evaluation are shown in Table 4.

Calculation or evaluation of physical property values regarding the following evaluation items (d1) to (d2) and (e1) to (e2) was also performed. The results of these evaluations are shown in Table 4.
<Evaluation Regarding Areas of Flat Face and Concave Portion Existing in Region (D)>
Evaluation Item (d1):

Whether or not a flat face having an area of 0.2 mm$^2$ exists in the region (D) was evaluated according to the following criteria A+: Plural flat faces having an area of 0.4 mm$^2$ or more exist.

A: One flat face having an area of 0.4 mm$^2$ or more exists, and separately, plural flat faces having an area of 0.2 mm$^2$ or more and less than 0.4 mm$^2$ exist.

B+: Plural flat faces having an area of 0.2 mm$^2$ or more and less than 0.4 mm$^2$ exist.

B: One flat face having an area of 0.2 mm$^2$ or more and less than 0.4 mm$^2$ exists.

C: A maximum value of the area of the flat face existing in the region (D) is less than 0.2 mm$^2$.
Evaluation Item (d2):

An occupying area ratio of the irregular flat face existing in the region (D) relative to the whole area of the flat faces existing in the region (D) was calculated and evaluated according to the following criteria.

A+: The occupying area ratio of the irregular flat face is 100%.

A: The occupying area ratio of the irregular flat face is 90% or more and less than 100%.

B: The occupying area ratio of the irregular flat face is 80% or more and less than 90%.

C: The occupying area ratio of the irregular flat face is less than 80%.
Evaluation Item (e1):

An occupying area ratio of the concave portion having a maximum area in the region (D) relative to the whole area of the concave portions existing in the region (D) was calculated according to the following expression.

[Occupying area ratio (%) of concave portion having maximum area]=[Area of concave portion having maximum area]/[Total area of concave portions]×100

Evaluation Item (e2):

An occupying area ratio of the irregular concave portion existing in the region (D) relative to the whole area of the concave portions existing in the region (D) was calculated and evaluated according to the following criteria.

A+: The occupying area ratio of the irregular concave portion is 100%.

A: The occupying area ratio of the irregular concave portion is 90% or more and less than 100%.

B: The occupying area ratio of the irregular concave portion is 80% or more and less than 90%.

C: The occupying area ratio of the irregular concave portion is less than 80%.

(4) Measurement and Calculation of Physical Property Values Regarding Flat Face (S) Existing in Region (D)

<Skewness Sk Value Regarding Flat Face (S)>

One or more flat faces (S) excluding flat faces having a cumulative relative frequency of 30% or less determined by adding the relative frequency from the respective flat faces with a smaller area were sorted on the basis of a value of each of areas of the plural flat face existing in the region (D) measured in the above (2).

Then, with respect to the area of each of the sorted flat faces (S), the skewness Sk value relative to a normal distribution curve between the area and the frequency of each of the flat faces (S) was calculated on the basis of the following expression (2) by using a graph software (Excel, available from Microsoft Japan Co., Ltd.).

That is, the area of each of the obtained concave portions and the data of the area of each of the flat faces were sorted by using a graph software (Excel, available from Microsoft Japan Co., Ltd.).

Then, from the foregoing data, the data of the "flat face (S)" excluding flat faces having a cumulative relative frequency of 30% or less determined by adding the relative frequency from the respective flat faces with a smaller area were extracted. In addition to that, an average value of the actually measured values of the areas of the flat face (S) was calculated.

In the case where a sum total of areas of the areas of the flat face (S) is defined as 100, a standard deviation against the average value of areas of the flat face (S), a skewness Sk value relative to a normal distribution curve between the area and the frequency of each of the flat faces (S), and a kurtosis Ku value were calculated. The calculation results are shown in Table 4.

Then, with respect to the area of each of the sorted flat faces (S), the skewness Sk value relative to a normal distribution curve between the area (or perimeter) and the frequency of each of the flat faces (S) was calculated according to the following expression (2), and the kurtosis Ku value was calculated according to the following expression (3), by using a graph software (Excel, available from Microsoft Japan Co., Ltd.).

Similar to the "adherend having a smooth surface", a no-alkali glass (a product name: "EAGLE XG (registered trademark)", manufactured by Corning Incorporated) was used for the translucent adherend 100 having the smooth surface 100a.

$$Sk = \frac{n}{(n-1)(n-2)} \sum_{i=1}^{n} \frac{(x_i - \mu)^3}{s^3} \quad (2)$$

In the expression (2), n represents the number of flat faces (S); $x_i$ represents an area of each of flat faces (S) (i: 1, 2, ... n); $\mu$ represents an average value of areas of respective flat faces (S); and s represents a sample standard deviation.

<Kurtosis Ku Value Regarding Flat Faces (S)>

One or more flat faces (S) excluding flat faces having a cumulative relative frequency of 30% or less determined by adding the relative frequency from the respective flat faces with a smaller area were extracted on the basis of the value of the area of each of the plural flat faces existing in the region (Dc) measured in the above (3).

With respect to the area of each of the selected flat faces (S), the kurtosis Ku value relative to a normal distribution curve between the area and the frequency of each of the flat faces (S) was calculated on the basis of the following expression (3) by using a graph software (Excel, available from Microsoft Japan Co., Ltd.).

$$Ku = \frac{n(n+1)}{(n-1)(n-2)(n-3)} \sum_{i=1}^{n} \frac{(x_i - \mu)^4}{s^4} - \frac{3(n-1)^2}{(n-2)(n-3)} \quad (3)$$

In the expression (3), n represents the number of flat faces (S); $x_i$ represents an area of each of flat faces (S) (i: 1, 2, ... n); $\mu$ represents an average value of areas of respective flat faces (S); and s represents a sample standard deviation.

(5) Acquirement of Cross Sectional Image of Region (P)

As shown in FIG. 4, the region (P) surrounded by the square 50 having an edge length of 5 mm was freely-selected on the surface (α) 12a of the resin layer 12 of the pressure sensitive adhesive sheet with a substrate produced in each of the Examples and Comparative Examples.

Then, the two cross sections 61 and 62 of the pressure sensitive adhesive sheet with a substrate on cutting the region (P) with a plane surface going through each of the two diagonal lines 51 and 52 of the square 50 of the region (P) and being perpendicular to the region (P) on the surface (α) 12a were observed with a scanning electron microscope (manufactured by Hitachi, Ltd., a product name: "S-4700") under conditions at an accelerating voltage of 5 kV and at a magnification of 500 times, thereby acquiring two cross sectional images.

Using these two cross sectional images, the following evaluation item (f) was evaluated. The results are shown in Table 4.

<Evaluation Regarding Cross Section of Region (P)>

Evaluation Item (f):

Whether or not the plural concave portions as prescribed in the following requirement (IIa) and the flat face as prescribed in the following requirement (IIb) exist on the side of the surface (α) of the two cross sectional images acquired in the above (4) was evaluated according to the following criteria.

Requirement (IIa): Plural concave portions having a maximum height difference of 40% or more of a total thickness of the resin layer 12 and having a different shape of the cut part from each other exist on the side of the surface (α) 12a of the acquired cross sectional image.

Requirement (IIb): A flat portion corresponding to the cut part of the flat face existing in the region (P) and approximately parallel to the surface of the substrate 11 coming into contact with the resin layer 12 exists on the side of the surface (α) 12a of the acquired cross sectional image.

(Evaluation Criteria)

A: All of the acquired two cross sectional images satisfied both the requirements (IIa) and (IIb).

B: Only one of the acquired two cross sectional images satisfied both the requirements (IIa) and (IIb).

C: In the acquired two cross sectional images, any cross sectional image satisfying both the requirements (IIa) and (IIb) could not be confirmed.

<Evaluation of Existence of Concave Portion Having Maximum Height Difference of 0.5 µm or More of Surface (α)>

In a cross section of the region (D) of the pressure sensitive adhesive sheet with a substrate produced in each of the Examples and Comparative Examples obtained by cutting by a plane vertical to the region (D) surrounded by a rectangle of 8 mm in length×10 mm in width that is freely-selected on the surface (α) of the resin layer thereof, a height difference of each existing concave portion was observed with a scanning electron microscope (manufactured by Hitachi, Ltd., a product name: "S-4700") under conditions at an accelerating voltage of 5 kV and at a magnification of 500 times, thereby acquiring a cross sectional image.

In this cross sectional image, whether or not any concave portion having a maximum height difference of 0.5 µm or more exists on the side of the surface (α) 12a was evaluated according to the following criteria.

A: The concave portion having a maximum height difference of 0.5 µm or more exists.

F: The concave portion having a maximum height difference of 0.5 µm or more does not exist.

<Mass Retention Rate of Resin Layer of Pressure Sensitive Adhesive Sheet>

After a sole resin layer was obtained from the pressure sensitive adhesive sheet, the mass of the resin layer before heating was measured. The resin layer was then heated to 800° C. for 30 minutes in a muffle furnace (manufactured by Denken Co., Ltd., a product name: "KDF-P90"). The resin layer after heating was measured for the mass thereof, and the mass retention rate of the resin layer was calculated according to the following expression. The values are shown in Table 4.

Mass retention rate of resin layer (%)=(Mass of resin layer after heating)/(Mass of resin layer before heating)×100

<Air Escape Property>

The pressure sensitive adhesive sheet with a substrate in a size of 50 mm in length and 50 mm in width was attached to a melamine-coated plate as an adherend in a manner forming air accumulation, and two types of samples of the case of strongly press-attaching the surroundings of the air accumulation with a squeegee and the case of weakly press-attaching the surroundings of the air accumulation with a squeegee were produced. After attaching for removing the air accumulation with the squeegee, the presence or absence of the air accumulation was observed, and the air escape property of each of the pressure sensitive adhesive sheets was evaluated according to the following criteria. The evaluation results are shown in Table 4.

5: In all of the case of weakly attaching and the case of strongly attaching, the air accumulation disappears.

4: In the case of weakly attaching, the air accumulation disappears. In the case of strongly attaching, the majority of the air accumulation disappears, and when again attached, the air accumulation remained disappears.

3: In the case of weakly attaching, the air accumulation disappears. On the other hand, in the case of strongly attaching, a site where the air accumulation remained remains exists.

2: In the case of weakly attaching, the majority of the air accumulation disappears, and when again attached, the air accumulation remained disappears. On the other hand, in the case of strongly attaching, the air accumulation remains.

1: In all of the case of weakly attaching and the case of strongly attaching, the air accumulation remains.

<Pressure Sensitive Adhesive Strength>

The pressure sensitive adhesive sheet with a substrate produced in each of the Examples and Comparative Examples was cut into a size of 25 mm in length and 300 mm in width, and the surface (α) of the resin layer of the pressure sensitive adhesive sheet was attached to a stainless steel plate (SUS304, polished with #360 polishing paper) under an environment of 23° C. and 50% RH (relative humidity), followed by allowing to stand in the same environment for 24 hours. After standing, the pressure sensitive adhesive strength of each of the pressure sensitive adhesive sheets was measured according to JIS Z0237:2000 by the 180° peeling method at a peeling speed of 300 mm/min. The measurement results are shown in Table 4.

<Blister Resistance>

The pressure sensitive adhesive sheet with a substrate in a size of 50 mm in length and 50 mm in width was attached to a polymethyl methacrylate plate having a size of 70 mm in length, 150 mm in width, and 2 mm in thickness (manufactured by Mitsubishi Rayon Co., Ltd., a product name: "ACRYLITE L001"), followed by press-attaching with a squeegee, thereby producing a test sample.

The test sample was allowed to stand at 23° C. for 12 hours, then allowed to stand in a hot air dryer at 80° C. for 1.5 hours, further allowed to stand in a hot air dryer at 90° C. for 1.5 hours, and then confirmed for the occurrence state of blister after the heat acceleration through visual inspection, and the blister resistance of each of the pressure sensitive adhesive sheets was evaluated according to the following criteria. The evaluation results are shown in Table 4.

A: Completely no blister was observed.

B: Blister was partially observed.

C: Blister was observed over the surface.

<Water Resistance>

The pressure sensitive adhesive sheet with a substrate in a size of 50 mm in length×50 mm in width was attached to a no-alkali glass of 70 mm in length×150 mm in width (a product name: "EAGLE XG", manufactured by Corning Incorporated) by using a squeegee, thereby producing a sample for water resistance test.

After allowing this sample for water resistance test to stand for 30 minutes, the sample was clipped in water in a depth of 5 cm in a metal vat and allowed to stand for one hour. Thereafter, an interface between the adherend and the pressure sensitive adhesive was observed from the glass side through visual inspection, thereby evaluating the water resistance of each of the pressure sensitive adhesive sheets according to the following criteria. All of the items were performed under an environment of 23° C. and a relative humidity (RH) of 50%.

A: Invasion of water into the interface between the adherend and the pressure sensitive adhesive could not be confirmed.

B: In the interface between the adherend and the pressure sensitive adhesive, invasion of water could be confirmed in an amount of 2 mm or less from the edge between the adherend and the pressure sensitive adhesive, and after allowing to stand for 24 hours, invasion of water could not be confirmed.

C: Water invaded into the interface between the adherend and the pressure sensitive adhesive, and generation of lifting from the edge between the adherend and the pressure sensitive adhesive could be confirmed.

In these binarized images, black parts of the binarized image are corresponding to the flat face, and white parts thereof are corresponding to the concave portion.

Figure 7:
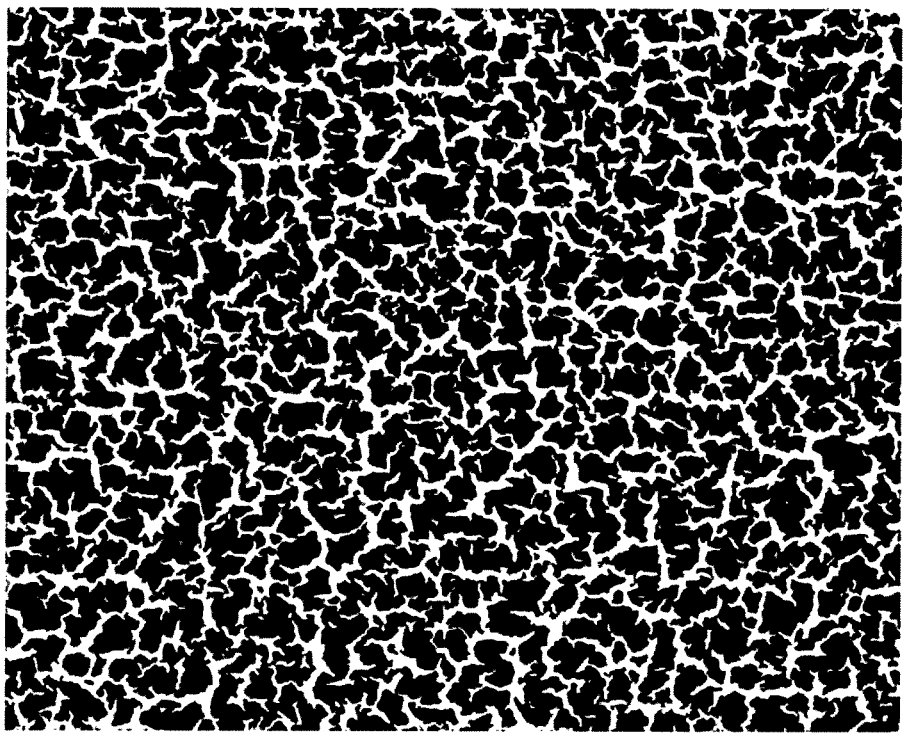
FIG. 7(a) is a binarized image resulting from binarization of an image obtained by photographing the region (D) surrounded by a rectangle of 8 mm in length×10 mm in width that is freely-selected on the exposed surface (α) of the resin layer of the pressure sensitive adhesive sheet produced in Example 1, from the side of the surface (α) with a digital microscope. Black parts of the binarized image are corresponding to the flat face, and white parts thereof are corresponding to the concave portion.
FIG. 7(b) is a cross sectional image acquired by observing a cross section of the pressure sensitive adhesive sheet produced in Example 1 with a scanning microscope.
Figure 7:
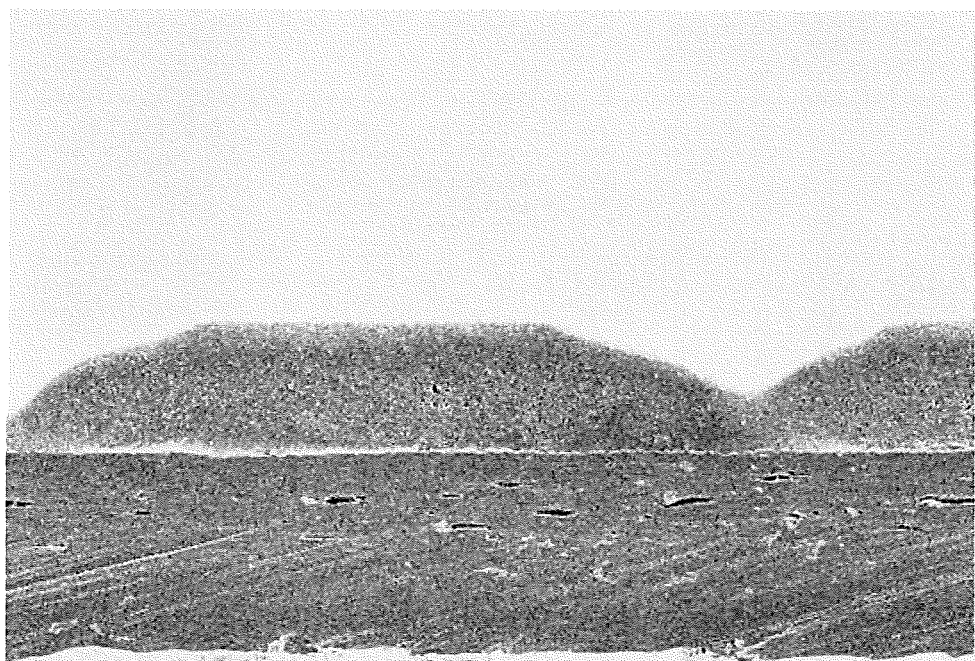
Figure 8:
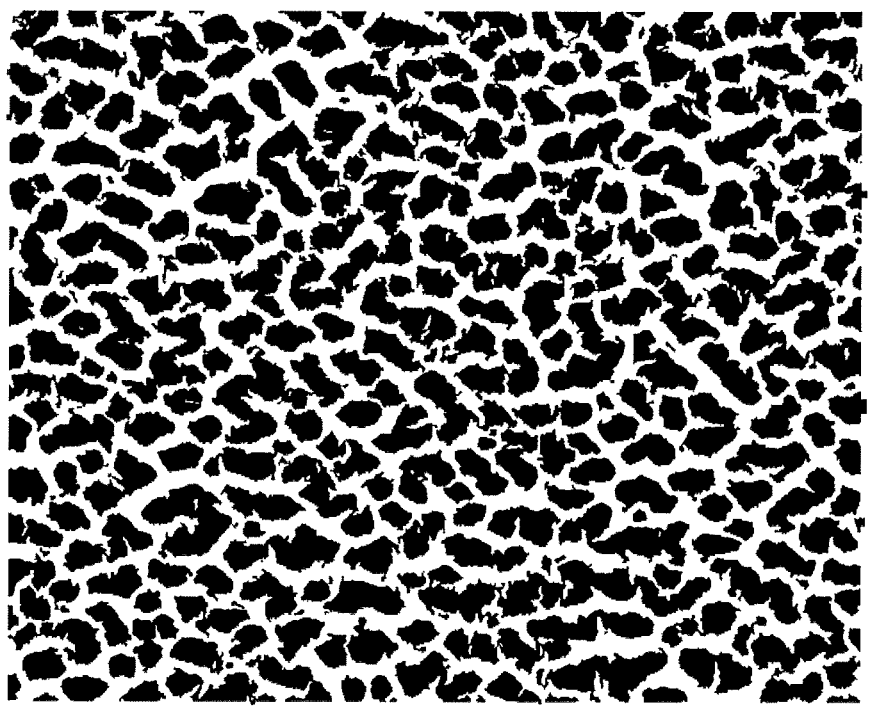
FIG. 8 is a binarized image resulting from binarization of an image obtained by photographing the region (D) surrounded by a rectangle of 8 mm in length×10 mm in width that is freely-selected on the exposed surface (α) of the resin layer of the pressure sensitive adhesive sheet produced in Example 2, from the side of the surface (α) with a digital microscope. Black parts of the binarized image are corresponding to the flat face, and white parts thereof are corresponding to the concave portion.
Figure 9:
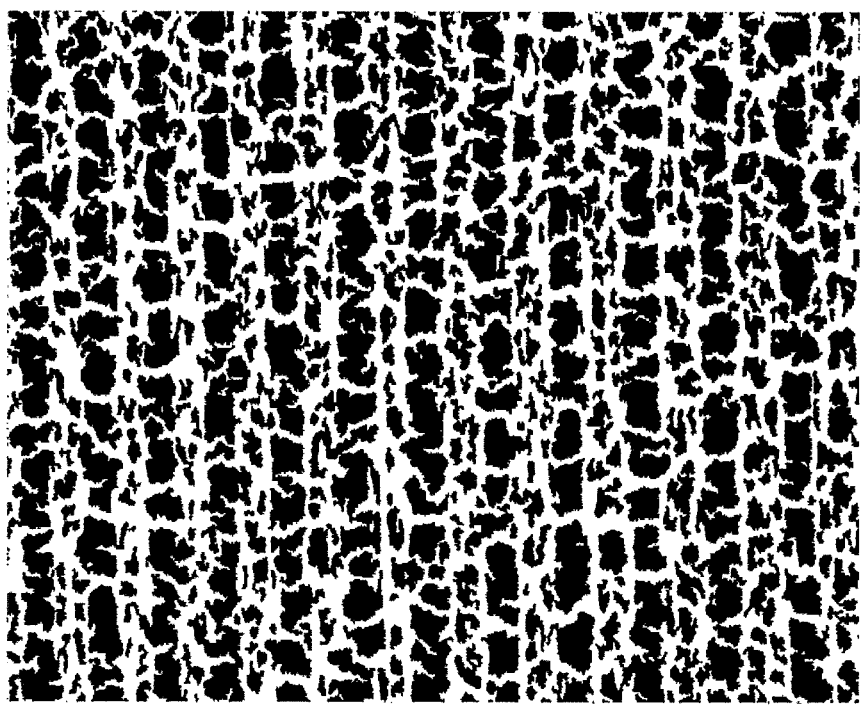
FIG. 9 is a binarized image resulting from binarization of an image obtained by photographing the region (D) surrounded by a rectangle of 8 mm in length×10 mm in width that is freely-selected on the exposed surface (α) of the resin layer of the pressure sensitive adhesive sheet produced in Example 3, from the side of the surface (α) with a digital microscope. Black parts of the binarized image are corresponding to the flat face, and white parts thereof are corresponding to the concave portion.
Figure 10:
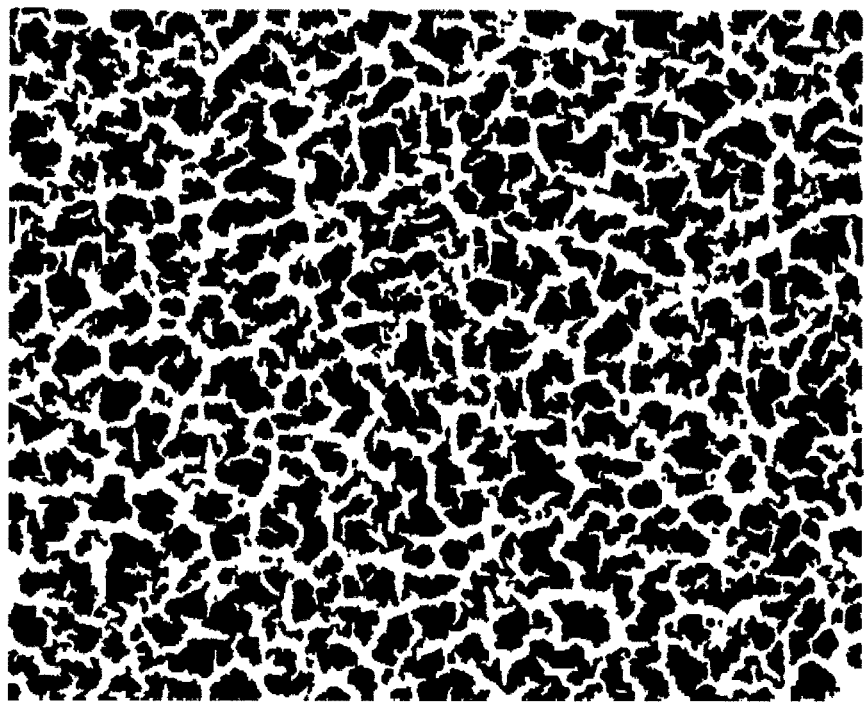
FIG. 10 is a binarized image resulting from binarization of an image obtained by photographing the region (D) surrounded by a rectangle of 8 mm in length×10 mm in width that is freely-selected on the exposed surface (α) of the resin layer of the pressure sensitive adhesive sheet produced in Example 4, from the side of the surface (α) with a digital microscope. Black parts of the binarized image are corresponding to the flat face, and white parts thereof are corresponding to the concave portion.
Figure 11:
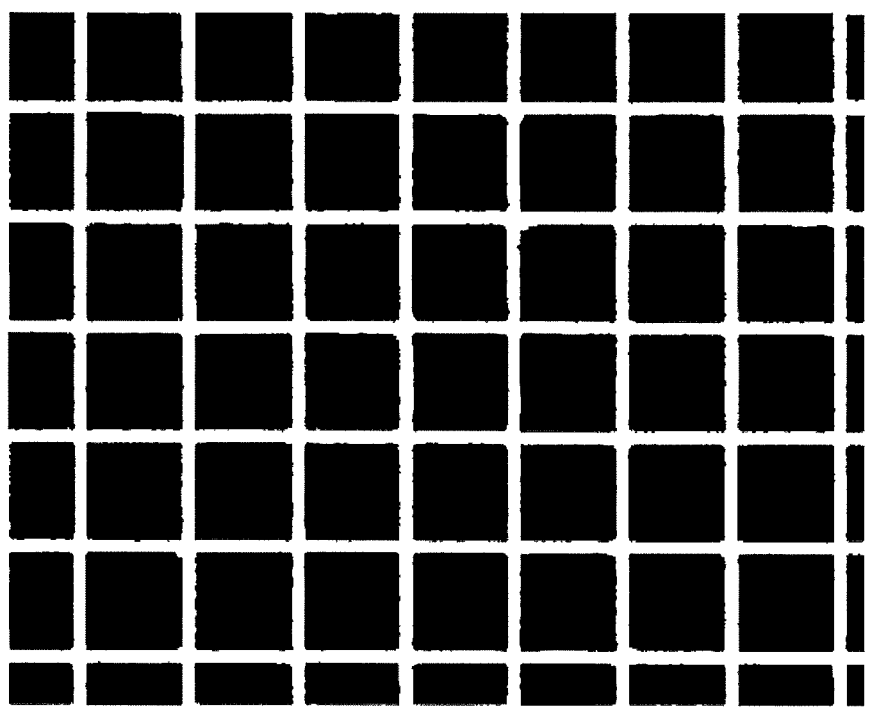
FIG. 11 is a binarized image resulting from binarization of an image obtained by photographing the region (D) surrounded by a rectangle of 8 mm in length×10 mm in width that is freely-selected on the exposed surface (α) of the resin layer of the pressure sensitive adhesive sheet produced in Comparative Example 1, from the side of the surface (α) with a digital microscope. Black parts of the binarized image are corresponding to the flat face, and white parts thereof are corresponding to the concave portion.
Figure 12:
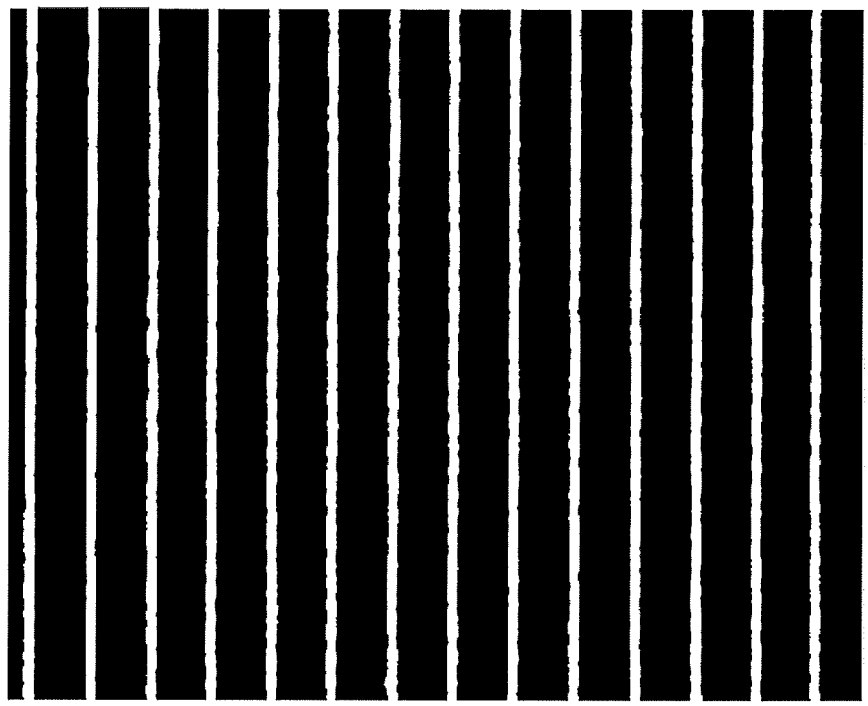
FIG. 12 is a binarized image resulting from binarization of an image obtained by photographing the region (D) surrounded by a rectangle of 8 mm in length×10 mm in width that is freely-selected on the exposed surface (α) of the resin layer of the pressure sensitive adhesive sheet produced in Comparative Example 2, from the side of the surface (α) with a digital microscope. Black parts of the binarized image are corresponding to the flat face, and white parts thereof are corresponding to the concave portion.
Figure 13:
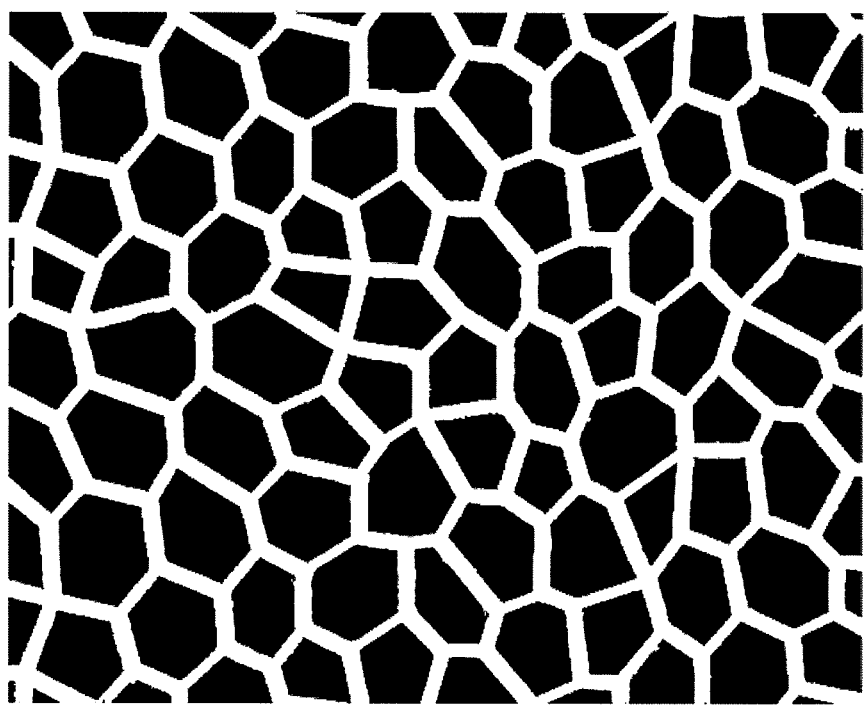
FIG. 13 is a binarized image resulting from binarization of an image obtained by photographing the region (D) surrounded by a rectangle of 8 mm in length×10 mm in width that is freely-selected on the exposed surface (α) of the resin layer of the pressure sensitive adhesive sheet produced in Comparative Example 3, from the side of the surface (α) with a digital microscope. Black parts of the binarized image are corresponding to the flat face, and white parts thereof are corresponding to the concave portion.
Figure 14:
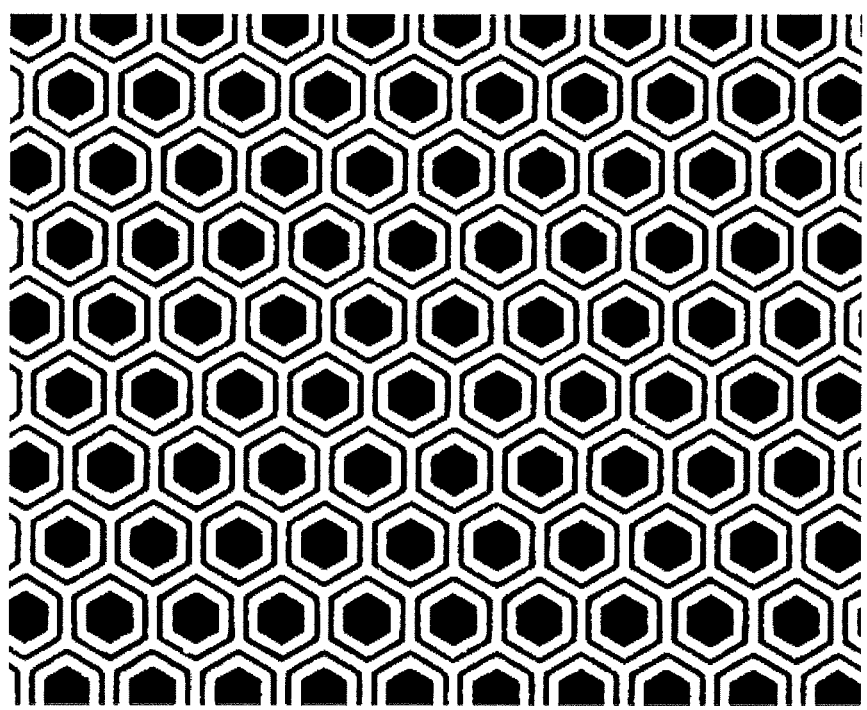
FIG. 14 is a binarized image resulting from binarization of an image obtained by photographing the region (D) surrounded by a rectangle of 8 mm in length×10 mm in width that is freely-selected on the exposed surface (α) of the resin layer of the pressure sensitive adhesive sheet produced in Comparative Example 4, from the side of the surface (α) with a digital microscope. Black parts of the binarized image are corresponding to the flat face, and white parts thereof are corresponding to the concave portion.

FIG. 7(b) is a cross sectional image acquired by observing a cross section of the pressure sensitive adhesive sheet produced in Example 1 with a scanning microscope. The

| Evaluation contents | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Item (a): Propriety of confirmation of concave portion-flat face through visual inspection | | | A | A | A | A | A | A | A | A |
| Evaluation regarding shape, etc. of concave portion-flat face existing in region (D) | Concave portion-flat face | Item (b1) | A | A | A | A | B | B | B | B |
| | Flat face | Item (b2) | A+ | A+ | A+ | A+ | A+ | A+ | A+ | A+ |
| | | Item (b3) | A | A | A | A | F | F | A | F |
| | | Item (b4) | A | A | A | A | F | F | A | F |
| | Concave portion | Item (c1) | A | A | A | A | C | C | C | C |
| | | Item (c2) | A | A | A | A | F | F | A | F |
| | | Item (c3) | A | A | A | A | F | F | A | F |
| | | Item (c4) | A | A | B | A | C | C | B | C |
| | | Item (c5) | A | A | A | A | C | C | C | C |
| Occupying area ratio of flat face (%) | | | 67.12 | 55.43 | 52.71 | 59.61 | 77.62 | 82.92 | 67.43 | 48.68 |
| Occupying area ratio of concave portion (%) | | | 32.78 | 44.57 | 47.29 | 40.39 | 22.38 | 17.08 | 32.57 | 51.32 |
| Evaluation regarding cross section of region (P) | Item (f): Presence or absence of plural concave portions as prescribed in requirement (IIa) and flat face as prescribed in requirement (IIb) | | A | A | A | A | C | C | C | C |
| Evaluation regarding areas of flat face and concave portion existing in region (D) | Flat face | Item (d1) | A+ | A+ | A+ | A+ | A+ | A+ | A+ | A+ |
| | | Item (d2) | A+ | A+ | A+ | A+ | C | C | C | C |
| | Concave portion | Item (e1) [%] | 83.72 | 99.13 | 99.14 | 95.33 | 100.00 | 7.32 | 100.00 | 41.53 |
| | | Item (e2) | A+ | A+ | A+ | A+ | C | C | C | C |
| Measured value regarding area of flat face (S) | | Skewness Sk value | 2.60 | 2.13 | 1.47 | 1.43 | 0.45 | 0.13 | 0.27 | −0.67 |
| | | Kurtosis Ku value | 6.99 | 5.20 | 2.22 | 2.19 | 0.00 | −1.39 | −0.84 | −1.47 |
| Evaluation regarding concave portion having height difference of 0.5 μm or more | | | A | A | A | A | A | A | A | A |
| Mass retention rate (%) of resin layer of pressure sensitive adhesive sheet | | | 9.80 | 10.50 | 11.00 | 10.60 | 0.00 | 0.00 | 0.00 | 0.00 |
| Evaluation of characteristics of pressure sensitive adhesive sheet | | Air escape property | 4 | 5 | 5 | 5 | 2 | 1 | 2 | 2 |
| | | Pressure sensitive adhesive strength (N/25 mm) | 16.50 | 13.70 | 13.50 | 14.50 | 16.90 | 17.50 | 15.70 | 9.50 |
| | | Blister resistance | B | A | A | A | C | C | B | B |
| | | Water resistance | A | B | A | A | C | B | C | C |

The pressure sensitive adhesive sheets of Examples 1 to 4 have the concave portion and the flat face as prescribed in the requirements (Ii) and and therefore, brought the results such that not only the air escape property capable of readily removing the air accumulation which is possibly generated is excellent, but also the water resistance and the pressure sensitive adhesion characteristics may be revealed with a well balance.

On the other hand, the pressure sensitive adhesive sheets of Comparative Examples 1 to 4 brought the results such that the air escape property is inferior as compared with the pressure sensitive adhesive sheets of the Examples.

FIG. 7(a) and FIGS. 8 to 14 are each a binarized image resulting from binarization of an image obtained by photographing the region (D) surrounded by a rectangle of 8 mm in length×10 mm in width that is freely-selected on the exposed surface (α) of the resin layer of the pressure sensitive adhesive sheet produced in each of Examples 1 to 4 and Comparative Examples 1 to 4, respectively, from the side of the surface (α) with a digital microscope.

Namely, the length of the image of each of FIG. 7(a) and FIGS. 8 to 14 is corresponding to "8 mm", and the width is corresponding to "10 mm".

cross sections of the pressure sensitive adhesive sheets of Examples 2 to 4 are analogous to the cross sectional image of FIG. 5.

INDUSTRIAL APPLICABILITY

One embodiment of the pressure sensitive adhesive sheet of the present invention is useful as a pressure sensitive adhesive sheet having a large adhesive area that is used for identification or decoration, for masking in coating, and for surface protection for metal plates, etc.

REFERENCE SIGNS LIST 1a, 11a, 12a, 1b, 2a, 2b: Pressure sensitive adhesive sheet
11: Substrate
12: Resin Layer
12a: Surface (α)
12b: Surface (β)
(X): Resin part (X)
(Y): Particle Part (Y)
(Xβ): Layer (Xβ) mainly containing the resin part (X)

(Xα): Layer (Xα) mainly containing the resin part (X)
(Y1): Layer (Y1) containing the particle part (Y) in an amount of 15% by mass or more
13, 13a, 131, 132: Concave portion
14: Flat face
14a: Flat portion
15: Convex portion
21, 22: Release material
50: Square
51, 52: Diagonal line
60: Cross section (P1)
61, 62: Cross section
100: Translucent adherend
100a: Smooth face
101: Adherend

The invention claimed is:

1. A pressure sensitive adhesive sheet, comprising:
a substrate or a release material; and
a resin layer provided on the substrate or the release material and comprising a resin part (X) comprising a resin as a main component and a particle part (Y) consisting of fine particles having a mean particle size of 0.01 to 100 μm,
wherein the fine particles comprise at least one selected from the group consisting of silica particles comprising 85 to 100% by mass of silica, metal oxide particles, and smectite particles,
at least a surface (α) of the resin layer on the side opposite to the side on which the substrate or the release material is provided has pressure sensitive adhesiveness,
the surface (α) of the resin layer has a concave portion and a flat face such that a width of the concave portion observed from the side of the surface (α) is non-uniform,
a region (D) of 8 mm in length×10 mm in width freely-selected on the surface (α) includes a concave portion having an area of 70 to 99.99% relative to 100% of a total area of all concave portions in the region (D), and
at least one concave portion in the region (D) does not have contour lines that are approximately parallel straight lines of 50 μm on both sides of the concave portion.

2. The pressure sensitive adhesive sheet according to claim 1, wherein the flat face comprises at least one flat face (f1) having an area within which a region surrounded by a circle having a diameter of at least 100 μm is selectable.

3. The pressure sensitive adhesive sheet according to claim 1, wherein the flat face comprises at least one flat face (f2) having an area of 0.2 mm² or more.

4. The pressure sensitive adhesive sheet according to claim 1, wherein the shape of the flat face observed from the side of the surface (α) is irregular.

5. The pressure sensitive adhesive sheet according to claim 1, wherein the region (D) includes a plurality of flat faces, and a skewness Sk value relative to a normal distribution curve between an area and a frequency of each of at least one flat face (S) excluding flat faces having a cumulative relative frequency of 30% or less determined by adding a relative frequency from the plurality of flat faces with a smaller area is 1.0 or more.

6. The pressure sensitive adhesive sheet according to claim 5, wherein a kurtosis Ku value relative to the normal distribution curve between the area and the frequency of each of the at least one flat face (S) is 1.8 or more.

7. The pressure sensitive adhesive sheet according to claim 1, wherein the surface (α) has a plurality of flat faces such that positions of the flat faces do not have periodicity.

8. The pressure sensitive adhesive sheet according to claim 1, wherein the concave portion has a height difference of 0.5 μm or more at maximum.

9. The pressure sensitive adhesive sheet according to claim 1, wherein the concave portion is not formed by using a release material having an embossed pattern.

10. The pressure sensitive adhesive sheet according to claim 1, wherein when a 5 mm×5 mm square region (P) is freely selected on the surface (α) and the pressure sensitive adhesive sheet is cut along each of two diagonal lines of the region (P) in a thickness direction perpendicular to the region (P) on the surface (α) to expose two cross sections of the pressure sensitive adhesive sheet, a plurality of concave portions having a maximum height difference of 40% or more of a total thickness of the resin layer and having a different shape of the cut part and a flat portion corresponding to the cut part of the flat face in the region (P) and approximately parallel to the surface of the substrate or release material contacting the resin layer exist in at least one cross section (P1) of the two cross sections on the side of the surface (α) of the cross section (P1).

11. The pressure sensitive adhesive sheet according to claim 1, wherein the resin layer comprises 3 to 90% by mass of the fine particles.

12. The pressure sensitive adhesive sheet according to claim 1, wherein the resin in the resin part (X) comprises a pressure sensitive adhesive resin.

13. The pressure sensitive adhesive sheet according to claim 1, wherein the resin part (X) further comprises at least one selected from the group consisting of a metal chelate crosslinking agent and an epoxy crosslinking agent.

14. The pressure sensitive adhesive sheet according to claim 1, wherein a surface (β) of the resin layer on the side on which the substrate or release material is provided has pressure sensitive adhesiveness.

15. The pressure sensitive adhesive sheet according to claim 1, wherein the resin layer is a multilayer structure in which a layer (Xβ) mainly containing the resin part (X), a layer (Y1) containing the particle part (Y) in an amount of 15% by mass or more, and a layer (Xα) mainly containing the resin part (X) are laminated in this order from the side on which the substrate or release material is provided.

16. The pressure sensitive adhesive sheet according to claim 15, wherein
the layer (Xβ) is formed by a composition (xβ) comprising the resin and less than 15% by mass of the fine particles,
the layer (Y1) is formed by a composition (y) comprising the fine particles in an amount of 15% by mass or more, and
the layer (Xα) is formed by a composition (xα) comprising the resin and less than 15% by mass of the fine particles.

17. A method for producing the pressure sensitive adhesive sheet according to claim 1, comprising:
forming a coating film (x') by a composition (x) comprising the resin and less than 15% by mass of the fine particles and a coating film (y') by a composition (y) comprising 15% by mass or more of the fine particles; and
simultaneously drying the coating film (x') and the coating film (y').

18. A method for producing the pressure sensitive adhesive sheet according to claim 1, comprising:
forming, on the substrate or the release material, a coating film (xβ') formed by a composition (xβ) comprising the resin and less than 15% by mass of the fine particles, a coating film (y') by a composition (y) comprising the fine particles in an amount of 15% by mass or more, and a coating film (xα') by a composition (xα) comprising the resin and less than 15% by mass of the fine particles, by laminating in an order of the coating film (xβ'), the coating film (y'), and the coating film (xα') from the side of the substrate or the release material; and simultaneously drying the coating film (xβ'), the coating film (y'), and the coating film (xα').

19. A method for producing the pressure sensitive adhesive sheet according to claim 1, comprising:

forming, on a layer (Xβ) provided on the substrate or the release material and mainly comprising the resin part (X), a coating film (y') by a composition (y) comprising 15% by mass or more of the fine particles and a coating film (xα') by a composition (xα) comprising the resin and less than 15% by mass of the fine particles, by laminating in an order of the coating film (y') and the coating film (xα') from a side of the layer (Xβ); and simultaneously drying the coating film (y') and the coating film (xα').

\* \* \* \* \*